(12) United States Patent
Rajkumar et al.

(10) Patent No.: US 12,265,910 B2
(45) Date of Patent: *Apr. 1, 2025

(54) SHARING LEARNED INFORMATION AMONG ROBOTS

(71) Applicant: Google LLC, Mountain View, CA (US)

(72) Inventors: Nareshkumar Rajkumar, Cupertino, CA (US); Patrick Leger, Belmont, CA (US); Nicolas Hudson, San Mateo, CA (US); Krishna Shankar, Los Altos, CA (US); Rainer Hessmer, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/930,874

(22) Filed: Sep. 9, 2022

(65) Prior Publication Data

US 2023/0004802 A1 Jan. 5, 2023

Related U.S. Application Data

(63) Continuation of application No. 15/855,329, filed on Dec. 27, 2017, now Pat. No. 11,475,291.

(51) Int. Cl.
*G06F 13/00* (2006.01)
*B25J 9/00* (2006.01)
(Continued)

(52) U.S. Cl.
CPC .............. *G06N 3/08* (2013.01); *B25J 9/0003* (2013.01); *B25J 9/1671* (2013.01);
(Continued)

(58) Field of Classification Search
CPC ............ G06N 3/08; G06N 3/04; G06N 20/00; H04L 67/568; H04L 67/12; B25J 9/0003; B25J 9/1671; G05B 2219/45108
(Continued)

(56) References Cited

U.S. PATENT DOCUMENTS 4,884,216 A   11/1989   Kuperstein
5,673,367 A    9/1997   Buckley
(Continued)

FOREIGN PATENT DOCUMENTS

WO    2016/100717    6/2016

OTHER PUBLICATIONS

Akata et al., "Label-Embedding for Attribute-Based Classification," IEEE Conference on Computer Vision and Pattern Recognition, Jun. 2013, 8 pages.

(Continued)

*Primary Examiner* — Kenneth R Coulter
(74) *Attorney, Agent, or Firm* — McDonnell Boehnen Hulbert & Berghoff LLP

(57) ABSTRACT

Methods, systems, and apparatus, including computer programs encoded on computer storage media, for sharing learned information among robots. In some implementations, a robot obtains sensor data indicating characteristics of an object. The robot determines a classification for the object and generates an embedding for the object using a machine learning model stored by the robot. The robot stores the generated embedding and data indicating the classification for the object. The robot sends the generated embedding and the data indicating the classification to a server system. The robot receives, from the server system, an embedding generated by a second robot and a corresponding classification. The robot stores the received embedding and the corresponding classification in the local cache of the robot. The robot may then use the information in the cache to identify objects.

20 Claims, 14 Drawing Sheets

(51) Int. Cl.
    *B25J 9/16*     (2006.01)
    *G06N 3/08*     (2023.01)
    *H04L 67/12*     (2022.01)
    *H04L 67/568*     (2022.01)

(52) U.S. Cl.
    CPC .... *G05B 2219/45108* (2013.01); *H04L 67/12* (2013.01); *H04L 67/568* (2022.05)

(58) Field of Classification Search
    USPC .... 709/224, 223, 203, 201, 202; 706/12, 15, 706/16, 20, 25
    See application file for complete search history.

(56) References Cited

U.S. PATENT DOCUMENTS

| | | |
|---|---|---|
| 6,904,335 B2 | 6/2005 | Solomon |
| 8,369,992 B2 | 2/2013 | Barajas et al. |
| 9,053,431 B1 | 6/2015 | Commons |
| 9,141,916 B1 | 9/2015 | Corrado et al. |
| 9,384,443 B2 | 7/2016 | Passot et al. |
| 9,687,984 B2 | 6/2017 | Smith et al. |
| 9,740,207 B2 | 8/2017 | Storfer et al. |
| 10,730,181 B1 | 8/2020 | Rajkumar et al. |
| 10,803,328 B1 | 10/2020 | Bai et al. |
| 10,967,509 B2* | 4/2021 | Rajkumar .............. B25J 11/008 |
| 11,017,317 B2 | 5/2021 | Rajkumar et al. |
| 11,106,967 B2 | 8/2021 | Shankar et al. |
| 11,440,196 B1* | 9/2022 | Kirmani ................. G06N 3/045 |
| 11,475,291 B2* | 10/2022 | Rajkumar ................. G06N 3/08 |
| 11,584,004 B2* | 2/2023 | Murphy ................... B25J 9/163 |
| 11,640,517 B2* | 5/2023 | Shankar .................. G06F 18/41 706/11 |
| 11,685,048 B2* | 6/2023 | Rajkumar .............. G06N 20/00 700/246 |
| 11,766,783 B2* | 9/2023 | Kirmani ................. B25J 9/1697 700/245 |
| 2008/0243305 A1 | 10/2008 | Lee et al. |
| 2009/0210090 A1 | 8/2009 | Mori et al. |
| 2012/0072023 A1 | 3/2012 | Ota |
| 2013/0034295 A1 | 2/2013 | Tsuchinaga et al. |
| 2013/0184867 A1 | 7/2013 | Jang et al. |
| 2015/0339570 A1 | 11/2015 | Scheffler |
| 2016/0357855 A1 | 12/2016 | Fan et al. |
| 2017/0084027 A1 | 3/2017 | Mintz et al. |
| 2017/0213070 A1 | 7/2017 | Aghamohammadi et al. |
| 2017/0357896 A1 | 12/2017 | Tsatsin et al. |
| 2017/0364667 A1 | 12/2017 | Bennett et al. |
| 2018/0081179 A1 | 3/2018 | Samec et al. |
| 2018/0250826 A1 | 9/2018 | Jiang et al. |
| 2018/0285528 A1 | 10/2018 | Healey et al. |
| 2019/0005374 A1 | 1/2019 | Shankar et al. |
| 2019/0145765 A1 | 5/2019 | Luo et al. |
| 2020/0143193 A1 | 5/2020 | Najibikohnehshahri et al. |
| 2020/0311616 A1 | 10/2020 | Rajkumar et al. |
| 2020/0324407 A1 | 10/2020 | Rajkumar et al. |
| 2021/0220991 A1 | 7/2021 | Rajkumar et al. |
| 2021/0256424 A1* | 8/2021 | Rajkumar .............. G06N 3/008 |
| 2021/0390371 A1 | 12/2021 | Shankar et al. |
| 2023/0281422 A1* | 9/2023 | Shankar ................. G06N 3/008 706/11 |

OTHER PUBLICATIONS

Anonymous Authors, "Learning an Embedding Space for Transferable Robot Skills," Under review as a conference paper at ICLR 2018, [retrieved on Jan. 31, 2018] Retrieved from Internet: URL<https://openreview.net/pdf?id=rk07ZXZRb>, 16 pages.

Aytar, Yusuf, "Transfer Learning for Object Category Detection," Doctoral Thesis, Robotics Research Group, Department of Engineering Science, University of Oxford, Brasenose College, 2014, 146 pages.

Barrett et al., "Transfer Learning for Reinforcement Learning on a Physical Robot," 9th International Conference on Autonomous Agents and Multiagent Systems—Adaptive Learning Agents Workshop, May 2010, 6 pages.

Bihlmaier et al., "A data-driven large-scale optimization approach for task-specific physics realism in real-time robotics simulation," 2016 IEEE International Conference on Simulation, Modeling, and Programming for Autonomous Robots, Dec. 2016, pp. 210-215.

Chen et al., "A Deep Visual Correspondence Embedding Model for Stereo Matching Costs," IEEE International Conference on Computer Vision, Dec. 2015, 9 pages.

Doriy et al., "Use of Cloud Computing Platforms Towards Robotics Applications," IEEE, 2017, 7 pages.

Gräser, Axel, "Technological Solutions to Autonomous Robot Control," IEEE, 1998, 7 pages.

Gupta et al., "Learning Invariant Feature Spaces to Transfer Skills with Reinforcement Learning," arXiv:1703.02949v1, Mar. 8, 2017, 14 pages.

International Searching Authority, International Search Report and Written Opinion mailed on Dec. 14, 2018, issued in connection with International Patent Application No. PCT/US2018/050868, 14 pages.

Kajdocsi et al., "Review of the Most Successfully used Cognitive Architectures in Robotics and a Proposal for a New Model of Knowledge Acquisition," 2014 IEEE 12th International Symposium on Intelligent Systems and Informatics, Sep. 2014, pp. 239-244.

Keller et al., "Analysis of Illumination Robustness in Long-Term Object Learning," 2016 25th IEEE International Symposium on Robot and Human Interactive Communication, Aug. 2016, pp. 240-245.

Kira, Zsolt, "Inter-Robot Transfer Learning for Perceptual Classification," Proceedings of the 9th International Conference on Autonomous Agents and Multiagent Systems, May 2010, 8 pages, vol. 1.

Martens et al., "A Friend for Assisting Handicapped People," IEEE, 2001, 9 pages.

Modayil, Joseph, "Discovering Sensor Space: Constructing Spatial Embeddings That Explain Sensor Correlations," IEEE 9th International Conference on Development and Learning, Aug. 2010, 6 pages.

Ngu, Vinh, "Machine Learning in Robotics," Powerpoint, Universitat Hamburg, Fakulat Fur Mathematik, INformatick and Naruwissenschaften, Fachberich Informatik, Arbeitsbereich TAMS, Masterprojekt SoSe17, Jun. 2017, [retrieved on Jan. 31, 2018] URL<https://tams.informatik.uni-hamburg.de/lehre/2017ss/seminar/ir/dock/Ving_Ngu_Machine_Learning.pdf>, 37 slides.

Pan et al., "A Survey on Transfer Learning," IEEE Transaction on Knowledge and Data Engineering, Oct. 2009, 15 pages, vol. 22, No. 10.

Pauly et al., "Real-Time Object Detection for Autonomous Robots," Autonome Mobile Systeme (AMS) 14, Fachegesprche, Springer-Verlag, 1998, 8 pages.

Qi et al., "PointNet: Deep Learning on Point Sets for 3D Classification and Segmentation," arXiv:1612.00593v2, Apr. 10, 2017, 19 pages.

Ramanathan et al., "Active Object Categorization on a Humanoid Robot," VISAPP, Mar. 2011, 7 pages.

Ray, Partha Pratim, "Internet of Robotic Things: Concept, Technologies, and Challenges," IEEE, 2016, 12 pages.

Sermanet et al., "Time-Contrastive Networks: Self-Supervised Learning from Video," arXiv:1704.06888v2, Oct. 6, 2017, 15 pages.

Tai et al., "Deep-learning in Mobile Robotics—from Perception to Control Systems: A Survey on Why and Why Not," arXiv:1612.07139v3, Jan. 1, 2017, 16 pages.

Tenorth et al., "KNOWROB—knowledge processing for autonomous personal robots," 2019 IEEE/RSJ International Conference on Intelligent Robots and Systems, Oct. 2009, pp. 4261-4266.

Wang et al., "How Robots Learn to Classify New Objects Trained from Small Data Sets," 1st Conference on Robot Learning, Oct. 18, 2017, 10 pages.

Wikipedia, "Cloud Robotics," retrieved from the internet (Jan. 30, 2018) URL<hppts://www.en.wikipedia.org/wiki/Cloud_robotics>, 8 pages.

Wikipedia, "Robot Learning," retrieved from the internet (Jan. 30, 2018) URL<hppts://www.en.wikipedia.org/wiki/Robot_learning>, 4 pages.

(56) References Cited

OTHER PUBLICATIONS

Wohlkinger et al., "3D Object Classification for Mobile Robots in Home-Environments Using Web-Data," IEEE 19th International Workshop on Robotics in Alpre-Adria-Dunube Region (RAAD), Jun. 2010, 6 pages.

Wulfmeier et al., "Mutual Alignment Transfer Learning," 1st Conference on Robotic Learning, Oct. 2017, 10 pages.

Yan et al., "A Survey and Analysis of Multi-Robot Coordination," International Journal of Advanced Robotic Systems, Accepted Oct. 23, 2013, 18 pages.

\* cited by examiner

*1400*

STORE, IN A CACHE OF A ROBOT, FIRST EMBEDDINGS GENERATED USING A FIRST MACHINE LEARNING MODEL, WHEREIN THE FIRST EMBEDDINGS INCLUDE ONE OR MORE FIRST PRIVATE EMBEDDINGS
*1402*

RECEIVE A SECOND MACHINE LEARNING MODEL FROM A SERVER SYSTEM OVER A COMMUNICATION NETWORK
*1404*

GENERATE A SECOND PRIVATE EMBEDDING FOR EACH OF THE ONE OR MORE FIRST PRIVATE EMBEDDINGS USING THE SECOND MACHINE LEARNING MODEL
*1406*

ADD THE SECOND PRIVATE EMBEDDINGS TO THE CACHE OF THE ROBOT
*1408*

REMOVE THE ONE OR MORE FIRST PRIVATE EMBEDDINGS FROM THE CACHE OF THE ROBOT
*1410*

FIG. 14

SHARING LEARNED INFORMATION AMONG ROBOTS

CROSS-REFERENCE TO RELATED DISCLOSURE

This application is a continuation of U.S. patent application Ser. No. 15/855,329, filed on Dec. 27, 2017, which is now U.S. Pat. No. 11,475,291, which is incorporated herein by reference in its entirety.

BACKGROUND

This specification relates generally to sharing learned information among robots.

Robots can be configured to perform a variety of tasks. Robots generally need some form of perception to complete a task, such as the recognition or identification of an object. Robots may encounter objects and situations that their programming or training does not prepare them to handle appropriately. For example, although a robot may be able to recognize many different types of objects, it is likely that the robot will likely encounter new objects that it does not recognize.

SUMMARY

In some implementations, robots can perform processes to learn new information and new abilities from situations they encounter. Techniques disclosed herein can enable a robot to incorporate new information so that the robot learns almost instantaneously from user feedback or other sources of information. For example, a robot can have a local cache where certain types of learned information is stored. When the robot acquires new information, such as the classification for a previously unknown object, the robot can store a representation of the new information in the cache to make the information immediately available for the robot to use. This technique can allow near-instantaneous learning by a robot since the computational demands for incorporating new information, e.g., generating the representation and saving it in a cache accessed by robot systems, are extremely low. For example, the representation may have already been computed as part of the continuous onboard inference process of the robot. As a result, when a user provides a robot with a classification for a previously unknown object, the robot may store the information and apply it to current and future tasks with minimal delay.

In addition, individual robots can share learned information with other robots, allowing each robot in a fleet of robots to quickly acquire the combined learning from all of the robots in the fleet. Learned information can be distributed frequently to the robots, and without re-training or modifying machine learning models used by the robots. For example, each robot in a fleet may communicate with a server system to upload representations of recently learned information, such as classifications of objects that the robots observed and previously could not identify but have since learned to classify appropriately. The server system collects the representations, processes them, and distributes the combined set of representations to the robots in the fleet. This process of learning, uploading, and distributing representations of information learned by robots can be performed on an ongoing basis, for example, periodically on an hourly, daily, or weekly basis, or on a continuous basis with representations being distributed among robots as soon as they are learned. The process of sharing representations among robots allows fleet-wide learning in a rapid and efficient manner. In particular, newly learned information may be distributed and used by the robots in much less time than it would take to update a machine learning model to reflect the same information.

The learned information collected from multiple robots can be used to re-train or update machine learning models, which can then be distributed to each of the robots. For example, the server can periodically update a machine learning model used by the robots, at an interval significantly longer than the interval for sharing learning representations among robots. For example, if representations are shared daily among robots, the machine learning model may be updated each week, every two weeks, or each month. The updated machine learning model can incorporate the combined set of robot learning that occurred across the fleet over the previous interval, e.g., the last week or month.

In some implementations, the server can transmit the updated machine learning model to the fleet at a weekly or a fortnightly basis. The server can also provide update learned information more frequently, as embeddings or in other representations, each time a new set of robot learning is received by the server. Robots in the fleet can store this learned information in a cache and use it alongside the most recent version of the machine learning model. The receipt of new information for the cache can fine-tune the behavior of an overall perception system for each robot in the fleet on a daily basis or each time a new set of robot learning is provided to the robot. Thus, robots can use the updated machine learning model to incorporate the learning from the fleet, and can clear their local caches since the cached information has been incorporated into the model.

In general, many aspects of robot's knowledge and abilities may be provided by trained machine learning models, such as neural networks. Although these models are powerful and often efficient to run, training or updating machine learning models is often a time-consuming and computationally-intensive process, and the training process frequently requires large sets of training data to be effective. As an example, neural networks are often trained with an iterative process that uses many training examples to determine appropriate neural network parameters. In some cases, a complex neural network model, such as one configured to identify thousands of different types of items, may require days or even weeks to train, even when using distributed computing techniques. In many instances, individual robots simply do not have the battery power or computational power to update the training of a machine learning model in a reasonable amount of time, much less in real time. If a user provides a robot with the classification of a new object, it would be ideal for the robot to retain and use that classification going forward without delay, especially since the user may subsequently issue commands to the robot regarding the object.

As discussed above and further below, the present techniques may enable a robot to encode learned information, such as object characteristics and a corresponding classification, as a discrete representation in a cache of the robot. The robot can be designed to use the cache in its perception processing or other processing, so that saving the representation allows the robot to immediately apply the new information to tasks. Thus, individual robots may be able to learn and expand their capabilities in real time. In addition, the representations can be shared among robots to allow all robots in a fleet to quickly and efficiently acquire and use the new information. In the meantime, while the robots use the shared representations and thus already benefit from the collective learning of the fleet, a remote computing system can update the machine learning models based on the newly learned information for the fleet. From time to time, the computing system distributes updated models to the robots, where the updated models incorporate the learning compiled across the fleet over a period of time. Nevertheless, due to the ongoing sharing of representations, the robots can apply the learned information long before it has been incorporated into a model update.

In some implementations, the representation of information learned by a robot can be an embedding generated using a machine learning model. For example, the embedding may represent information derived from an output layer of a neural network model or from a hidden layer of the neural network model. When a set of input information, such as sensor data describing an object, is provided to the machine learning model, the processing of the machine learning model may encode the information in a form that is used directly as an embedding, or is further processed to generate the embedding. As a result, the embedding may be a compressed representation of an object or other observation, where the specific values of the embedding may depend on the structure and training state of the machine learning model used to generate the embedding.

In one general aspect, a method includes: obtaining, by a robot, sensor data indicating characteristics of an object; determining, by the robot, a classification for the object; generating, by the robot, a first embedding for the object using a machine learning model stored by the robot; storing, by the robot, the generated first embedding and data indicating the classification for the object in a local cache of the robot; sending, by the robot, the generated first embedding and the data indicating the classification to a server system over a communication network; receiving, by the robot, a second embedding and a corresponding classification from the server system over the communication network, where the received second embedding is generated by a second robot and corresponds to a second object; and storing, by the robot, the received second embedding and a corresponding classification in the local cache of the robot.

The foregoing and other embodiments can each optionally include one or more of the following features, alone or in combination. For example, one embodiment includes all the following features in combination.

In some implementations, the method includes, using, by the robot, the first embedding or the second embedding in the local cache to recognize one or more objects in an environment of the robot.

In some implementations, the method further includes generating, by the robot, sensor data describing a particular object in the environment of the robot.

In some implementations, the method includes generating, by the robot, an embedding for the particular object using the machine learning model and the sensor data describing the particular object. The method includes comparing, by the robot, the embedding for the particular object with the first embedding and the second embedding.

In some implementations, the method includes assigning, by the robot, a classification for the particular object based on the comparison of the embedding for the particular object with the first embedding and the second embedding.

In some implementations, the method includes receiving, by the robot, a second machine learning model from the server system over the communication network.

In some implementations, the method includes using, by the robot, the second machine learning model to recognize one or more objects.

In some implementations, the method includes removing, from the local cache of the robot, embeddings generated using the first machine learning model.

In some implementations, the method includes designating the generated embedding for sharing with other robots.

In some implementations, the method includes sending the generated embedding with a label or metadata designating that the embedding should be shared or sending the generated embedding using an application programming interface for sharing embeddings.

In some implementations, the method further includes storing, by the robot, the sensor data used to generate input to the machine learning model used to generate the embedding.

In some implementations, the method includes generating the first embedding based on processing feature data, extracted from the sensor data for the object, using the machine learning model.

In some implementations, the machine learning model is a neural network model, and the first embedding is derived from output at an output layer of the neural network mode.

In some implementations, the machine learning model is a neural network model, the first embedding is derived from data indicating activations at a hidden layer of the neural network model.

In another general aspect, a method includes: receiving, by the one or more computers, object classification examples from a plurality of robots, where each object classification example includes (i) an embedding that a robot generated using a machine learning model, and (ii) an object classification corresponding to the embedding; evaluating, by the one or more computers, the object classification examples based on a similarity of the embeddings of the received object classification examples with other embeddings; selecting, by the one or more computers, a subset of the object classification examples based on the evaluation of the quality of the embeddings; and distributing, by the one or more computers, the subset of the object classification examples to the robots in the plurality of robots.

Implementations may include one or more of the following features. For example, in some implementations, for each of the object classification examples, the embedding is generated by a robot based on sensor data generated by the robot describing an object detected by sensors of the robot, and the corresponding object classification for the embedding indicates a classification for the detected object. The embeddings of the respective classification examples include embeddings generated by different robots that each use a particular machine learning model having a particular training state to generate the embeddings. Distributing the subset of the classification examples includes distributing the classifications to multiple robots that each store a copy of the same particular machine learning model having the particular training state.

In some implementations, distributing the subset of the classification examples includes transmitting, to each of the robots in the plurality of robots, the classification examples in the subset and designating the transmitted classification examples to be stored in a local cache of each of the robots.

In some implementations, distributing the subset of the classification examples includes synchronizing local caches of the robots in the plurality of robots so that each of the plurality of robots stores each of the classification examples in the selected subset in a local cache of the robot.

In some implementations, the method includes: training a second machine learning model using the selected subset of the classification examples and distributing the trained machine learning model to the robots in the plurality of robots.

In some implementations, training the second machine learning model includes generating an updated version of the machine learning model used to generate the embeddings. Distributing the trained machine learning model includes distributing the updated version of the machine learning model as a replacement to a machine learning model stored at each of the robots in the plurality of robots.

In some implementations, the method includes providing, to each robot in the plurality of robots, an instruction to remove the distributed classification examples from a local cache of the robot.

In some implementations, the method includes receiving, for each of the object classification examples, sensor data that describes the object corresponding to the object classification example. Training the second machine learning model includes training the second machine learning model based on the received sensor data received for the object classification examples.

In some implementations, the method includes receiving, for each of the object classification examples, sensor data, generated by a robot, that describes the object corresponding to the object classification example. Evaluating the object classification examples includes evaluating the quality of a classification example based on the received sensor data.

In some implementations, evaluating the object classification examples includes determining, for a particular embedding of a particular object classification example, a level of similarity of the particular embedding with respect to one or more other embeddings having a same object classification as the particular object classification example. Selecting the subset of the object classification examples includes selecting the particular object classification example to be included in the subset based on determining that the level of similarity satisfies a threshold.

In some implementations, evaluating the object classification examples includes determining, for a particular embedding of a particular object classification example, a level of similarity of the particular embedding with respect to one or more other embeddings having a different object classification from the particular object classification example. Selecting the subset of the object classification examples includes excluding the particular object classification example from subset based on determining that the level of similarity satisfies a threshold.

In some implementations, evaluating the object classification examples includes determining, for a particular embedding of a particular object classification example, a level of similarity of the particular embedding with respect to one or more other embeddings, where the level of similarity indicates a distance between the particular embedding and the one or more other embeddings in a vector space.

In some implementations, evaluating the object classification examples includes determining, for a particular embedding of a particular object classification example, a quality score representing a likelihood that the object classification matches the object corresponding to the particular object classification example. Selecting the subset of the object classification examples includes selecting the particular object classification example to include in the subset based on the quality score satisfying a threshold.

In some implementations, evaluating the object classification examples includes determining, for a particular embedding of a particular object classification example, a quality score based on: analyzing a level quality of sensor data provided by the plurality of robots; analyzing how the object classification examples adjust an overall accuracy of the machine learning model; and analyzing previous levels of quality of other object classification examples provided by the plurality of robots.

In some implementations, analyzing the level of quality of the sensor data provided by the plurality of robots further includes: determining a match between the sensor data and the embedding by providing the sensor data to the machine learning model; comparing an output embedding from the machine learning model to the embedding; comparing an output classification label from the machine learning model to the object classification corresponding to the embedding; and in response to determining that the output classification label from the machine learning model does not match the object classification corresponding to the embedding, retraining the machine learning model to detect the embedding and produce a correct classification label that matches the object classification.

In another general aspect, a method includes: storing, by a robot, first embeddings generated using a first machine learning model, where the robot stores the first embeddings in a cache of the robot, where the first embeddings include one or more first private embeddings that are not shared with other robots; receiving, by the robot, a second machine learning model from a server system over a communication network; generating, by the robot, a second private embedding for each of the one or more first private embeddings in the cache, where each of the second private embeddings is generated using the second machine learning model; adding, by the robot, the second private embeddings to the cache of the robot; and removing, by the robot, the one or more first private embeddings from the cache of the robot.

Implementations may include one or more of the following features. For example, in some implementations, the first embeddings include one or more public embeddings that are shared with a server system. The method includes: determining that a particular embedding is a public embedding; and after receiving the second machine learning model, removing the particular embedding from the cache of the robot based on determining that the particular embedding is a public embedding.

In some implementations, the method includes storing, by the robot, sensor data used to generate the one or more first private embeddings. Generating the second private embedding for each of the one or more first private embeddings in the cache includes generating, using the second machine learning model, each of the second private embeddings from the stored sensor data used to generate the one or more first private embeddings. The method further includes storing the second private embeddings in the cache of the robot.

In some implementations, generating the second private embeddings from the stored sensor data includes generating a second private embedding for an object by inputting, to the second machine learning model, feature values derived from the sensor data used to generate the first private embedding for the object.

In some implementations, the method includes: accessing, by the robot, metadata associated with a particular embedding of the first embeddings; and determining that the particular embedding is a private embedding that is not shared with the server system by analyzing the metadata associated with the particular embedding against one or more sharing rules that are stored by the robot.

In some implementations, the first embeddings include one or more first public embeddings in addition to the one or more first private embeddings. The method includes providing, by the robot, the one or more first public embeddings to the server system and not providing the one or more first private embeddings to the server system.

In some implementations, the method includes: determining, for each of the first embeddings, whether to store sensor data used to generate the first embedding, where the determination whether to store sensor data used to generate a first embedding is based on whether the first embedding is private or public; and based on the determining, storing, by the robot, sensor data for each of the one or more first private embeddings, and not storing sensor data for the one or more first public embeddings.

In some implementations, the first embeddings generated by a first machine learning model include one or more received embeddings that were received by the robot from the server system over a communication network. The method further includes determining that a particular embedding of the first embeddings is one of the received embeddings; and after receiving the second machine learning model, removing the particular embedding from the cache based on determining that the particular embedding is one of the received embeddings.

In some implementations, the cache is a local cache stored on a data storage device of the robot.

In some implementations, the first machine learning model is a first neural network model, and the second machine learning model is a second neural network model.

In some implementations, the method includes: obtaining, by the robot, sensor data describing an object; generating, by the robot, an embedding for the object based on the sensor data; determining, by the robot, whether to designate the embedding as a private embedding or a public embedding; and storing, by the robot, the embedding and data designating whether the embedding is a private embedding or a public embedding.

In some implementations, determining whether to designate the embedding as a private embedding or a public embedding includes: determining a location of the object or the robot; determining that the location is within a predetermined area for which information is not shared; and based on determining that the location is within the predetermined area, designating the embedding as a private embedding.

In some implementations, determining whether to designate the embedding as a private embedding or a public embedding includes: determining an object type for the object observed by the robot; determining that the object type is one of a predetermined set of object types; and determining whether to designate the embedding as a private embedding based on determining that the object type is one of the predetermined set of object types.

In some implementations, determining whether to designate the embedding as a private embedding or a public embedding includes: accessing a sharing rule indicating one or more restrictions on the sharing of information obtained by the robot, where the one or more restrictions limit sharing of information (i) observed by the robot at a time or place, or (ii) describing objects having an object type or object characteristic; determining, based on the sensor data for the object, that the sharing rules restrict sharing of information for the object described by the sharing data; and based on determining that the sharing rules restrict sharing of information for the object, designating the embedding for the object as a private embedding.

In some implementations, the method includes receiving user input indicating one or more criteria comprising a time, place, object type, or object characteristic for which sharing of information is restricted; and storing a sharing rule that designates embeddings for objects meeting the one or more criteria as private embeddings. Determining whether to designate the embedding as a private embedding or a public embedding includes determining whether the embedding satisfies the one or more criteria.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 14 is a flow chart that illustrates a process for enhancing robot learning.

Like reference numbers and designations in the various drawings indicate like elements.

DETAILED DESCRIPTION

Figure 1:
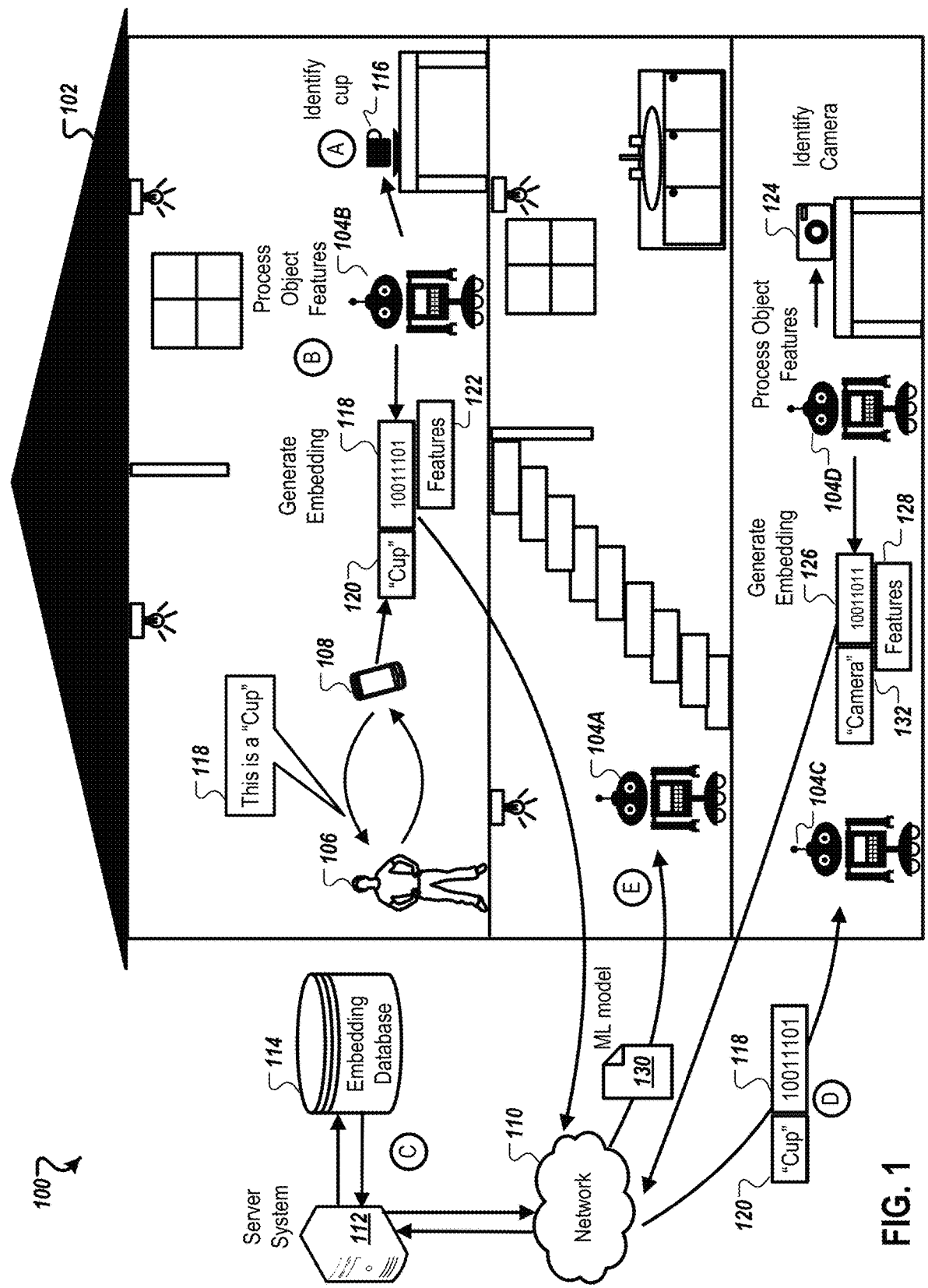
FIG. 1 is a block diagram that illustrates an example of a system for sharing learned information among robots.

FIG. 1 is a block diagram that illustrates an example of a system 100 for sharing learned information among robots. The system 100 includes a robots 104A-104D, a client device 108, a network 110, a server system 112, and a database 114. The server system 112 may include one or more computers connected locally or over a network, where the network may include one or more public or private networks and may include the Internet. The example shows a human user 106 who interacts with the robots 104A-104D. The example of FIG. 1 shows the robots 104A-104D in a house 102, but the robots 104A-104D may be alternatively located in different houses or in other types of buildings or areas. FIG. 1 illustrates various operations in stages (A) to (E) which can be performed in the sequence indicated or in another sequence.

In general, a robot refers to a programmable machine that can be capable of performing a series of actions at least partially autonomously. For example, a robot may be capable of carrying out tasks that involve interacting with or changing the physical surroundings of the robot (e.g., arranging or manipulating objects). Besides responding to inputs and commands from humans, robots may initiate actions of their own accord, based on their programming and the conditions they detect. A robot may include components for interacting with (e.g., physically manipulating) objects in its environment. For example, a robot may include an arm with actuator to grasp or otherwise move objects. For example, the actuator may be a robotic hand with finger-like elements to grasp objects. A robot can also include components to allow locomotion. Examples include motorized elements, such as wheels, legs, continuous tracks, and so on, to allow the robot to travel from one location to another. The robot may include navigation components allowing it to set a course and travel along a self-directed path. The robot may include sensory capabilities allowing the robot to perceive its surrounding environment. The robot can include body components such as a chassis and other connecting components. The body components may allow various types of motion of robot components relative to each other, such as rotating, swiveling, shifting, etc. Robots can include various other components, such as batteries to power the robot, transmitters, receivers, sensors, data processors, and memory to store programmed instructions for the robot.

In the example of FIG. 1, a fleet of robots uses distributed learning in order to learn to identify new objects. The robot fleet does not require that every robot in the fleet to be trained individually to identify new objects. Rather, the robot fleet employs a distributed learning technique, where one robot can learn to identify an object and produce an embedding that corresponds to the object. That robot can share the embedding with the other robots over the communication network in a manner that allows all robots in the fleet to identify the newly identified object. Providing the embedding and corresponding classification information allows robots that receive the data to instantly learn to classify the object. The technique can use machine learning models to produce an embedding describing the characteristics of the identified object. This may be beneficial because user need only train one robot to identify an object rather than each robot. In addition, sharing embeddings among robots preserves processing resources by allowing robots to learn without having to retrain the machine learning model on each robot.

Any of various types of machine learning models can be used. Examples include neural networks, maximum-entropy classifiers, decision trees, random forest classifiers, boost trees, logistic regression models, and reinforcement learning models. Machine learning models can be trained using supervised or unsupervised training. Machine learning models can have parameters learned or trained based on various different examples, which may come from a variety of sources.

In some implementations, sharing can be performed to all robots in the fleet. Alternatively, sharing can be performed to robots within a particular organization. For example, robot 104A may be associated with a house and robot 104B may be associated with a factory. In addition, the sharing can be performed to robots in a particular domain. For example, robot 104C may be a hospital robot and robot 104D may be a hotel robot. In some implementations, sharing can be performed among specific groups of robots via access controlled lists managed by the server system 112. In other words, the server system 112 may selectively share learned information only among robots that have certain commonalities, e.g., the same hardware model, the same role or responsibility, the same type of location, the same owner, the same group or fleet identifier, and so on.

In some implementations, each robot in the robot fleet is located in a single location, such as a house 102 or a factory. In other implementations, the robots in the robot fleet are located in different locations or settings. For example, robot 104A may be located at house 102; robot 104B may be located at a house across the street from house 102; robot 104C may be located at a grocery store; and, robot 104D may be located at an airport. The robots located at different locations can communicate with one another through communication network 110. The robots in a fleet may be represent a large group of robots distributed across many locations, such as all robots provided by a vendor, with the robots owned or used by many different users in different settings.

In some implementations, robots in the robot fleet are programmed to assist humans in the home. For example, a human may issue an instructional command to a first robot to request for the retrieval of the human's cell phone. In response, the first robot can search through the home for the human's cell phone, identify the cell phone by distinguishing it from other household items, and return the cell phone to the human. While the robots may include object recognition models that enable the robots to recognize household items, the trained model may not be able to classify some types of objects. When object recognition models do not enable a robot to identify an object, a human user may train the first robot on characteristics of the object to allow the first robot to be able locate and return the object. Once the first robot has learned to identify an object, it can share the learned information with other robots. Then, if a user asks a second robot to retrieve the same object or the same type of object, the second robot may use the data received from the first robot to identify that object. This way, even if the second robot's perception models did not recognize the object and even if the second robot was never directly trained to recognize the object, the second robot can still recognize the object based on the shared learning from the first robot.

The process of distributed learning among a robot fleet can be performed rapidly by sharing embeddings among the robots. An embedding may be a set of values, such as a vector, code, file, or other data, that represents characteristics of or a kind of fingerprint for an object. The embedding can be generated by providing data describing the object (e.g., features extracted from sensor data describing the object) to a perception model, such as a machine learning object recognition model. For example, the embedding may be a multi-dimensional vector or numbers representing an encoded form of characteristics of the object, where the encoding is based on processing of object feature data with a trained machine learning. A robot that encounters a new object and learns the correct classification shares the embedding for the object with the rest of the fleet, so that each robot does not need to be individually trained to identify the object. As a result, when a human trains a single robot to identify an object, the system enables the other robots to also be able to identify the object, due to receiving the corresponding embedding and classification information.

For instance, a human may train the first robot to identify a coffee mug. The human can hold up the coffee mug in front of the first robot for the first robot's sensors to capture the characteristics of the coffee mug. The first robot can acquire images of the coffee mug from various angles to determine characteristics of the coffee mug. The first robot can then use these characteristics to produce an embedding that is stored in a local cache of the first robot along with data specifying that the embedding represents a coffee mug. Once the embedding and classification are stored, the first robot will be able to instantly use the new information to recognize the mug in the future. As a result, the next time a human requests the first robot to retrieve a coffee mug, the first robot can identify and retrieve the coffee mug by comparing the stored embedding for the coffee mug with embeddings that first robot produces from live sensor data describing the first robot's current environment.

In general, the robot learning techniques allow for immediate local learning by a single robot, as well as sharing learning with other robots. A user can unlock object types from a master list of items, e.g., a knowledge graph, for use on a single robot. If, after unlocking an object type, the robot still cannot correctly identify an object, the user can teach the robot to classify an object. This process can involve showing the robot an example or "instance" of the object type. This learned example is referred to as a "teaching" and can be expressed as an embedding and corresponding classification. The teaching is immediately functioning on the robot that was taught. In addition, the robot periodically uploads the teachings it receives to a server. Other robots do the same. Teachings from all robots are aggregated by the server and existing models are fine-tuned. The fine-tuning occurs in two ways. First, sets of teachings, e.g., embeddings and classifications, can be pushed fleet-wide to all robots daily. All robots in the fleet can now detect newer objects based on teachings from individual robots. Second, fully retrained models, e.g., machine learning models re-trained on aggregated teachings from all robots, may be pushed to robots weekly or fortnightly.

When a robot encounters an unknown object, a user may interact with the robot to unlock (e.g., make available for use) an object type from a master list of known object types. The user associates this unlocked object type to the unknown object that the robot encountered. The robot can now detect objects of this new unlocked object-type. Generally, robots may use a perception system that is designed to classify many types of objects. To reduce the risk of false positives, however, individual robots may be configured to initially detect only a subset of the total set of object types. For example, a master list of object types could include ten thousand or more different object types, while an individual robot may have a subset, e.g., only one hundred or one thousand of those object types, unlocked and available to readily detect. If the robot does not correctly detect an object, the user can be shown an interface to select the appropriate item from the master list, so it will be unlocked and made available for the robot to detect. This can allow users to expand the range of objects their robot can detect through a remote interface, such as an application or web page.

In some instances, simply unlocking the object type may not be sufficient to allow the robot to reliably detect the object and avoid false positives, however. To improve performance, especially to correct errors by a robot, a user can identify an instance of the object type and enable sample images or other sensor data to be acquired. For example, the user can use his cell phone to capture images of the object from different sides, while tracking the camera positions for each image. As another example, after a user points out the object to the robot, and the robot acquires appropriate images. During teaching of a new object, the robot can ensure that the object is seen from all sides, at various distances, and under varying lighting conditions. To do this, the robot may need to: drive to different positions around the object to see different sides of the object, and with different illumination; pan and tilt the robot's head (e.g., sensor assembly) to capture the object in different parts of the image, which causes changes in the object's 2D appearance due to perspective distortion; pan and tilt the head to capture variation in color/brightness due to overall image exposure.

Image snapshots and corresponding embeddings may be continually generated until the robot determines that the object can be identified again conclusively. Embeddings can be saved as new learned information when the information is sufficiently different from the existing performance of a model. For example, an embedding can be saved as a new learned example after the vector distance between the object's standard embedding vector and the embedding vector for the nearest taught example exceeds a threshold. At this point, a new embedding vector is added as a taught example, whether for a new object type not in the master list, for an object type that is locked, or to refine an error for an already unlocked object type.

The user can indicate to the robot to stop identifying one or more previously learned object types from the provided list. The user may de-select any previously learned object types as shown in the provided list. For example, the user can issue a voice command, interact with the display of client device 108 that communicates with the robot, or interact with a screen of a robot to de-select any previously learned object types for non-identification. The user may de-select a previously learned object type because that object no longer exists in the house 102. In addition, the user may want to de-select one or more previously learned object types because the house 102 includes a new version of the object type. For example, the user may de-select a shovel from the provided list because the user brought a newer shovel to the house 102. The newer shovel includes a different looking head and handle shape that the robot may not be able to detect with information from the previously learned shovel object.

In response to receiving a de-selection from the user, the robot can lock the de-selected object types. In some implementations, the robot may store in memory a locked list of the previously learned object types. The robot will not identify any of the objects listed in the locked list. For example, if the robot retrieves the older shovel model, the robot will not be able to identify the older shovel model as a shovel.

In some implementations, the user can unlock a previously locked learned object type. The user can request the robot provide a list of the previously learned object types that include the locked and unlocked object types. The robot can provide the list to a local display or to the display of client device 108. The user can select to unlock previously learned object types so that the robot can identify the previously learned object types. The user may seek to unlock previously learned object types when the user brings those object types to house 102. For example, the user may determine the older shovel model performs better than the newer shovel model and as a result, discards the newer shovel model. In this case, the user unlocks the robots identification of the older shovel model in the provided list. The robot stores the updated list in memory.

In some implementations, the selection and de-selection of previously learned object types applies only to a single robot. The robot's list of previously learned object types is local to each particular robot and each local list is not transmitted to the other robots. The list remains local so that each user can personalize each individual robot to detect and identify the object types that are most applicable for the setting of that robot. The personalization allows the user to be specific in instructing particular robots to identify particular items of interest.

In addition, the first robot can transmit embeddings in its local cache over the communication network so that the embeddings can be shared with other robots to allow the other robots to be able to identify similar objects. For instance, the first robot can transmit the embedding stored in its local cache that allows the first robot to identify a coffee mug to a second robot and a third robot. After the second robot and the third robot receive the embedding for identifying the coffee mug, the second and third robot can instantly identify a coffee mug if one is observed in the robot's environment. Similarly, the second robot may transfer an embedding to the first robot and the third robot that allows the robots to identify an object, such as a hat. As a result, once the first robot and third robot receive and store the embedding describing the hat in their respective local caches, the first and third robot will be able to identify and a retrieve a hat if requested by a user.

In some implementations, each robot in the fleet stores a machine learning model that can be used to produce embeddings. The machine learning model can receive input of characteristics of the object and will output an embedding that represents a compact, encoded representation describing the object. The embedding is generated based on the propagation of data through the machine learning, and so the embedding generated in response to a set of input data is a function of the structure and training state of the machine learning model. As a result, in order for each of the robots to use embeddings generated by other robots, the machine learning model in each robot can be the same, e.g., having the same structure and training state. This allows robots to compare embeddings that the robots generate with the embeddings that other robots provide and have a meaningful result. Otherwise, if two robots use different machine learning models, the two robots may produce very different embeddings for the exact same object, and the robots would not be able to correctly interpret the received embeddings.

The system may include a server, separate from the robots, that manages training and version control for the machine learning models of the robots. The server can periodically transmit updated machine learning models to the robots and make sure the robots have identical models. In some implementations, the server may update the machine learning model upon receiving new embeddings from the robots. The server can transmit the updated machine learning model to each of the robots. Updated machine learning models can be provided at regular intervals, e.g., every two weeks, every month, etc., or updated models can be provided as needed. Having the same machine learning model in common among many robots can provide a number of advantages. For example, the computational expense of training the model can be done once, at the server, for each model update, which avoids the need for individual robots to expend power and computing resources for model training. Distributing the same updated model also shares the combined learning of the robot fleet with the robots. All of the robots receive an updated model that provide greater recognition ability, allowing the performance of each robot to improve in a standardized and predictable way.

The system 100 illustrates the technique of sharing object identification abilities between robots. For instance, the example illustrates a robot 104B identifying an object, generating an embedding 118 representing the object, and sharing the embedding 118 and additional data with other robots 104A, 104C, and 104D. The example also shows a server system 112 training a machine learning model to add the capability to identify the object represented by the shared embedding, and the server system 112 distributing the trained machine learning model 130 to the robots 104A-104D.

The processing shown in FIG. 1 achieves two important tasks. First, unlike systems that require a user to individually train each robot how to identify an object, the server system 112 aggregates and shares embeddings from each of the robots 104A-104D such that only one robot is required to learn to identify a new object. In response, the server system 112 distributes the aggregated embeddings among the robots so that each robot 104A-104D can identify the new object represented by the aggregated embeddings, even if a human never trained the other robots 104A-104D to identify the newly identified object.

Second, the server system 112 can distribute a newly trained machine learning model 130 to each of the robots 104A-104D without each robot having to retrain its own local machine learning model. As a result, the system 100 allows learning while avoiding the need for each robot 104A-104D to perform the computation required to train a machine learning model.

In some implementations, the server system 112 can store a copy of the machine learning model locally on each of the robots 104A-104D. The robots 104A-104D and the server system 112 each have the same machine learning model to ensure distributed learning of objects is uniform across the robot fleet. If a user trains robot 104A to identify a new object, such as a pen, the robot 104A inputs the characteristics of the pen into a local machine learning that produces an embedding as output. The embedding output represents a characterization or fingerprint for the pen object. In addition, the user may provide the robot 104A with a classification label describing the type of object represented by the embedding. The classification label may be an auditory or textual input tagging the embedding as a "pen." The classification label is stored with the embedding in a local cache of the robot 104A. Alternatively, the robot 104A may determine the classification label of the embedding from previously identified pen objects stored in the local cache of the robot 104A.

In some implementations, the robot 104A transmits the produced embedding and the classification label to the server system 112 to store in a database 114. The database 114 may include a table of classification labels corresponding to embeddings produced by the robots. The database 114 may also include sensor data, feature data extracted from sensor data, or other information used to generate the embeddings. The server system 112 can utilize the newly received feature data to train the machine learning model. The server system 112 trains its copy of the machine learning to be able to recognize the new object in subsequent processes. After training with the embeddings of various robots 104A-104D, the server system 112 transmits the trained machine learning model 130 to each of the robots 104A-104D. Each of the robots 104A-104D erases their currently locally stored machine learning model and replaces it with the updated, newly trained machine learning model 130 from the server system 112 and clears their respective local caches. Examples of this system 100 are described further below.

During stage (A), a user 106 instructs the robot 104B to retrieve a cup 116. The user 106 speaks a command to the robot 104B, e.g., "Robot, please retrieve my cup". The spoken utterance can include various types of phrases and/or instructions directed towards each robot 104. If the robot 104B does not understand the spoken utterance, the robot 104B may ask the user 106 to repeat the instruction. For instance, the robot 104B may process the spoken utterance using speech recognition to determine the context of the instruction.

The robot 104B first uses its perception models to attempt to identify a cup. If the robot 104B finds the cup in its immediate environment or in its map of contents of the house, the robot 104B may locate the cup 116 and carry out the requested command. However, if the robot 104B determines that it cannot find the cup 116, or that its classification model does not have the ability to recognize the object mentioned, the robot 104B may respond to the user 106 reciting "Which object is 'my cup'?" In response, the user 106 can take one or more actions to train robot 104B to identify a cup 116.

In some implementations, the user 106 can train the robot 104B to identify the cup 116. For example, the user may point to the cup 116, and the robot 104B may move to capture images from different sides of the cup 116. As another example, the user 106 can hold up the cup 116 in front of the robot 104B so the robot's sensors capture and learn the characteristics of the cup 116. The robot 104B can observe the cup 116 from various angles to learn various characteristics of the cup 116. These characteristics may include the shape, color, size, contour, and texture of the cup, to name a few examples. Additionally, the robot 104B may utilize RGBD sensors that capture red, blue, green, and depth data. This information, potentially combined with LIDAR, 3D depth data, or radar data captured by the robot, may allow the robot 104D to determine the three-dimensional shape and volume of the cup 116. The robot 104B can also capture audio data or other data while analyzing the cup 116. The robot 104B may include sensors such as a camera, a LIDAR sensor, a proximity sensor, an infrared sensor, an accelerometer, a touch sensor, a microphone, a depth camera, and a position sensor, to name a few examples. Other types of sensors may be used, and the previously mentioned sensor types are described as examples.

During stage (B), the robot 104B processes sensor data for an object. For example, after the user has identified the cup 116 for the robot 104B and the robot has captured images or other sensor data for the cup 116, the robot 104B processes the sensor data to identify characteristics of the object. The robot 104B generates feature data 122 from the obtained characteristics of the object. The feature data 122 may include a representation of the shape, color, size, contour, depth, and texture data from the sensors. The robot 104B provides the feature data 122 as input to its local machine learning object recognition model.

The local machine learning object recognition model may be a neural network that includes an input layer, an output layer, and one or more hidden layers. In some implementations, the primary purpose of the object recognition model is to recognize objects, not simply to produce embeddings. For example, the object recognition model may be configured to provide scores that represent a probability distribution over many types of objects the model is configured to recognize. For example, if the model is trained to recognize 10,000 different types of items, the model may have an output layer with 10,000 elements, each corresponding to a different type of item. The value generated for each element at the output layer can indicate a probability that the input feature data provided to the model represents the corresponding object type. Other model configurations may also be used, including dedicated encoding networks that have the primary or sole purpose of generating embeddings.

As the machine learning model processes input feature data, the model generates information that can be used to derive an embedding 118 for the object described by the input feature data. For example, the embedding 118 may be the set of values provided at the output layer of a neural network. As another example, the embedding 118 may be a set of values representing the activations at a hidden layer of a neural network, such as the set of activations of nodes at a final hidden layer. As another example, a function or transformation may be applied to information derived from the output layer and/or hidden layers of the model to generate the embedding 118. Outputs of other types of machine learning models, besides neural networks, may also be used to generate embeddings.

The embedding 118 represents an encoded representation of the characteristics of the cup 116. In general, embeddings for different objects may each have a common format and size, for example, each embedding can be a 128-unit vector, for example, where each unit includes 64-bit data values. In another example, the embedding can be a 256-unit embedding that represents an object. A 256-unit embedding may indicate a higher fidelity embedding representing an object than a 128-unit embedding, but at the expense of utilizing more memory. An embedding may be generated using the local machine learning for each object observed by the robot 104B. However, the robot 104B does not store embeddings in its cache for objects that the object recognition model can already recognize. Rather, the cache is used to store embeddings for newly learned objects, or received embeddings representing newly learned objects from other robots, when the object recognition model cannot appropriately recognize the object. Thus, the cache is used generally to store embeddings for objects that the object recognition model is not trained to detect, or to correct errors in which the object recognition model incorrectly classifies an object. The embeddings and classification information in the cache can supplement the recognition ability of the trained machine learning model, and even over-ride incorrect classifications by the model.

In some implementations, the user 106 may provide a classification label 120 for the embedding 118 produced by the robot 104B. For instance, the robot 104B may request that the user 106 provide a classification label 120 for an object that the robot does not recognize. The user 106 may provide the classification label 120, in any of various ways, e.g., voice input to the robot, or entering the information to a client device 108, such as a phone or computer that communicates with each of the robots 104. The client device 108 may communicate with the robots 104A-104D over any communication protocol, such as Bluetooth or Wi-Fi. For example, the user 106 may type in the classification label 120 "cup" into the client device 108. Alternatively, the user may speak an utterance detected by the client device 108, as illustrated in FIG. 1, reciting, "This is a 'Cup'". In other implementations, the user 106 may communicate directly with the robot 104B to provide the classification label 120 using a text input or speaking to the robot 104B.

In some implementations, the user 106 may provide an auditory teaching to the robots 104A-104D. The auditory teaching may incorporate previously known classification labels that the robot 104A, for example, comprehends in order to understand the auditory teaching. For example, the robot 104A may include an embedding corresponding to a "beer glass" and another embedding corresponding to a "beer stein" object. If user 106 instructs robot 104A to retrieve the "beer stein," the robot 104A will know to associate "beer glass" with "beer stein" and retrieve the "beer stein" object.

In response, the robot 104B stores the produced embedding 118, the corresponding classification label 120, and the feature data 122 in a local cache of the robot 104B. In some implementations, multiple embeddings may be stored for a single classification label 121, to show different examples of the same type of item. The robot 104B may capture sensor data that shows characteristics of an object from various angles. Each angle the robot captures of the object produces different sensor data, which could be provided to the local machine learning to produce a different embedding. As another example, multiple views of an object may be used to generate a single embedding that represents a three-dimensional aspects of the object. In some implementations, a robot may observe multiple objects of the same type, and use the different instances of the object type to produce different embeddings. For instance, the house 102 may have multiple pens of differing shapes and sizes, but each of which is still a valid example of the "pen" classification. As a result, the robot 104B may store multiple embeddings for the "pen" classification, with each embedding representing a different physical pen observed by the robot 104B.

In addition, the robot 104B can store additional metadata corresponding to the classification label 120 and the embedding 118. The robot 104B can store a version code for the current machine learning model stored on the robot 104B. The version code number describes a state of the current machine learning used to generate the embedding 118. For example, the version may be version number "1.0" or a date corresponding to when the machine learning model was installed. The robot 104B can also store location information corresponding to where the object corresponding to the embedding was located. The location information can include a type of location (e.g., home, store, library, etc., or within a home, living room, kitchen, dining room, etc.), a GPS coordinate of the location, and a date/time of day. For instance, the user 106 may provide the type of location to the robot 104B using the client device 108 or directly interacting with the robot 104B. For example, the type of location may be the "kitchen."

In some implementations, the additional metadata can also include a description of how the robot 104B determined the classification of the identified object. For instance, the classification may be determined with user input, such as user 106 inputting the classification label 120 to the robot. Alternatively, the classification may be determined by the robot 104B itself. For instance, the robot 104B may scan one or more objects as it moves through each room of house 102.

When scanning an object, the robot 104B provides as input the characteristics of the object to the robot 104B's local machine learning model. The output of the local machine learning model produces an embedding, such as an embedding 118, which describes a representation of the object. The robot 104B can compares the embedding 118 output to the stored embeddings in its local cache. If the robot 104B determines the produced embedding similarly matches at least one of the embeddings in the local storage, the robot 104B may store the produced embedding with the classification label from the local cache in the local cache. This process will be further described below.

In some implementations, the additional metadata may include identifications corresponding to the robot 104B that identified the object. For instance, the identification of the robot 104B may include an identification number, such as "0001," to identify the robot 104B. The additional metadata may include a group ID and owner ID number of robot 104B. The group ID number designates that the robot 104B belongs to a group that may include other robots. For instance, group ID number 2 may designate robot 104B is in a group with robot 104A and robot 104C. The owner ID number designates robot 104B to a particular owner.

In some implementations, the additional metadata may also include a robot type. The robot type may indicate a physical model of the robot, a role of the robot, or a description of the robot's purpose. Even if the robots are physically identical or similar, their programming and function may be different. For example, user 106 may designate robot 104B to be a "kitchen robot" and robot 104A to be a "golf robot". Other robot types are possible, such as a "hotel robot," a "hospital robot," a "warehouse robot," and a "car garage robot." These robots may be trained differently, to better fulfill their respective roles. Because they perform different types of tasks, the information and abilities that one type of robot learns may not always be applicable or helpful for another type of robot. By labelling the embeddings with the corresponding robot type, the server system 112 may selectively share the embeddings, so that robots receive applicable embeddings for their robot type (e.g., those generated by other robots in the same robot type) and do not receive embeddings that are not applicable.

During stage (C), the robot 104B transmits the embedding 118 and the corresponding classification label 120 to the server system 112 over the network 110. The robot 104B may also transmit the corresponding feature data 122 or raw sensor data used to generate the embedding 118, as well as any metadata about the embedding 118 or the robot 104B. The robot 104B may tag the embedding 118 with an indication of the destination for the server system 112. For instance, the tag may include an indication that the embedding is "new," e.g., represents a newly learned classification that the model is not able to recognize, and that the information should be shared with other robots. The server system 112 determines that the new embedding and classification can to be distributed to the other robots 104A, 104C, and 104D. As another example, the robot 104B's tag may include an indication that the embedding is "known," e.g., that the embedding is a further example of an already-known classification, which can be used to refine the model. The server system 112 can use the feature data 122 provided with the embeddings to refine and train the machine learning model stored by the server system 112.

In some implementations, the server system 112 may store the received embedding 118, the received corresponding classification label 120, and the feature data 122 in the database 114. The database 114 can include one or more tables that include classification labels, feature data or sensor data describing the object, and corresponding embeddings produced by the robots in the system 100. The database 114 may additionally store the metadata generated by each robot corresponding to each embedding. The server system 112 may retrieve the classification labels, the feature data, and the corresponding additional metadata from the database 114 when training the local machine learning model.

During stage (D), the server system 112 distributes the received embeddings, corresponding classification labels, and feature data to the other robots. After the server system 112 receives the embedding 118, corresponding classification label 120, and the feature data 122 from robot 104B, the server system 112 may determine that the embedding 118 and the corresponding classification label 120 represents new learning that can be distributed to the other robots. For instance, the server system 112 may determine the embedding 118 and the corresponding classification label 120 should be distributed to the other robots based on the indication tag provided by the robot 104B. For example, if the indication tag reads "new," the server system 112's next action is to distribute the embedding 118 and the corresponding classification label 120 to robots 104A, 104C, and 104D. Additionally, the server system 112 may transmit the additional metadata to the robots 104A, 104C, and 104D along with the embedding 118 and the corresponding classification label 120.

In some implementations, the server system 112 may determine the embedding 118 should be transmitted to the other robots based on the received classification label 120 alone. For instance, the server system 112 can compare the received classification label 120 to the stored classification labels in the database 114. If the server system 112 determines the received classification label 120 does not match any of the stored classification labels in the database 114, or contextually no match occurs, then the server system 112 stores the newly received embedding 118 and the received classification label 120 in the database 114.

In some implementations, a contextual match occurs when the server system 112 receives a classification label 120 of "a cup" and the server system 112 finds a classification label in the database 114 of "a coffee mug," for example. Although, the classification labels have different string characters, the context of "a cup" and "a coffee mug" have similar characteristics. If a contextual match does occur, the server system 112 may transmit a notification to the device 108 to notify the user 106 that two embeddings correspond to different or similar objects. Alternatively, the server system 112 can store and distribute new embeddings each time a new embedding is received from a robot, regardless of whether the new embedding is different from the stored embeddings in the database 114.

During stage (E), after collecting embeddings from the robots 104A-104D, the server system 112 updates the machine learning model and transmits the updated machine learning model 130 to each of the robots 104A-104D. In some implementations, the server system 112 may train its copy of the machine learning model using any newly received feature data from robots 104A-104D. In the meantime, while training is ongoing at the server system 112, the robots 104A-104D are nevertheless able to use the learning being incorporated through the model training. The server system 112 has already shared the embeddings and classifications that describe the examples being used in the model training process. Accordingly, the robots 104A-104D are able to recognize or classify the new objects by the embeddings, even before receiving an updated model.

In one example, robot 104D may learn to identify an object 124 in the house 102. After capturing sensor data describing the object 124 and learning a classification 132, the robot 104D can convert the characteristics to feature data 128 and provide the feature data 128 as input to its local machine learning model. From output of the local machine learning model, the robot 104D produces an embedding 126. The robot 104D also determines a classification label 132 of "Camera" corresponding to the embedding 126, e.g., based on input from the user 106. The robot 104D uploads the embedding 126, the feature data 128 used to generate the embedding 126, and the classification label 132 to the server system 112. The server system 112 distributes the embedding 126 and classification label 132 to the other robots 104A-104C, which store the information in their local caches. The server system 112 also uses the embedding 126, classification label 132, and feature data 128 to further train the object recognition model.

The server system 112 may train a machine learning model using the feature data and classification labels from each of the robots 104A-104D. For instance, the server system 112 may train a neural network on the feature data 122 and the classification label 120 from robot 104B as well as the feature data 128 and classification label 132. By training a machine learning model with the examples and learning from each of the robots 104A-104D, the server system 112 can improve the machine learning model to correctly recognize objects that any of the robots 104A-104D have learned to recognize.

Figure 2:
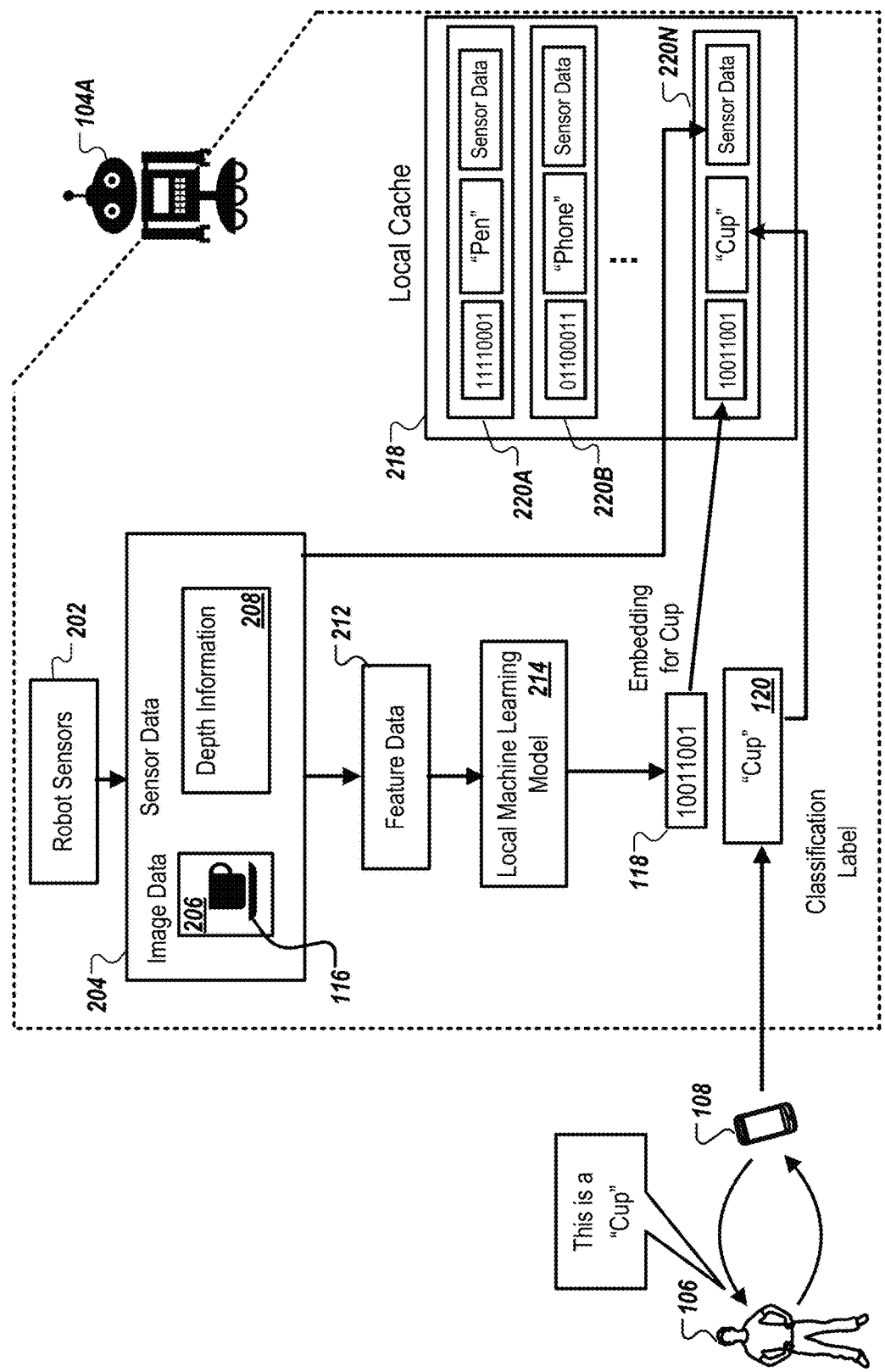
FIG. 2 is a block diagram that illustrates an example of a system for training a robot to recognize an object.

FIG. 2 is a block diagram that illustrates an example of a system for training a robot to detect an object. In some implementations, a user 106 may train a robot, such as robot 104A, to identify and detect an object, such as a cup in the example of FIG. 2. Training a robot 104A-104D to identify and detect an object allows the user 106 to request the robot 104A-104D to retrieve the object at a later point in time.

In some implementations, each robot 104A-104D may include the components illustrated in FIG. 2. For instance, as previously mentioned, robot 104A includes robot sensors 202. The robot sensors 202 provides the robot with a method to interpret its environment. For instance, the robot sensors 202 may include a camera, a LIDAR sensor, a proximity sensor, an infrared sensor, an accelerometer, a touch sensor, a microphone, and a position sensor, to name some examples. The robot 104A may utilize each of these sensors to avoid obstacles while moving through house 102, to understand an encountered object the robot 104A grasps, and to receive requests from the user 106.

In some implementations, the robot sensors 202 produce sensor data 204. The sensor data 204 includes image data 206 and depth information 208, and may include other sensor data. Additionally, the sensor data 204 may include contour, shape, and texture data. The image data 206 can include one or more videos and/or one or more still images of an object. The image data 206 may include color information (e.g., red, green, and blue or RGB information) and/or monochrome image data.

In some implementations, the depth information 208 is determined using a camera module. This information may be generated using a stereo camera, in which differences between the images between two image sensors are used to determine the distance of the object from the camera. In addition, or as an alternative, the depth information 208 may be generated using a LIDAR system, a radar system, or other depth sensor of the robot 104A.

In some implementations, the robot 104A can generate feature data 212 from the sensor data 204. The feature data 212 may be a representation of the sensor data 204 that the machine learning model 214 is configured to receive as input.

The robot 104A includes a local machine learning model 214. The local machine learning model 214 can be stored in memory of the robot 104A, optionally separate from the local cache 218. The server system 112 may provide the machine learning model 214 for the robot 104A over a network, and can ensure that each robot 104A-104D uses the same machine learning model 214, e.g., the most current version.

The robot 104A determines an embedding 118 that represents an encoded representation of the cup described by the image data 206, the depth information 208, and any other sensor data produced by the robot 104A. The embedding 118 is stored in robot 104A's local cache 218 along with a classification label 120 provided by user 106. The user 106 can provide the classification label 120 through interaction with the client device 108. Alternatively, the user 106 can provide the classification label 120 through direct interaction with the robot 104A, by either speaking to a microphone on the robot 104A or entering text through a terminal on the robot 104A.

In some implementations, the local cache 218 stores a set of data 220 for each object. For instance, a set of data 220A for the recently trained "cup" object includes an embedding 118, a classification label 120 corresponding to the embedding 118, and sensor data 204 corresponding to the embedding. By storing the set of data 220 in a local cache 218, the robot 104A can quickly access the data sets to use in recognizing objects it encounters. The robot 104A may store any embeddings and classification labels received from the server system 112 in the local cache.

In some implementations, when a robot receives embeddings and classification labels from the server system 112, only the embedding and the classification label are received, without the corresponding sensor data or feature data. The embedding is the data element used for comparison in the object recognition process, discussed further with respect to FIG. 3. As long as the machine learning model used to generated the received embedding is the same machine learning model used by the robot 104A receiving the embedding, the sensor data or feature data used to generate the embedding is not needed.

Figure 3:
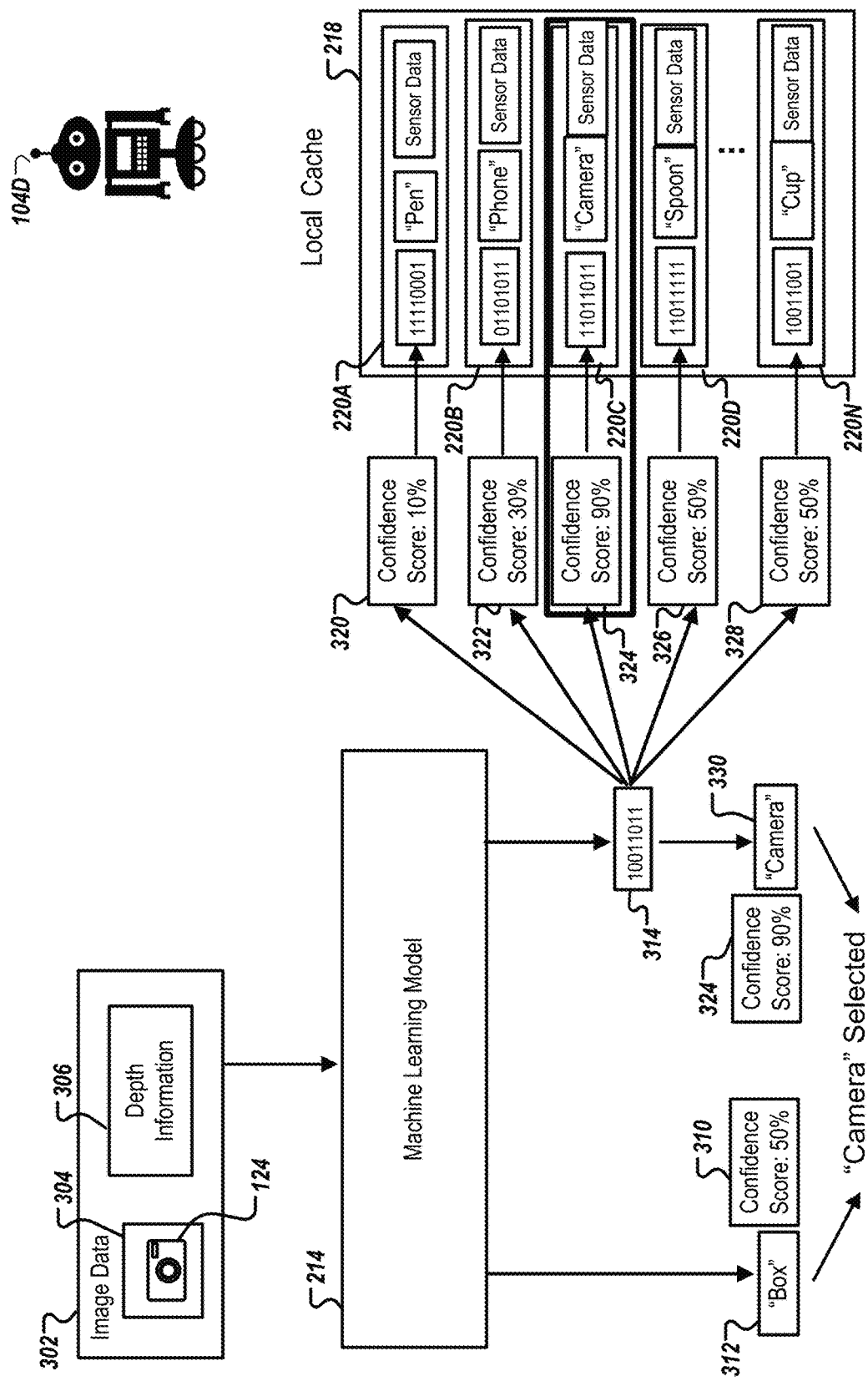
FIG. 3 is a block diagram that illustrates an example of a robot recognizing an object.

FIG. 3 is a block diagram that illustrates an example of a system 300 of a robot detecting an object. In some implementations, each robot 104A-104D performs the following steps to detect and identify object.

In some implementations, the robot 104D may find an object, such as camera, in house 102. The robot 104D captures sensor data 302 describing of the camera using the sensors 202. The robot 104D may scan the object 124 at various angles and distances to get a full view of the object 124. The sensor data 302 may include image data 304 and depth information 306, as well as other information describing of the object 124.

The robot 104D provides the sensor data 302, or feature data generated from the sensor data 302, to the machine learning model 214, which is stored locally at the robot 104D. The model 214 used by the robot 104D can be a copy of the same machine learning model 214 stored and used by the other robots 104A-104C. The machine learning model 214 is configured to produce information indicating the likelihood that the input data represents different types of objects. For example, the model 214 may output a set of values that form a probability distribution across a set of object types, for example, with one value indicating a likelihood that the input data describes a "spoon," another value indicating a likelihood that the input data describes a "book," and so on. From the outputs of the model 214, the robot 104D may select the object type that the model outputs indicate is most likely to describe the observed object 124. For example, the robot 104D may identify the model output indicating the highest probability, and select the classification corresponding to that output. In the example, the model 214 indicates, based on its training, that the observed object 124 is most likely a "Box," represented by classification label 312, and that the confidence score 310 for the classification is 50%. The confidence score 310 indicates a level of confidence that the classification label 312 accurately describes the object 124, and may be determined based on output of the machine learning model 214 or based on another evaluation of the model's output.

In addition to using the machine learning model 214 to predict a classification for the object 124, the robot 104D also uses the processing of the machine learning model 214 to generate an embedding 314 for the object 124. For example, the embedding may be derived from activations at one or more hidden layers of the model 214 and/or from data at an output layer of the model 214.

The robot 104D compares the embedding 314 generated for the object 124 with the embeddings stored in the robot's local cache 218. The robot 104D may separately compare the embedding 314 with each embedding in the local cache 218. For example, the robot 104D compares the embedding 314 to the embedding in data set 220A through 220N and generates data, such as a confidence score, indicating how closely the cached embeddings match the embedding 314. To perform the comparison, the robot 104D may perform bitwise comparisons, vector distance determinations, or other comparisons to generate a measure of similarity between embeddings.

In some implementations, each comparison may produce a confidence score. For example, the comparison between embedding 314 and the embedding in the dataset 220A produces a confidence score 320 of 10%. The comparison between embedding 314 and the embedding in the dataset 220B produces a confidence score 322 of 30%. The comparison between embedding 314 and the embedding in the dataset 220C produces a confidence score 324 of 90%. The comparison between embedding 314 and the embedding in the dataset 220D produces a confidence score 326 of 50%. The comparison between embedding 314 and the embedding in the dataset 220N produces a confidence score 328 of 50%.

The robot 104D then identifies which the embedding had the highest confidence score or measure of similarity with the embedding 314. In the example illustrated in FIG. 3, this is the embedding in dataset 220C, which has a corresponding classification label 330 of "camera."

The robot 104D then selects whether to use the classification predicted by the machine learning model 214 or the classification determined using the cache 218. For example, the robot 104D compares the compares the confidence score 324 of 90% to the confidence score 310 of 50% produced by the machine learning model 214. The robot 104D choses classification corresponding to the higher of the confidence scores. In this example, the robot 104D selects the classification label in the dataset 220C to correspond with the embedding 314 because the confidence score 324 of 90% is greater than the confidence score 310 of 50%. This allows the local cache 218 to provide new or higher-quality classification results than what is provided by the machine learning model 214.

In some implementations, the robot 104D may apply a threshold to ensure that classifications have at least a minimum confidence score before using a classification. For example, a classification may be required to have a confidence score of at least 70% before the robot 104D accepts the classification result.

Having selected the classification of "camera" as the most likely classification for the object 124, based on finding a close match using the local cache 218, the robot 104D may provide that classification to other models and modules of the robot 104D to carry out tasks. For example, the robot 104D may retrieve the camera when a user asks for the object.

The robot 104D can repeat the process discussed in FIG. 3 for each object observed by the robot 104D in order to classify the objects the robot 104D encounters. This recognition or classification process may be done very frequently, e.g., on an almost continuous basis as the robot observes its surroundings, and for multiple objects that may be in view at any given time. As a result, it is important for the process to be computationally efficient and power efficient. The architecture discussed here provides these benefits, since processing of the machine learning model can be very fast and efficient, and the lookup and comparison process for using datasets in the local cache can similarly be fast and efficient.

Generally, the embedding 314 and the sensor data 302 for an observed object 124 are discarded after recognizing the object 124. Nevertheless, in some implementations, this information can be saved and provided to the server system 112 as additional example data for an object type, and the server system 112 may use this information when training the machine learning model 214 further.

Figure 4:
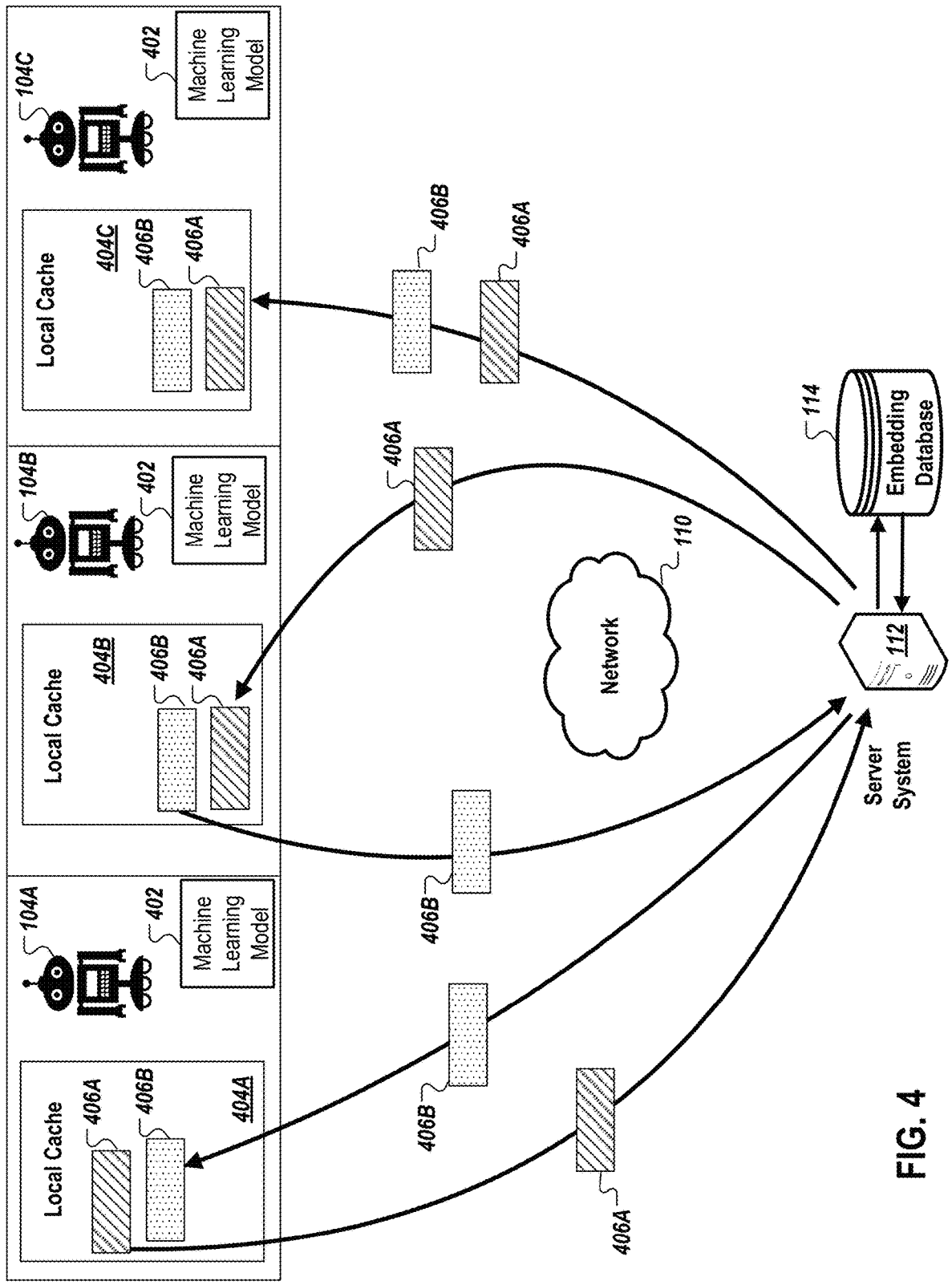
FIG. 4 is a block diagram that illustrates an example of another system for sharing learned information among robots.

FIG. 4 is a block diagram that illustrates an example of another system 400 for sharing learned information among robots. FIG. 4 illustrates an example of sharing perception information among robots 104A, 104B, and 104C. Each robot 104A, 104B, and 104C stores and uses a copy of the same machine learning model 402. As a result, each robot 104A-104C produces similar embeddings when observing similar objects. Each of the robots 104A-104C has a local cache 404A-404C in which embeddings and corresponding classifications are stored.

The local cache 406A for the robot 104A initially includes a dataset 406A, which was generated by the robot 104A based on sensor data that the robot 104A captured. The dataset 406A can include at least an embedding and a corresponding classification label. The robot 104A may also transmit sensor data and metadata corresponding to the embedding in the data set 406A. The robot 104A transmits the dataset 406A to the server system 112 over the network 110. The robot 104A may designate that the dataset 406A should be shared with other robots. Similarly, the robot 104A may indicate that the dataset 406A is new, or that it represents a classification example that addresses an inadequacy or error of the machine learning model 402.

The local cache 404B of the robot 104B initially includes dataset 406B, which is based on sensor data that the robot 104B captured. The dataset 406B includes an embedding and classification, but for a different object than the one represented by data set 406A. The robot 104B transmits the data set 406B to the server system 112 over the network 110.

The server system 112 distributes the data sets 406A and 406B so that each of the robots receives the information for its local cache. For example, the server system 112 sends the data set 406B, generated by the robot 104B, to the robot 104A. The server system 112 sends the data set 406A, generated by the robot 104A, to the robot 104B. The server system 112 sends the data sets 406A and 406B to the robot 104C.

As a result of the distribution by the server system 112, the robot 104C will be able to identify the objects represented by each of the embeddings in the datasets 406A and 406B without having to be trained by user 106 to detect those objects. Additionally, robot 104B will be able to identify the object represented by the embedding in dataset 406A without being trained by user 106 to detect the object. Likewise, robot 104A will be able to identify the object represented by the embedding in dataset 406B without having to be trained by user 106 to detect the object. The sharing of information in datasets (e.g., embeddings) between robots across a network 110 decreases the time required to train the robots to recognize new objects.

The server system 112 may also store the datasets 406A and 406B in the database 114. The server system 112 collects the data sets from robots over a period of time, and further trains a copy of the machine learning model 402 to be able to recognize the objects indicated in the datasets 406A and 406B.

In some implementations, the server system 112 may perform periodic synchronizations between robots 104A through 104C to ensure each robot includes the latest set of embeddings. For instance, the periodic synchronizations may occur at a predefined rate, such as hourly, daily, weekly, etc., and the synchronization may be initiated by a robot or by the server system 112. The periodic synchronizations may include a request from the server system 112 to each of the robots 104A-104D to upload any new embeddings since the last synchronization. Each robot 104A-104D may also provide a list of identifiers for datasets in its cache, so that the server system 112 can determine specifically which datasets should be sent and which are already present. The server system 112 determines which embeddings to provide to the robots 104A-104D so that each robot 104A-104D includes the latest embeddings in their local cache from each of the other robots 104A-104D.

Figure 5:
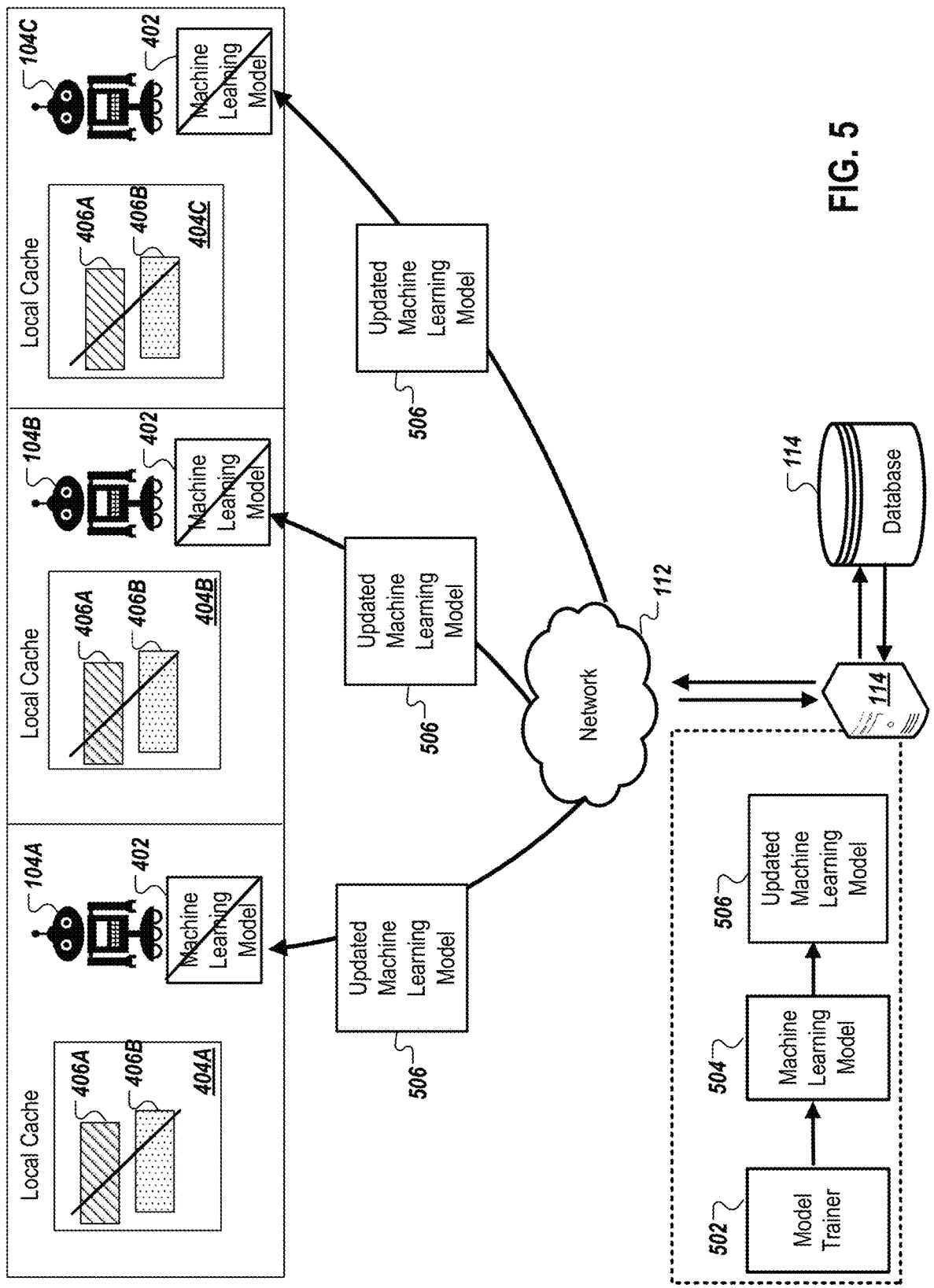
FIG. 5 is a block diagram that illustrates an example of a system for providing updated machine learning models to robots.

FIG. 5 is a block diagram that illustrates an example of a system 500 for providing updated machine learning models to robots. Periodically, for example, monthly, the server system 112 can generate and distribute an updated machine learning model that incorporates the combined learning from the various datasets that the robots 104A-104D have provided. FIG. 5 illustrates an exemplary distribution of providing updated machine learning models to robots 104A, 104B, and 104C. As previously illustrated in FIG. 4, each robot 104A, 104B, and 104C included the same machine learning model 402. In addition, each robot 104A, 104B, and 104C has its own separate local cache 404A, 404B, and 404C.

The server system 112 includes a model trainer 502 that iteratively trains a machine learning model 504. Prior to training, this model 504 may be the same model 402 that the robots 104A-104D are using, or it may represent a different model. The result of the training process is an updated machine learning model 506 that incorporates what the various robots 104A-104D have learned over a time period. The model trainer 502 may update the machine learning model 504 based on each received dataset that a robot designates as a newly learned classification. In some implementations, the model trainer 502 may train the machine learning model 504 using data representing additional examples of classifications that the model 402 can already accurately recognize, e.g., using reinforcement learning. By training the machine learning model 504 on "new" and "known" datasets, the server system 112 can create an updated machine learning model 506 to accurately recognize objects from real-world observations, for both new object types and object types already predicted by the model.

In some implementations, the server system 112 transmits the updated machine learning model 506 to each robot 104A, 104B, and 104C over the network 110. In response to a robot 104A-104D receiving the updated machine learning model 506, the robot 104A-104D will remove the machine learning model 402 and use the updated machine learning model 506 in its place. From that point on, the robots 104A-104D use the updated machine learning model 506 and benefit from the improved accuracy that it provides.

When the robots 104A-104D receive the updated machine learning model 506, the robots 104A-104D clear their local caches 404A-404D. For example, the datasets 406A and 406B are deleted. The classifications represented by the datasets in the caches are now predicted directly by the updated model 506, and so the stored datasets are not needed. Further, since the datasets in the caches were generated using the old machine learning model 402, the embeddings from those datasets would be incompatible with the updated machine learning model 506. If there are some datasets that have not been shared by robots but have not yet been incorporated into the training of the updated machine learning model 506, the server system 112 may use the sensor data that the robots provided to generate embeddings using the updated machine learning model 506. The server system 112 can then send the updated data sets, having embeddings compatible for the updated model 506, to the robots 104A-104D for storage in the local caches and use alongside the updated model 506.

Figure 6:
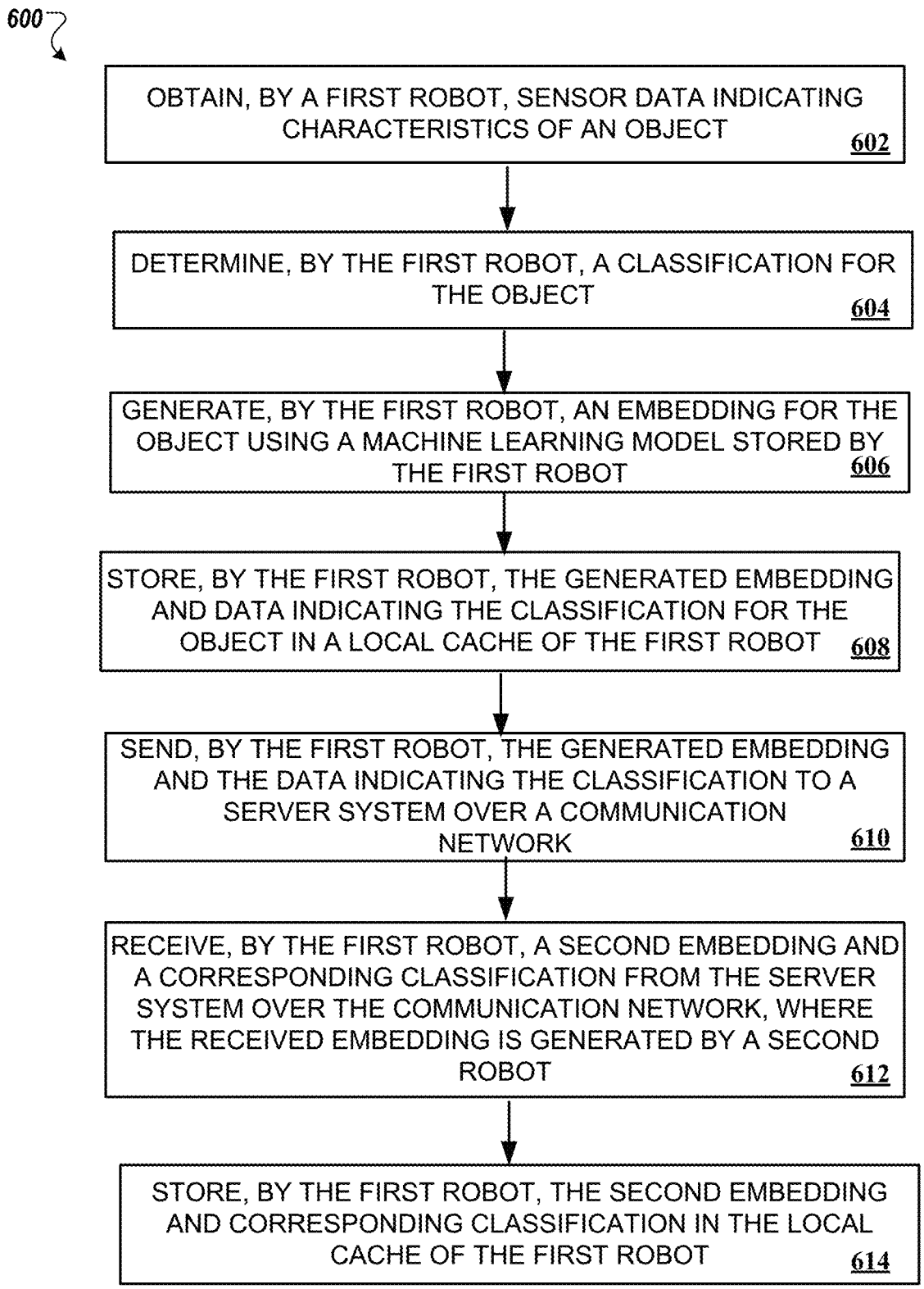
FIG. 6 is a flow diagram that illustrates an example of a process for sharing learned information among robots.

FIG. 6 is a flow diagram that illustrates an example of a process 600 for sharing learned information among robots. A first robot, such as robot 104A, may perform the process 600.

In the process 600, a first robot obtains sensor data indicating characteristics of an object (602). The robot may include sensors such as a camera, a LIDAR sensor, a proximity sensor, an infrared sensor, an accelerometer, a touch sensor, a microphone, and a position sensor, to name a few examples. For example, a robot can capture and learn the characteristics of the object from several different angles. The robot may move itself, or its sensors, to different positions to obtain these different views. The obtained characteristics may include shape, color, contour, texture, and depth information regarding the object. The robot can convert the obtained sensor data of the object to feature data in order for a machine learning model to process the feature data.

The robot determines a classification for the object (604). For example, a user may provide a classification for the object. The user can provide the classification of the object with voice input or text input to a client device 108. Alternatively, the user can provide the classification for the object by interacting with the robot itself. The classification can be a text label tagged to the object.

The robot generates an embedding for the object using a machine learning model stored by the first robot (606). The robot extracts feature data 122 from the sensor data for the object. The feature data may include a digital version of the sensor data, such as scores or values representing aspects of the sensor data, as understood by the machine learning model. For instance, the robot 104B provides the feature data 122 as input to its local machine learning model. The machine learning model processes the feature data to produce an embedding.

In some implementations, the machine learning model is a neural network model, and the embedding can be derived from output at an output layer of the neural network model. In other implementations, the embedding is derived from data indicating activations at a hidden layer of the neural network model. The specific values of the embedding can depend on the structure and training state of the machine learning model.

The robot stores the generated first embedding and data indicating the classification for the object in a local cache of the first robot (608). For example, the robot stores the generated first embedding and the classification label for the object in the local cache of the robot. In addition, the robot may store the corresponding sensor data of the identified object in the local cache with the generated first embedding and the classification label.

The robot sends the generated first embedding and the data indicating the classification to a server system over a communication network (610). The robot may also send metadata to the server system. The metadata may designate, for example, whether the first embedding is to be shared with other robots. The metadata may also information, such as a version code or identifier for the machine learning model used to generate the first embedding. As another example, the metadata may indicate a robot identifier for the robot, an identifier for a type or model of the robot or a role of the robot, and/or data indicating a group of robots that the robot belongs to. The server system can use this information to select which robots should receive the shared embedding, e.g., potentially limiting sharing to take place among robots in the same group, or robots of the same type, model, or role. In some implementations, the first embedding can be sent using an application programming interface (API) for sharing, so that first embedding and other data sent using that API are designated to be shared by virtue of being sent through the API.

The robot receives a second embedding and a corresponding classification from the server system over the communication network (612). The second embedding can be one that a second robot generated. For example, the embedding and corresponding classification that the second robot generated can be for an object that the first robot has not yet learned to recognize.

The robot stores the received embedding and the corresponding classification in the local cache of the robot (614). The robot can then use the embeddings and classifications in the cache, both for objects observed by the robot and for received data representing objects not observed by the robot, to recognize objects when performing tasks.

In some implementations, the robot can subsequently use the first embedding or the second embedding in the local cache to recognize one or more objects in an environment of the robot. When the robot uses the generated first embedding or the generated second embedding to recognize one or more objects in an environment, the robot generates sensor data describing a particular object that the robot observes in the environment of the robot. The robot generates an embedding for the particular object using the second machine learning model and the sensor data describing the particular object. The robot then compares the newly generated embedding for the particular object with the first embedding and the second embedding. The robot assigns a classification for the particular object based on the comparison of the embedding for the particular object with the generated first embedding and the generated second embedding. As noted above, if the embedding for the particular object is not within a threshold level of similarity (e.g., a vector distance between the embeddings is less than a maximum threshold) for any of the embeddings in the cache, the classification indicated by the machine learning model is used. On the other hand, if the embedding for the particular object is within the threshold level of similarity, or at least is similar enough that a confidence score indicates a better match than what the machine learning model indicates, the robot can use the classification corresponding to the most similar embedding in the cache as the classification for the particular object.

In some implementations, the robot can receive a second machine learning model from the server system over the communication network. The received second machine learning model can be one generated by the server system. The second machine learning model can be an updated machine learning model that has been updated based on the combined set of robot learning that occurred across the fleet over a previous time interval, e.g., the last week or month. The robot can use the second machine learning model to recognize one or more additional objects and previously identified objects. Additionally, the robot can remove embeddings generated using the first machine learning model from its local cache.

Figure 7:
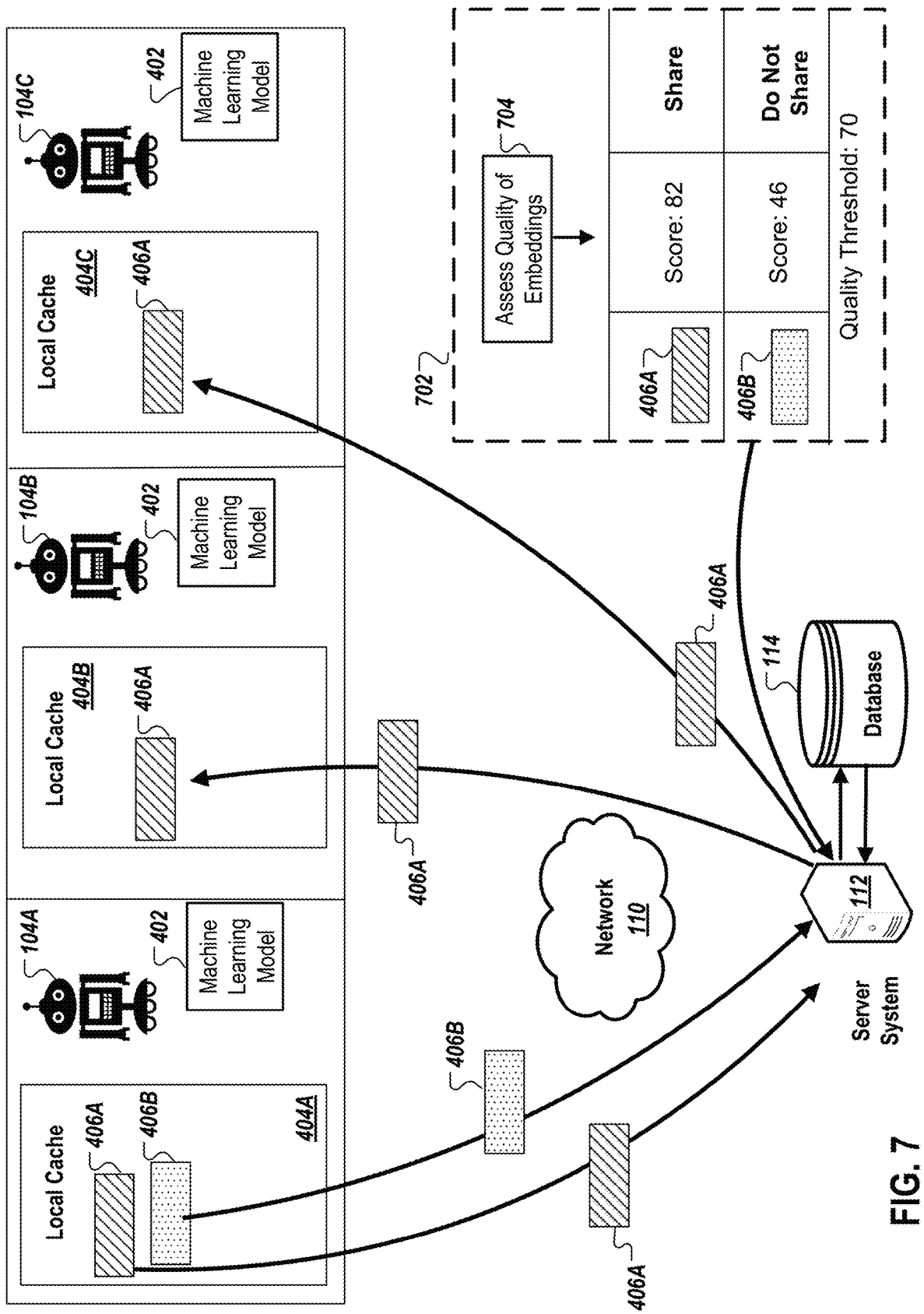
FIG. 7 is a block diagram that illustrates an example of a system for selectively sharing learned information among robots.

FIG. 7 is a block diagram that illustrates an example of a system 700 for selectively sharing learned information among robots. As discussed above, it is advantageous for robots to share information they learned, so that all the robots in a fleet can learn more rapidly and improve their abilities. However, some information that robots learn may be of low quality, for example, incorrect or conflicting information. Propagating low-quality information throughout a fleet of robots could diminish performance or introduce errors in robot perception. Similarly, training machine learning models with low-quality information could degrade model accuracy. To ensure that the sharing of robot learning improves performance, a computing system can evaluate the information that robots learn and limit sharing of information to items that are beneficial to the fleet. The computing system can also set quality thresholds and quality checks for the training of machine learning models, so that updates to the models improve performance and are based on valid examples. These evaluation and filtering steps can also provide a measure of security by blocking malicious or intentionally incorrect information from propagating between robots and degrading robot performance.

In FIG. 7, the server system 112 evaluates the datasets that robots 104A-104D have uploaded. The server system 112 only distributes datasets that pass certain quality tests. Similar to FIG. 4, each robot 104A-104C includes a local cache 404A-404C, respectively. Each robot 104A-104C also stores and uses the same machine learning model 402. Unlike FIG. 4, the server system 112 does not automatically share uploaded datasets with the other robots, but instead verifies the quality (e.g., accuracy) of a dataset before distributing it to other robots.

In the example, robot 104A transmits newly acquired datasets 406A and 406B to the server system 112 over the network 110. The robot 104A can designate each dataset 406A and 406B as information that can be shared with the server and with other robots. The server system 112 will evaluate these datasets 406A and 406B to determine whether they should be shared, e.g., transmitted to the other robots 104B and 104C. In some implementations, sharing can be performed to a group of robots using an access control list, to robots within a domain, or to each of the robots in the fleet. To avoid tampering, the robots 104A-104D may encrypt the datasets 406 or securely sign the datasets 406, so that the server system 112 can securely receive the transmitted datasets 406.

Before the server system 112 distributes the datasets 406A and 406B to the other robots 104B and 104C, the server system 112 can assess the quality of the datasets 406A and 406B, based at least in part on the embeddings in the datasets. The server system 112 can also store the datasets 406A and 406B in the database 114.

The server system 112 can include a quality assurance system 702 that provides a quality assessment of each dataset received from the robots 104A-104D. The quality assurance system 702 includes a quality analysis module 704 that analyzes each embedding received from the robots 104A-104D. The quality analysis module 704 produces a quality score that indicates the quality of the embedding in the dataset 406. How the quality analysis module 704 analyzes the embedding in the dataset 406 and produces a quality score that indicates the quality of the embedding will be further explained below. For example, the quality analysis module 704 produces a quality score of "82" for the dataset 406A. Additionally, the quality analysis module 704 produces a quality score of "46" for the dataset 406B. In response to determining the quality scores corresponding to the embedding in the dataset, the quality analysis module 704 compares each of the determined quality scores to a quality threshold.

The quality assurance system 702 can store and apply a quality threshold to the datasets being assessed. The quality threshold may be predefined or may be dynamically set according to the data assessed. As shown in FIG. 7, the quality analysis module 704 sets the quality threshold to "70," meaning that individual datasets may be required to have a quality score of at least this minimum value before they can be distributed to other robots.

The quality analysis module 704 compares the quality score of each dataset 406 to the quality threshold. If the quality analysis module 704 determines that the quality score is greater than or equal to the quality threshold value, then the quality analysis module 704 allows the server system 112 to transmit the dataset to other robots 104A-104D. If the quality analysis module 704 determines that the quality score is less than the quality threshold value, the dataset is not transmitted. In some implementations, the quality analysis module 704's indication to share or not share the dataset 406 is stored in the database 114.

For example, the quality analysis module 704 compares the quality score of "82" for dataset 406A to the quality threshold "70." The quality analysis module 704 determines that the quality score of "82" for the dataset 406A is greater than the quality threshold of "70." As a result, the quality analysis module 704 indicates to the server system 112 to share the dataset 406A.

The quality analysis module 704 also compares the quality score of 46 for dataset 406B to the quality threshold "70." The quality analysis module 704 determines that the quality score of "46" for the dataset 406B is less than the quality threshold of "70." As a result, the quality analysis module 704 indicates to the server system 112 to not share the dataset 406B.

According to the evaluation of the datasets, the server system 112 selectively transmits the datasets to the robots 104B and 104C. For example, the quality analysis module 704 determines to share the dataset 406A and not to share the dataset 406B based on the comparison of their respective quality scores to the quality threshold. As shown in FIG. 7, the server system 112 transmits the dataset 406A to the robots 104B and 104C. Each robot 104B and 104C then stores the dataset 406A in a respective local cache 404B, 404C. In some implementations, the quality analysis module 704 can provide an indication, to the robot 104A that transmitted it, that the transmitted embedding was of a particular quality. For example, the indication can indicate that the transmitted embedding was of a low quality or of a high quality. By indicating the quality level or a quality score, the robots 104A-104D can appropriately weight the dataset 406A, e.g., to give more or less credibility to the classification it specifies.

The server system 112 can instruct the robots 104A-104D to store the dataset 406A in its local cache. For example, the designation could include a data flag, a label, an instruction, a version number of a local cache, and an indicator in a message header that is transmitted to the robots 104A-104D. Version numbers can be provided for individual datasets, for the state of the cache as a whole, and/or to indicate the state of the machine learning model used to generate the embedding in a dataset. By specifying the appropriate version of cache contents, if a robot cancels an update or loses connectivity partway through, the server system can check the version of the most recently completed cache update to determine what updates are needed for a robot. In other examples, the server system 112 specifies that the dataset 406A should be cached by transmitting the dataset 406A over a certain source, port, or particular API. The version number of the local cache allows the robots 104A-104D to track what embeddings should included in the local cache. The server system 112 can verify the embeddings stored in the local cache of each robot 104A-104D based on the version number of the local cache.

The server system 112 may synchronize the datasets in the local caches between each of the robots 104A-104D. The server system 112 can periodically synchronize the local caches between each of the robots 104A-104D on a daily basis, weekly basis, or a monthly basis. The server system 112 synchronizes the local caches by retrieving the datasets from each of the robots 104A-104D. The server system 112 distributes the retrieved datasets from each of the robots 104A-104D such that each of the robots 104A-104D includes datasets from each of the other robots 104A-104D. As a result, each of the robots 104A-104DA through 104D, include the same datasets after each synchronization.

Figure 8:
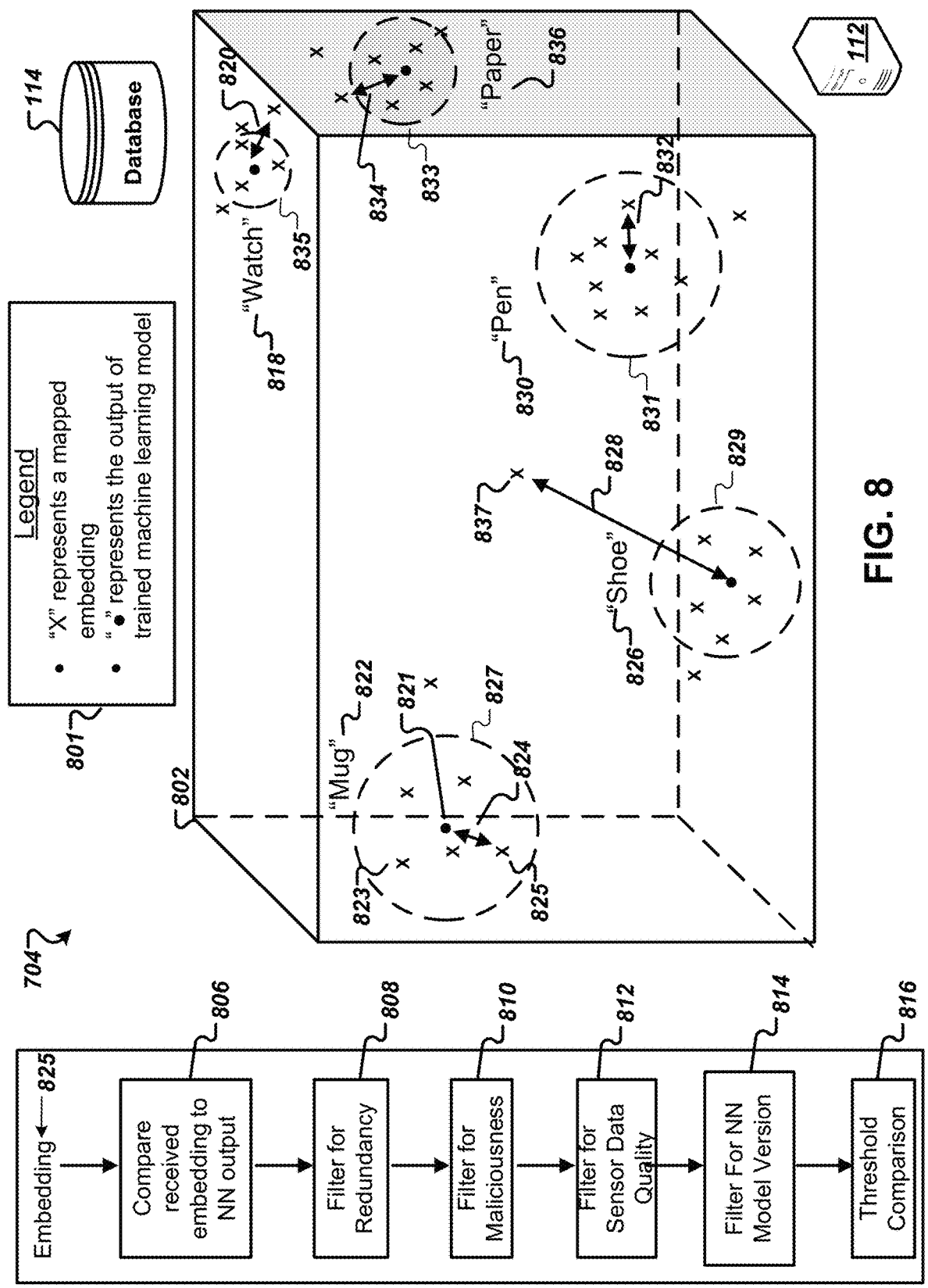
FIG. 8 is a block diagram that illustrates an example of a system for assessing the quality of information learned by robots.

FIG. 8 is a block diagram that illustrates an example of a quality analysis module 704 to assess the quality of the information from robots. The quality analysis module 704 assesses the quality of the received embedding information from the robots 104A-104D. The quality analysis module 704 assesses the datasets by evaluating and filtering the datasets using various criteria. For instance, the various criteria may include accuracy of classification, consistency with reference data, and redundancy with respect to other datasets, to name a few examples.

One technique that the quality analysis module 704 can use to evaluate datasets is to map embeddings to a high-dimensional space, e.g., a vector space, and assess the relative positions of the embeddings in the space. In general, embeddings encode characteristics of objects, and so embeddings for the same type of object should be similar. This will generally result in the embeddings for the same type of object being roughly clustered together in the high-dimensional space. The separation between clusters can be indicative of discrimination between the object types represented by embeddings in the clusters. These properties can be used to evaluate the quality of datasets that robots 104A-104D upload to the server system 112. For example, an embedding for an object may be assessed to determine whether the embedding is appropriately close to other embeddings for the same object type, and at least a reasonable distance away from embeddings for different object types.

The quality analysis module 704 maps the received embeddings in the datasets 406 to the high-dimensional space 802. The high-dimensional space 802 may be an N-dimensional space, where N represents the number of dimensions (e.g., number of values) in each embedding. For example, each embedding in a dataset may be a 128-element array of 64-bit values, and so may be compared to other embeddings in a 128-dimensional space. Other N-dimensional spaces are possible, depending on the number of dimensions provided in the embedding.

The illustration provided in FIG. 8 shows a legend 801 to explain plotted elements. The illustration of the high-dimensional space 802 shows mapped embeddings with each embedding represented by an "X". Reference points "•" are also shown to represent the positions of embeddings verified as representing a certain object type. To obtain reference data for assessing quality of newly learned classifications, training data or other high-quality examples can be provided to a machine learning model and used to generate embeddings. For example, an image known to show a cup and accurately classified by the machine learning model to be a cup can be used to generate an embedding for the "cup" object classification. This embedding, known to be a correct representation for a cup, can serve as a reference point in the high-dimensional space 802 against which other embeddings can be compared.

When the server system 112 receives a dataset from a robot, the quality analysis module 704 performs various steps to assess the quality of the dataset. For example, the quality analysis module 704 can compare the received embedding 825 with other embeddings, whether from datasets uploaded by other robots or reference embeddings having known correct classifications.

The quality analysis module 704 can filter the received embedding 825 for redundancy in step 808, filter the received embedding 825 for maliciousness in step 810, filter the received embedding 825 for sensor data quality in step 812, and filter the received embedding 825 for the machine learning model version in step 814. Finally, the quality analysis module 704 applies a threshold comparison in step 816 on the received embedding 825.

For example, the received embedding 825 to the embeddings generated using the machine learning model. The high-dimensional space 802 includes regions that correspond to various objects. For example, the high-dimensional space 802 includes a region 818 that includes embeddings for object type "Watch," a region 822 that includes embeddings for object type "Mug," a region 826 that includes embeddings for object type "Shoe," a region 830 that includes embeddings for object type "Pen," and a region 836 that includes embeddings for object type "Paper."

The quality analysis module 704 maps the received embedding 825 to a location in the high dimensional space 802. The closer the quality analysis module 704 maps the received embedding 825 to one of the regions in the high-dimensional space 802, the higher likelihood that the received embedding 825 represents the object described by that region in the high dimensional space 802. For example, the quality analysis module 704 maps the received embedding 825 in a location nearest to the region 822 that includes embeddings for object type "Mug." Due to the received embedding 825's proximity to the center of the region 822, a greater likelihood exists that the received embedding 825 represents a "Mug."

In some implementations, the received embedding 825 is compared to a reference embedding derived from the machine learning model 402 stored on the server system 112. For example, the reference point "•" in the region 822 that represents a "Mug" object illustrates a verified accurate embedding for the object "Mug." This reference point represents an embedding derived from the machine learning model 402 stored on the server system 112. The quality analysis module may determine one or more reference embeddings for each object type that the machine learning model 402 the ideal embedding for each object defined in the high dimensional space 802 produced by the machine learning model 402 on the server system 112. Specifically, the criteria check 804 determines the ideal embedding through analyzing various embeddings stored on the database 114 that represents the same object, such as a "Mug." For instance, the criteria check 804 may use an average of the various embedding outputs to determine the ideal embedding. In another instance, the criteria check 804 may select one of the various embeddings to represent the ideal embedding. In another instance, the criteria check 804 may use a heuristic, Bayesian, or any other type of statistical model to determine the ideal embedding. The quality analysis module 704 stores the ideal embedding in the database 114 for further comparison.

In some implementations, the quality analysis module 704 determines which ideal embedding the received embedding 825 most closely corresponds to in the high dimensional space 802. For example, the quality analysis module 704 can employ a nearest neighbor algorithm to determine which ideal embedding the received embedding 825 is in nearest proximity to in the high dimensional space 802. The quality analysis module 704 compares the received embedding 825 to the ideal embedding for a "Watch" 818, to the ideal embedding for a "Mug" 822, to the ideal embedding for a "Shoe" 826, and to the ideal embedding for a "Pen" 830. As a result, the quality analysis module 704 determines the received embedding 825 is in nearest proximity to the ideal embedding for a "Mug" 822.

In some implementations, the quality analysis module 704 compares the classification label corresponding to the received embedding to the label corresponding to the ideal embedding in nearest to the received embedding. For instance, the ideal embedding for the classification label of a "Mug" may be in nearest proximity to the received embedding 825 that includes a classification label of "Mug." Alternatively, the quality analysis module 704 may compare the received embedding with one or more other embeddings that correspond to two different classification labels. In response, the quality analysis module 704 may omit one or both of these embeddings considering that both embeddings are within proximity to one another and yet include different classification labels. The quality analysis module 704 may omit one or both of these embeddings by not sharing with the other robots 104A-104D, not storing in the database 114, or not using to train the machine learning model 506.

Then, the quality analysis module 704 measures and compares the distance 824 between the received embedding 825 and the ideal embedding point 821 to a threshold value. For example, the quality analysis module 704 uses a vector measurement to determine the vector distance 824 between the received embedding 825 and the ideal embedding point 821. If the quality analysis module 704 determines the vector distance 824 is greater than the threshold value, the quality analysis module 704 discards the received embedding 825 and waits for the next received embedding from a robot 104 or the database 114. Otherwise, the quality analysis module 704 proceeds to the next process.

In some implementations, the quality analysis module 704 filters the received embedding 825 for redundancy in 808. Rather, it is important for the database 114 to store different embeddings to ensure the robots 104A-104D have a more diverse set of data to improve identification of similar and varying objects.

In some implementations, the quality analysis module 704 filters the received embedding 825 to avoid insecure or malicious inputs in step 810. For example, the quality analysis module 704 may determine whether an embedding has been tampered with or assigned an incorrect classification. The user 106 may have entered the wrong classification label for an object, for example, may have taught a robot to provide an erroneous classification for an object. In some instances, a dataset may be falsified, in which the correct embedding may be replaced with a different one. The quality analysis module 704 may detect these errors or mis-classifications in datasets by comparing the received embedding with a reference embedding for the same classification. For example, if the received embedding is classified as a cup, but the vector distance from an embedding for a cup that is known to be correct, the dataset can be determined to be in error. Similarly, the server system 112 can use sensor data uploaded with a dataset to generate a corresponding embedding. If the embedding does not match the embedding that was uploaded, then the server system 112 may determine that the embedding may have been falsified.

In some implementations, the quality analysis module 704 filters the received embedding 825 for sensor data quality (step 812). The quality analysis module 704 checks for sensor data quality by analyzing whether an image is too dark, too bright, out of focus, or if the image is not included in the feature data of the dataset. Additionally, the quality analysis module 704 checks for an obstruction of a detected object in the image and any inconsistencies between shape of depth information and the image data. The quality analysis module 704 also checks for missing sensor information, time stamps, GPS location information in the additional metadata, and an existence of the additional metadata.

In some implementations, the quality analysis module 704 may assess whether the image is too dark or too bright, for example, by determining a mean luminance. In some implementations, the quality analysis module 704 may execute assess whether the image data is out of focus or blurry. For example, the application may perform edge detection or perform a discrete Fourier transform (DFT) to assess image quality. If these processes show poor edge contrast or a low amount of high frequencies, the image data and the dataset as a whole may be considered unsatisfactory and not used for training the model.

In some implementations, the quality analysis module 704 may utilize an external server for external validation of the image data. For instance, the external server may execute an image recognition process or shape recognition process to classify an object in the image data. The quality analysis module 704 may transmit the image data and corresponding classification label from the dataset 406 to the external server to see if the results of the image recognition process or the shape recognition process agrees with the corresponding classification label. If the results of the image recognition process or the shape recognition process matches with the corresponding classification label, the quality analysis module 704 may pass the dataset 406 to the process in 814.

If the results of the image recognition process or the shape recognition process do not match with the corresponding classification label, then the server system 112 may send a notification to the client device 108 of the user 106 that an incorrect classification label exists for the embedding. As such, the server system 112 may request an edit to the classification label from the user 106. Alternatively, the server system 112 can provide updates to the image recognition process or the shape recognition process if their results are incorrect and the classification label provided in the dataset 406 is correct.

In some implementations, the quality analysis module 704 filters the received embedding 825 for the machine learning model version number in 814. For instance, the quality analysis module 704 analyzes the additional metadata in the dataset 406. As previously mentioned, the additional metadata in the dataset 406 includes a version code number of the current machine learning model stored on the robot 104 that transmitted the dataset 406. The additional metadata can also include locational information corresponding to whether the robot 104 identified the object represented by the embedding. Additionally, the additional metadata can also include a description of how the robot 104 determined the classification of the identified object, such as with user input or with comparison to other classification labels and corresponding embeddings stored in the local cache of robot 104.

In some implementations, the quality analysis module 704 compares the retrieved version code number of the current machine learning model stored on the robot 104 to the version number of the machine learning model stored on the machine learning model 402 on the server system 112. If the quality analysis module 704 determines the version numbers between the two machine learning models (e.g., the machine learning model on the robot 104 and the machine learning model on the server system 112) matches (e.g., indicating the same machine learning model exists on both the robot 104 and the server system 112), then the quality analysis module 704 proceeds to the next process. Otherwise, the quality analysis module 704 indicates that the robot 104, such as robot 104A that transmitted dataset 406A, does not include the latest machine learning model 402 to the server system 112. As such, the criteria check 804 discards the dataset 406A. Additionally, the server system 112 transmits the machine learning model 402 to the robot 104A. In response, the robot 104A will remove its machine learning model 402 from memory and erase the datasets in its local cache 404A. In some implementations, the server system 112 transmits an instruction to the each robot 104 to erase the datasets in their respective local cache. The instruction may be included with the transmitted machine learning model 402. In other implementations, the server system 112 transmits the instruction as an individual message. In response to a robot 104 receiving the instruction, the robot 104 erases the contents of its local cache.

In some implementations, the quality analysis module 704 filters the received embedding 825 by comparing a location of the received embedding 825 in the high dimensional space 802 to a threshold value in 816. For instance, each region in the high dimensional space 802 that defines an object, such as region 822 that defines a "Mug," region 818 that defines a "Watch," region 836 that defines a "Paper," region 830 that defines a "Pen," and region 826 that defines a "Shoe." Each of the regions include a threshold region for filtering purposes. For example, threshold region 827 for the "Mug" object, threshold region 829 for the "Shoe" object, threshold region 831 for the "Pen" object, threshold region 833 for "Paper" object, and threshold region 835 for "Watch" object. Each threshold region defines an N-dimensional region surrounding the ideal embedding for the object type, which allows for an acceptable embedding of the same object type.

In some implementations, the quality analysis module 704 measures a vector distance between a location of the received embedding 825 to a location of the ideal embedding closest in proximity to the location of the received embedding 825 in the high dimensional space 802. This procedure allows the quality analysis module 704 to determine which ideal embedding is in closest proximity to the received embedding 825 in the high dimensional space 802. Once the ideal embedding is determined that is closest to a location of the received embedding 825, the quality analysis module 704 determines whether the location of the received embedding 825 falls within the threshold region corresponding to the ideal embedding. For example, the quality analysis module 704 determines the received embedding 825 is in nearest proximity to the region 822 that defines a "Mug." As a result, the quality analysis module 704 determines whether the location of the received embedding falls within the threshold region 827 for the "Mug." As illustrated in FIG. 8, the received embedding 825 falls within the threshold region 827 and passes step 816. Alternatively, if the embedding fell outside of the threshold region corresponding to the closest ideal embedding, the quality analysis module 704 discards the dataset 406 that includes that embedding.

In other implementations, the quality analysis module 704 may designate the embeddings that fall within a threshold region, such as threshold region 827, as embeddings to transmit to the robots 104A-104D. This is because these embeddings indicate a higher likelihood of representing an object inside the threshold region 827. As a result, quality analysis module 704 selects the embeddings found outside the threshold region 827 to be stored in the database 114. In some implementations, the quality analysis module 704 designates the embeddings found outside the threshold region, such as threshold region 827, to not be used train the machine learning model 506. In some implementations, the quality analysis module 704 will discard any embeddings that exist outside a threshold distance from the ideal embedding. For example, the location of embedding 837 exists outside of a threshold distance from each region in the high dimensional space 802. The distance 828 between the ideal embedding of a "shoe" region and the embedding 837 makes As such, the quality analysis module 704 will discard the dataset corresponding to embedding 837.

In some implementations, the quality analysis module 704 produces a quality score indicative of the quality of the embedding of the received embedding 825 passes each of the steps 806 through 816 in the quality analysis module 704. The quality score represents how confident the quality analysis module 704 is that the received embedding represents an object, such as a "Mug" or "Pen."

In some implementations, the quality analysis module 704 produces the quality score based on the processes performed by the quality analysis module 704 to assess the quality of the embedding. For example, as discussed in 806, the quality analysis module 704 utilizes the closeness of the location of the received embedding 825 to a region in the high dimensional space 802 that defines on object type to generate a proximity score. The closer the location of the received embedding 825 to the location of the ideal embedding for that region, the higher the proximity score. Likewise, the farther away the location of the received embedding 825 to the location of the ideal embedding for that region, the lower the proximity score. The quality analysis module 704 provides the proximity score as a quality score to the quality assurance system 702 for further comparison to the quality threshold.

In other examples, the quality analysis module 704 produces the quality score based on other criteria. The other criteria includes a level quality of feature or sensor data provided by the robot 104 for the corresponding dataset 406. The other criteria can also include the consistency of embeddings in proximity to the received embedding 825 in the high dimensional space 802. For example, how close the embedding values are to one another; how close the characteristics of the feature data corresponding to each embedding in proximity to the received embedding 825 corresponds to one another, and an identification of the robot that provided the embedding.

In some implementations, the quality analysis module 704 can produce the quality score of the received embedding 825 based on how the received embedding 825 changes the accuracy of the machine learning model 506. If the received embedding 825 increases the accuracy of the machine learning model 506, then the quality analysis module 704 may generate a higher value quality score. Alternatively, if the received embedding 825 decreases the accuracy of the machine learning model 506, then the quality analysis module 704 may generate a lower value quality score. In some implementations, the accuracy of the machine learning model 506 may adjust for a particular object type as received by the embedding 825.

In some implementations, the quality analysis module 704 may adjust the quality score of the received embedding 825 if the corresponding classification label includes personalized information. For instance, if the classification label of the received embedding 825 includes personalized aspects such as "my favorite spoon," "john's toy," or "Brian's glasses." The quality analysis module 704 may search for key phrases in the classification label such as "my" or any name that indicates a personalized aspect of the object represented by the received embedding 825. The quality analysis module 704 may adjust the quality score by increasing a value of the quality score if a personalized aspect is recognized.

In some implementations, a robot 104 may have a history corresponding to the type of dataset 406 provided. For instance, robot 104C may have a history of providing higher quality embeddings while robot 104A may have a history of providing lower quality embeddings. The lower quality embeddings provided by robot 104A over time may indicate that the robot 104A includes a bad component, such as a broken camera. Alternatively, the lower quality embeddings provided by robot 104A may indicate a required update to its locally stored machine learning model 402. As a result, the quality analysis module 704 adjusts the quality score for that received embedding 825 based on a determination of the robot 104's history for providing high or low quality datasets 406.

Figure 9:
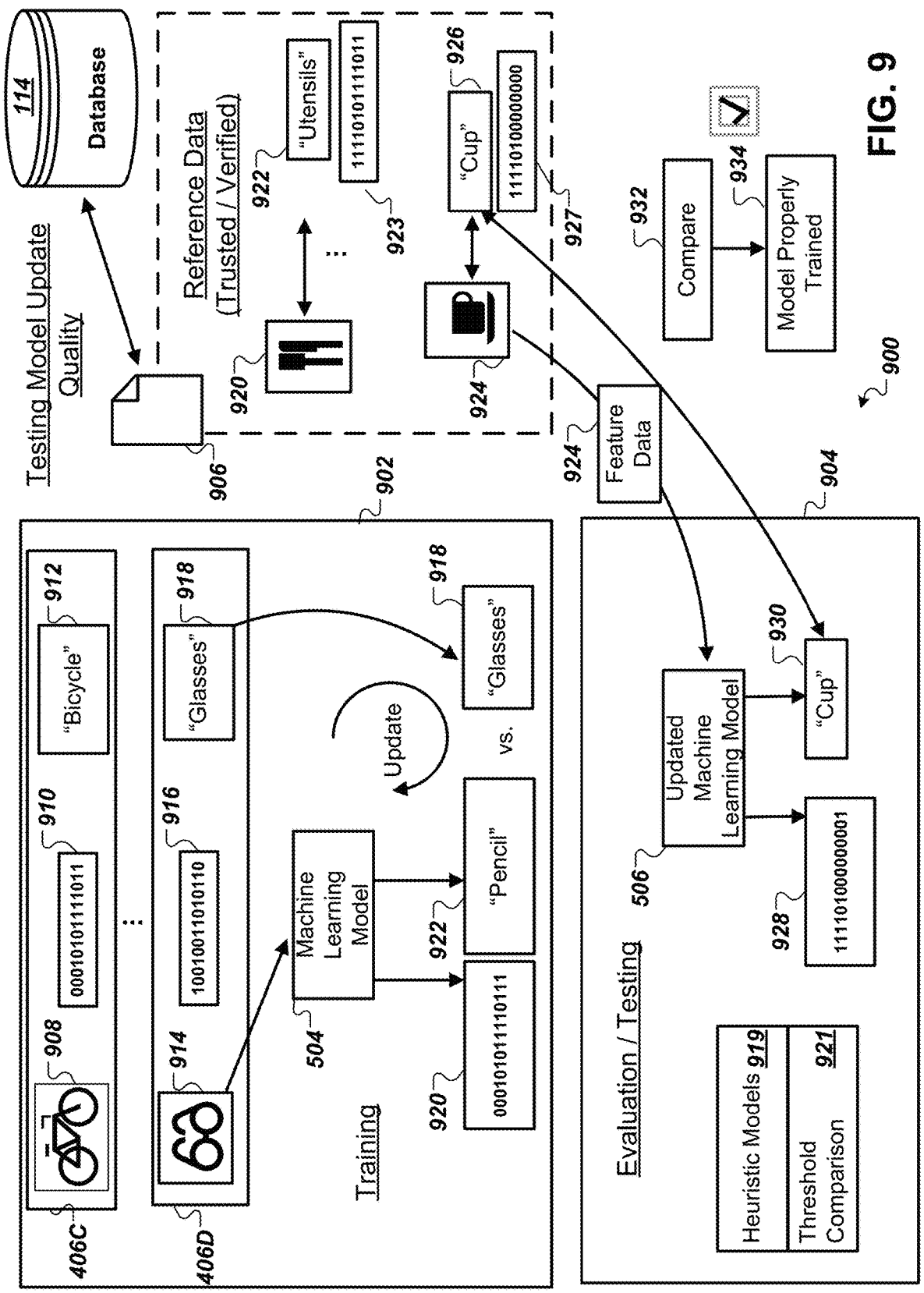
FIG. 9 is a block diagram that illustrates an example of a system for testing a machine learning model.

FIG. 9 is a block diagram that illustrates an example of a system 900 for testing a machine learning model 506. The machine learning model 506 represents an updated version of the machine learning model 402 used in FIG. 7. Once a set of high-quality datasets is identified, and the machine learning model 506 is trained to incorporate the classification information represented in those datasets. The machine learning model 506 is tested after training, or as a part of training. The testing has the general purpose of verifying the accuracy of the machine learning model 506. For example, testing can assess whether training effectively achieved the goal of teaching the machine learning model to classify the new types of objects indicated in the datasets uploaded by the robots. If the machine learning model 506 does not provides an accurate classification in response to the input data for a data set (e.g., provides a classification that is different from the one learned by the robot), then the training may continue until the machine learning model 506 can accurately classify the object.

As another example, testing can determine whether the machine learning model 506 maintains an appropriate level of accuracy for classifying objects that it could previously classify. Training the model should improve accuracy not diminish it, so the server system 112 can enforce rules that training should not degrade performance with some or all categories of objects. If training has decreased the ability of the machine learning model to accurately classify objects of a particular type, the server system 112 may continue training and use examples of the particular type. This testing and continued training can provide a well-rounded model that is not improperly swayed by new training examples. This way, the performance of a model can steadily improve over time, since users would not want object recognition performance to diminish over time or fluctuate depending on the object type from one update to the next.

The system tests the quality of the machine learning model 506 in a training module 902 and an evaluation/testing module 904. The system tests the machine learning model 506's quality by providing data from datasets 406 to the machine learning model 506 stored on the server system 112 and in response, assessing the output of the machine learning model 506.

In some implementations, the system provides data from the datasets 406 provided by the robots 104A-104D each time the robot learns of a new object. A robot, such as robot 104C, may learn of an object, such as a "picture," that its local machine learning model 402 has not yet learned to identify. The output of the machine learning model 402, or a layer of the machine learning model 402, can produce a new embedding that the robot 104C does not yet understand. This is because the robot 104C is learning a "picture" object for the first time. The robot 104C requests for a classification label for this new object from the user 106. The user 106 provides a classification label "picture" for the object "picture" and the robot 104C corresponds the newly received classification label with the newly produced embedding and feature data captured by the robot 104C in a dataset 406. The robot 104C provides the dataset 406 to the server system 112 to provide to the other robots and to update the machine learning model 506 stored on the server system 112.

In some implementations, the system provides data from the datasets 406 retrieved from the database 114 to test the output or a hidden layer of the machine learning model 506 stored on the server system 112. After the server system 112 trains the machine learning model 506 to detect the new datasets 406 provided by the robots 104A-104D, the server system 112 verifies the datasets 406 derived from the machine learning model 506. The server system 112 performs this verification with the datasets 406 from the database 114 to ensure the correct embedding and classification output can be derived from the machine learning model 506. In some implementations, once the server system 112 determines the correct output can be properly derived from the machine learning model 506, the server system 112 provides the machine learning model 506 to the robots 104A-104D.

In some implementations, training module 902 seeks to train the machine learning model 506 with newly received datasets 406. For example, robot 104A provides a dataset 406C for a "bicycle" object and robot 104B provides a dataset 406D for a "glasses" object. The dataset 406C includes feature data 908, an embedding 910, and a classification label 912 representing the "bicycle" object. The dataset 406D includes feature data 914, an embedding 916, and a classification label 918 representing the "glasses" object.

In some implementations, the server system 112 provides feature data from each of the datasets 406 to the machine learning model 506. For example, the server system 112 provides the feature data 914 of the "glasses" object to the machine learning model 506. As illustrated in the training module 902, a layer of the machine learning model 506 can produce an output that includes an embedding 920 and a corresponding classification label 922. The server system 112 compares the output classification label 922 denoting a "pencil" to the corresponding classification label 918 provided in the dataset 406D. The results of the comparison do not match, as the classification label 922 denoting a "pencil" is not the same as the classification label 918 denoting "glasses." In response, the training module 902 updates the machine learning model 506.

In some implementations, the training module 902 updates the machine learning model 506 by providing the received feature data 914 of "glasses" and the classification label 918 denoting "glasses" as input to the machine learning model 506. In response, the machine learning model 506 produces an embedding 920 that corresponds to the classification label 918 denoting "glasses." The server system 112 stores the feature data 914, the produced embedding 920, and the classification label 918 denoting "glasses" in the database 114. Then, the training module 902 provides the next subsequent dataset, dataset 406C, to the machine learning model 506 to evaluate its output at a particular layer.

In some implementations, the evaluation module 904 evaluates the output at a particular layer of a machine learning model 506. After the training module 902 trains the machine learning model 506, the evaluation module 904 evaluates the newly machine learning model 506 with data stored in the database 114. The data stored in the database 114 includes reference data that is trusted and verified by previous machine learning model versions. The reference data includes a classification label corresponding to an embedding and feature data. For example, reference data can include a classification label for a "cup" object, an embedding of the "cup" object, and feature data captured by a robot 104 describing the "cup" object. The evaluation model 904 is required to evaluate the machine learning model 506 because the machine learning model 506 must be backwards compatible. For instance, the machine learning model 506 can identify a "cup" object, a "plate" object, and a "fork" object. The training module 902 may then train the machine learning model 506 to identify a "camera" object. After the training module 902 trains the machine learning model 506 to recognize the "camera" object, the newly machine learning model 506 needs to be evaluated to ensure it can still recognize the "cup" object, the "plate" object, the "fork" object, and now the "camera" object.

In some implementations, the reference data can include a high quality data set. The high quality data set can include a high quality embedding that nearly represents the ideal embedding. The high quality embedding can be indicated in the database 114 by an indicator. The high quality embedding can include high quality image data, high quality RGBD data, a high quality embedding, or a combination of data.

In some implementations, the evaluation module 904 retrieves feature data 924 of data 906 from the database 114. The data 906 includes similar data found in the dataset 406 for a particular object. For instance, the data 906 for a particular object such as "utensils" includes feature data describing of utensils, a classification label 922 of "utensils", and an embedding 923 that represents utensils. In another example, the data 906 for a "cup" object includes feature data 924 of a cup, classification label 926 of a "cup", and an embedding 927 that represents a cup. The evaluation module 904 provides the feature data 924 of a cup as input to the machine learning model 506. The trained machine learning model 506 produces an embedding 928 and a corresponding classification label 930.

In some implementations, in order to evaluate the machine learning model 506, the evaluation model 904 performs tests under comparison module 932 to compare the embedding 928 produced by the machine learning model 506 to one or more embeddings of a similar object type stored in the database 114. If the results match, the evaluation model 904 may determine the machine learning model 506 can properly recognize the particular object and proceed to test the next object from the database 114.

In some implementations, the comparison module 932 includes a test for the evaluation module 904 to evaluate the quality of the machine learning model 506 using heuristic models 919. In addition, the comparison module 932 includes a test for the evaluation module 904 that utilizes a threshold comparison 921. For instance, the evaluation model 904 may compare the embedding 928 with the embeddings stored in the database 114 using one or more heuristic models. The database 114 may store multiple embeddings for the "cup" object. The evaluation model 904 may use the one or more heuristic models to compare the embedding 928 produced by the machine learning model 506 to the multiple embeddings in the database 114. As a result, the evaluation module 904 can determine whether the machine learning model 506 produced a correct embedding 928.

In some implementations, the evaluation model 904 may use a threshold comparison 921 to determine whether the machine learning model 506 produced a correct embedding 928. For instance, the evaluation model 904 may use a vector comparison to compare the bits or bytes between the embedding 928 and each embedding in the database 114 that represents a "cup" object. The evaluation model 904 may set a threshold, such as no more than 10 rows between the two embeddings can be different for example, in order for the embedding 928 to pass the assessment test. The evaluation model 904 can set other threshold comparison values. The evaluation model 904 utilizes the threshold comparison test 921 to determine whether the machine learning model 506 produced a correct embedding 928.

In some implementations, the evaluation model 904 provides an indication 934 to the server system 112 after evaluating the machine learning model 506. The indication 934 can indicate the machine learning model 506 is properly trained. As a result, the server system 112 can transmit the machine learning model 506 to the robots 104A-104D for storage.

Alternatively, the indication 934 can indicate the machine learning model 506 did not recognize one or more objects from the database 114. For example, the machine learning model 506 recognized the "cup" and the "utensils" objects but did not recognize the "glasses" object. As a result, the server system 112 provides the machine learning model 506 to the training module 902 to retrain the machine learning model 506 to detect the "glasses" object. In addition, the machine learning model 506 may not recognize multiple objects, and the training module 902 can be used to retrain the machine learning model 506 to detect each of the multiple objects. Once the evaluation module 904 creates an indication 934 that the machine learning model 506 is properly trained, then the server system 112 transmits the machine learning model 506 to the robots 104A-104D.

In some implementations, the server system 112 transmits the machine learning model 506 to each of the robots 104A-104D to replace a machine learning model 504 stored on each of the robots 104A-104D. The robots 104A-104D remove their previous machine learning model 504 in response to receiving the machine learning model 506 from the server system 112. In addition, the robots 104A-104D clear the datasets 406 from their respective caches.

Figure 10:
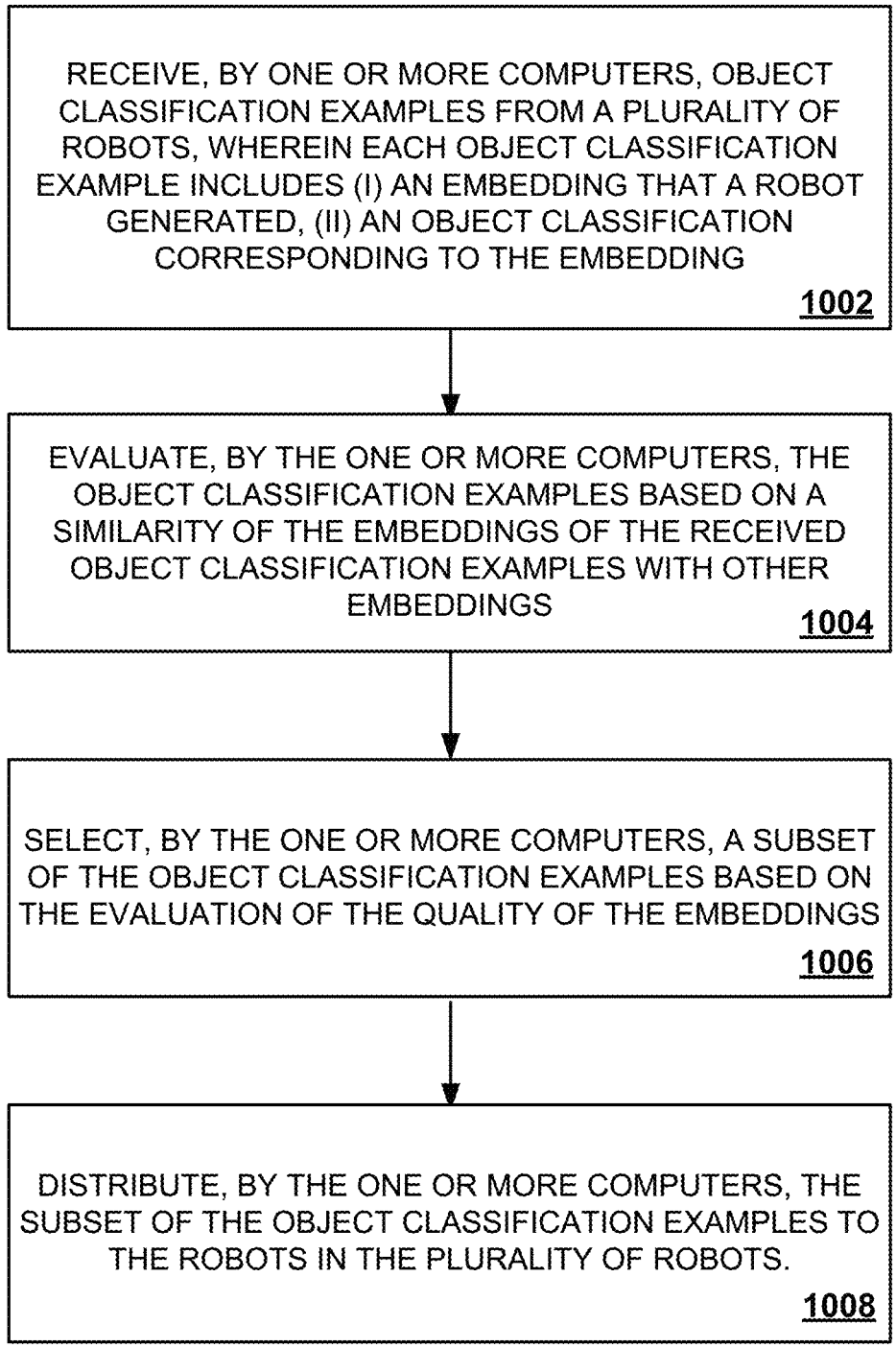
FIG. 10 is a flowchart that illustrates an example of a process for assessing and sharing information learned by robots.

FIG. 10 is a flowchart that illustrates an example of a process 1000 for assessing and sharing information learned by robots. The process 1000 may be performed by one or more computers. For simplicity, the process is described as being performed by the server system 112, but any appropriate computing system or combination of computing systems can be used.

In the process 1000, the server system 112 receives object classification examples from a plurality of robots (1002). Each object classification example can include (i) an embedding that a robot generated using a machine learning model, and (ii) an object classification corresponding to the embedding. Each robot 104A designates each dataset 406 as "new," indicating to the server system 112 to distribute each dataset 406 to the other robots. In some implementations, each dataset 406 can include an embedding, a corresponding classification label, corresponding feature or sensor data, and additional metadata corresponding to the embedding.

In each of the object classification examples, the embedding a robot generated using its machine learning model is based on sensor data generated by the robot describing an object detected by sensors of the robot. For example, the robot captures sensor data of a "cup" object using sensors of the robot. The robot provides the sensor data as input to the local machine learning model to generate an embedding from the sensor data. The corresponding object classification for the embedding indicates a classification for the detected object. For example, a user may provide the classification label of "cup" for the "cup" object by interacting with a client device 108 or with the robot itself.

In some implementations, the embeddings of the respective classification examples include embeddings generated by different robots that each use a particular machine learning model having a particular training state to generate the embeddings. For example, each robot 104A-104D includes the same machine learning model 402 that includes the same structure and training state. This allows the robots 104A-104D to compare embeddings that the robots generate with the embeddings those other robots provide. If two robots use different machine learning models, the two robots may produce different embeddings for the same object, causing a misclassification of the object.

In some implementations, the server system 112 receives, for each of the received object classification examples, sensor data, generated by a robot that describes the object corresponding to the object classification example. For example, the server system 112 receives sensor data that includes data indicating the shape, color, size, contour, and texture of the object. The server system 112 evaluates the quality of a classification example based on the received sensor data from each of the robots 104A-104D.

The server system 112 evaluates the object classification examples based on a similarity of the embeddings of the received object classification examples with other embeddings (1004). The server system 112's quality assurance system 702 provides a quality assessment of an embedding received from each of the robots 104A-104D. The quality analysis module 704, included in the quality assurance system 702, produces a quality score that indicates the quality of embedding in the dataset 406 received from each robot 104. The quality analysis module 704 assesses the embedding information by evaluating and filtering the embedding information using various criteria, including comparing distances between embeddings when mapped to a high-dimensional space.

The server system 112 evaluates the object classification examples by determining a quality score for the particular embedding of a particular object classification example. The server system 112 determines the quality score by analyzing a level quality of sensor data provided by the plurality of robots. The server system 112 analyzes the level quality by determining a match between the sensor data and the embedding by providing the sensor data to the machine learning model stored on the server system 112. The machine learning model provides an output embedding that the server system 112 compares to the received particular embedding. Additionally, the server system 112 compares an output classification label from the machine learning model to an object classification corresponding to the particular embedding from the particular object classification example. The server system 112 retrains the machine learning model to detect the particular embedding and to produce a correct classification label that matches the object classification in response to the server system 112 determining that the output classification label from the machine learning model does not match the object classification corresponding to the particular embedding.

Additionally, the server system 112 determines the quality score by analyzing how the object classification examples adjust an overall accuracy of the machine learning model. For example, if the object classification example improves the overall accuracy of the machine learning model, the server system increases the quality score corresponding to that particular embedding.

The server system 112 also determines the quality score by analyzing previous levels of quality of other object classification examples provided by the plurality of robots. For example, the server system 112 analyzes previous sensor data, classification examples, and corresponding quality scores from robots 104A-104D when analyzing a particular embedding received from robot 104B. The server system 112 can use this previous data for determining a quality score for a particular embedding from robot 104B, for example. Additionally, the server system 112 can use this previous data for determining a quality score for a particular embedding from any robot 104A-104D of a similar object type. The greater the similarities between the current data and any past data from any of the robots 104A-104D that produce a high quality score, the greater the quality score will be for the particular embedding.

In some implementations, the quality score represents a likelihood that the object classification matches the object corresponding to the particular object classification example. For example, the quality score represents a likelihood that the object classification of a "cup" matches the actual object corresponding to the received embedding (e.g., the received embedding represents the "cup" object). The higher the likelihood that the object classification matches the object corresponding to the received embedding from a robot, such as robot 104A, the greater the quality score.

In some implementations, the server system 112's quality assurance system 702 determines, for a particular embedding of a particular object classification example, a level of similarity of the particular embedding with respect to one or more other embeddings having a same object classification as the particular object classification example. For example, the quality assurance system 702 determines a level of similarity of a received embedding for a "cup" object to one or more other embeddings for a "cup" object. The quality assurance system 702 may determine the level of similarity by comparing a distance between the two embeddings mapped in a high dimensional space 802. The closer the distance (e.g., vector distance) between the two embeddings, the higher level of similarity between the two embeddings.

The server system 112 selects a subset of the object classification examples based on the evaluation of the quality of the embeddings (1006). For example, the quality analysis module 704 may designate the embeddings that fall within a threshold region as embeddings to transmit to the robots 104A-104D. Being inside the threshold region indicates a higher likelihood of the embedding representing an object. On the other hand, the quality analysis module 704 stores the embeddings existing outside the threshold region 827 in the database 114. In other implementations, the quality analysis module 704 discards any embeddings that exist outside a threshold distance from the ideal embedding. By discarding the embedding, the corresponding dataset is also discarded.

The server system 112 selects the particular object classification example to include in the subset based on the quality score satisfying a threshold. In some implementations, the server system 112 selects the particular object classification example, such as an embedding representing a "cup" object, based on the quality score being greater than a threshold value of 60. If the server system 112 determines the quality score of the particular object classification example is not greater than the threshold value, the server system 112 does not include the particular object classification example in the subset. Additionally, the server system 112 may store that particular object classification example in the database 114. Alternatively, the server system 112 may discard that particular object classification example.

In some implementations, the server system 112 evaluates the object classification example by determining, for a particular embedding of a particular object classification example, a level of similarity of the particular embedding with respect to one or more other embeddings having a different object classification from the particular object classification example. For example, the server system 112 can compare a distance in the high dimensional space between the received embedding that represents a "cup" object to a mapped embedding that represents a "pencil" object. In addition, the server system 112 can compare a distance in the high dimensional space between the received embedding that represents a "cup" object to a mapped embedding that represents a "hat" object. The distances between the received embedding and another mapped embeddings can be measured in the high dimensional spaces as vector distances. As a result, the server system 112 determines the level of similarity between the received embedding and the one or more other embeddings based on how close they exist in the high dimensional space to one another.

The server system 112 distributes the subset of the object classification examples to the robots in the plurality of robots (1008). The server system 112 transmits, to each of the robots in the plurality of robots, the subset of the object classification examples and designates the transmitted classification examples to be stored in a local cache of each of the robots. For example, the server system 112 tags the subset of the object classification examples with a label such as "store' to indicate to the robots to store in their respective caches. While the cache is described as being local to the robots, the robots may also take advantage of network-based or "cloud" storage in some instances. Accordingly, the robots may store some or all of the cached data locally or remotely, dependent on the implementation. Further, using remote storage for a cache can be separate from sharing embeddings for distribution, since each robot may have a private cache or network storage account specifically for that robot.

The server system 112 distributes the subset of the object classification examples to the robots 104A-104D that each store a copy of the same machine learning model 402. Each machine learning model 402 includes the same training state and a similar structure. The server system 112 distributes the subset of the object classification examples in response to the quality analysis module 704 analyzing the received embedding.

In some implementations, the server system 112 synchronizes the caches of the robots in the plurality of robots so that each of the plurality of robots stores the classification examples in the selected subset in a local cache of the robot. For example, the server system 112 can periodically synchronize the local caches between each of the robots 104A-104D on a daily basis, weekly basis, or a monthly basis. After synchronization, each robot in the plurality of robots include the same classification examples in their respective local caches.

In some implementations, the quality analysis module 704 produces a quality score that indicates a quality of the analyzed embedding. The quality score represents how confident the quality analysis module 704 is that the received embedding represents a particular object.

In some implementations, the quality threshold 704 compares the quality score of each dataset 406 to the quality threshold. If the quality analysis module 704 determines that the quality score is greater than the quality threshold, then the quality analysis module 704 allows the server system 112 to transmit the dataset to each robot 104. The robots 104A-104D stores the new dataset in a respective local cache 404.

In some implementations, the quality analysis module 704's indication to share or not share the dataset 406 is stored in the database 114 with the dataset 406. The server system 112 will use the stored indication in the database 114 to determine whether to use that particular embedding to generate an updated machine learning model 506. For example, if the database 114 stores an indication that the embedding is not to be shared, then the server system 112 will not use that embedding to generate the updated machine learning model 506.

In some implementations, the server system 112 trains a second machine learning model using the selected subset of the classification examples. For example, the server system generates the updated machine learning model 506 with the selected subset of the classification examples. The server system 112 receives, for each of the object classification examples, sensor data that describes the object corresponding to the object classification example. The server system 112 can receive sensor data from each of the robots 104A-104D. For example, the sensor data may include the shape, color, size, contour, and texture of the object. Additionally, the sensor data may include red, blue, green, and depth data provided by RGBD sensors.

During training, the server system 112 generates an updated version of the machine learning model 504. For example, the server system 112 updates the training state and the structure of the machine learning model 504 to produce the updated machine learning model 506. Once training has progressed to the point that the server system 112 determines the correct output can be properly derived from the updated machine learning model 506, the server system 112 provides the machine learning model 506 to the robots 104A-104D.

The server system 112 distributes the trained second machine learning model 506 to the robots in the plurality of robots. The trained second machine learning model 506 replaces the machine learning model stored at each of the robots in the plurality of robots. In addition, the server system 112 provides an instruction to each of the robot in the plurality of robots to remove the distributed classification examples from a local cache of the robot. The trained second machine learning model 506 includes the ability to detect the objects represented by the removed distributed classification examples. As a result, the distributed classification examples are not required to be stored by the local cache in each of the robots.

Figure 11:
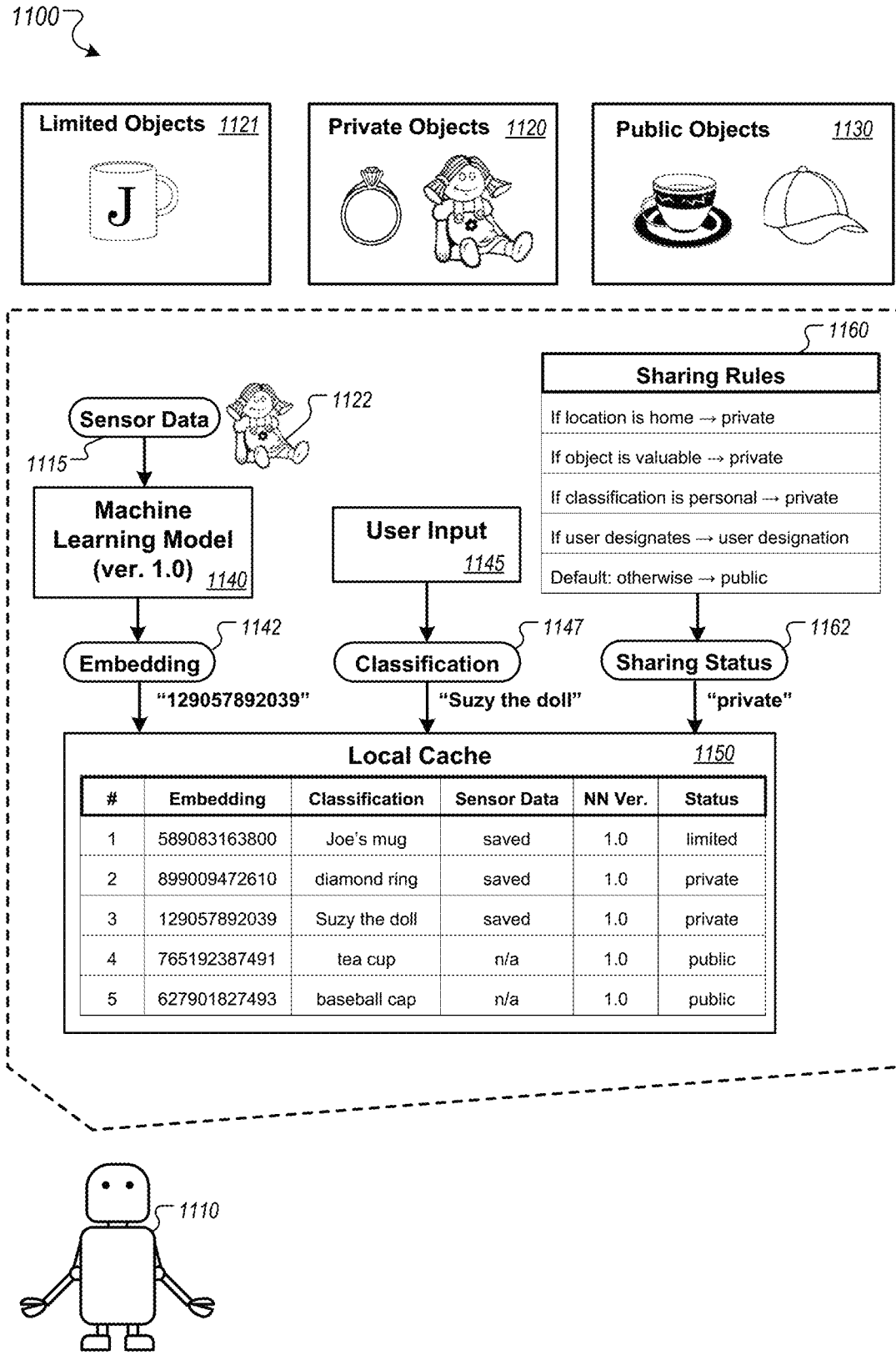
FIG. 11 is a diagram that illustrates an example system for enhancing robot learning.

FIG. 11 is a diagram that illustrates an example system 1100 for enhancing robot learning. As discussed above, robots can quickly acquire knowledge about their environment by associating information with embeddings that represent observations made by a robot. For example, a robot may capture image data showing an object that is not known to the robot. The robot can use a machine learning model, such as a neural network object classification model, to process sensor data that describes the object and generate an embedding, e.g., a vector or set of values, that represents the object in an encoded form. If the object classification model cannot determine the correct classification of the object, a human user or another robot or system may be able to supply the correct classification. The robot may then store the embedding for the object in association with the classification for the object, in order to quickly learn to recognize the object. When the object is observed again, the robot can process the sensor data and compare the resulting embedding with stored embeddings. When a generated embedding matches or is sufficiently similar to a stored embedding, the robot can determine that the classification for the stored embedding is appropriate.

The ability to generate, store, and use embeddings for object classification and other tasks can allow a robot to quickly and efficiently learn to function in new environments and situations. For example, generating and storing an embedding requires a very small amount of time and computation, and allows the robot to almost instantly expand its knowledge base. By contrast, re-training the machine learning model often requires many training examples as well as computationally demanding iterative training processes.

A further advantage of robot learning using embeddings is the ability for robots to easily exchange embeddings with other robots using the same machine learning model. This allows learned information to be quickly disseminated among a fleet of robots. However, it may not be desirable for a robot to share all of the embeddings that it generates with the remote server system or with other robots in the fleet, especially if the embeddings represent private or confidential information. For example, the robot may share with the server system embeddings related to generic objects (e.g., a chair, a kitchen implement), but it may not share generated embeddings related to proprietary objects (e.g., a proprietary machine), personal objects (e.g., a user's favorite mug), objects that contain personally-identifiable information (e.g., a credit card), or other sensitive objects (e.g., a valuable painting or other object). To control the use of information learned by a robot, some embeddings can be designated as "public embeddings" that are shared and other embeddings can be designated as "private embeddings" that are not shared. Although the robot does not share private embeddings with other robots or with a central server system for distribution, the robot may retain the private embeddings in a local cache so that it retains the benefit of the learned information represented by the embeddings. When the embeddings and associated classifications represent learned objects, the private embeddings can enable the robot to recognize the corresponding objects when it encounters them.

The robot may determine the sharing status (e.g., public, private, or limited sharing) of an embedding by analyzing information related to that embedding (e.g., a classification, metadata, tag, label, sensor data, or the embedding itself) using a set of sharing rules. In some cases, the sharing rules may be predetermined and may be based on any of various factors, including the classification of the embedding, the location of the object associated with the embedding, or other factors. In some implementations, a user of the robot may customize the sharing rules. In some examples, a user may instruct the robot that a particular object is private, so that its embedding is not to be shared with the server system or other robots in the fleet. Similarly, a robot may be configured to share embeddings relating to objects observed while the robot is in certain locations, e.g., public places, but not to share embeddings related to object observed in other locations, e.g., in a private residence. In some cases, a robot may be configured to share particular embeddings with only a limited subset of other robots. For example, a robot may share certain embeddings only with other robots in a similar location (e.g., sharing among robots in a factory) or in a similar role (e.g., sharing among robots that are home assistants).

Generally, an embedding generated using a machine learning model has a unique meaning tied to the training state of the machine learning model. The embedding may represent a result of processing input data using the machine learning model, for example, in the case of a neural network model, information generated at an output layer of the neural network or at a hidden layer of the neural network. For a given observation (e.g., an object detected in image data), different machine learning model parameters would produce a different embeddings for the same set of input data. As a result, changing from a first machine learning model to a second machine learning model would mean that the previously stored embeddings, generated using the first machine learning model, would no longer be useful to compare with embeddings generated by the second machine learning model. In other words, changing the machine learning model would potentially cause the learning represented by the cached embeddings to be lost.

For this reason, an updated machine learning model that was not trained with data about an object may not be able to correctly classify the object, even with an embedding generated by a previous model. However, a robot may maintain the set of knowledge represented by embeddings by re-generating new embeddings when an updated machine learning model is received. The robot can generate a new embedding for an object, using the new machine learning model, and use the new embedding in order to continue to recognize the object when using the new network model.

In some implementations, the robot may store raw or processed sensor data associated with a generated private embedding. For example, the robot may store features, statistics, or scores extracted from sensor data related to the private embedding. When the robot receives an updated machine learning model, the robot may regenerate each private embedding in its local cache using the updated machine learning model and stored raw or processed sensor data associated with each private embedding. The robot may then store the regenerated private embeddings, along with the associated classification and the raw or processed sensor data, in its local cache. The robot may subsequently use a regenerated private embedding to recognize and classify the related private object using its updated machine learning model.

In some implementations, after updating the machine learning model or regenerating the private embedding, the robot may remove from its local cache a private embedding generated by a previous version of the machine learning model. In some implementations, the robot may retain information associated with a private embedding, including metadata, raw or processed sensor data, object classification, and sharing status, and associate that information with the regenerated private embedding.

These techniques may provide one or more of the following advantages. By designating some embeddings as private embeddings that are not shared with the server system or other robots in the fleet, individual robots may each protect the privacy of the robot's user while still allowing the robot fleet to benefit from shared learning of information that is not private or confidential. A robot may receive and use embeddings shared by other robots, while still using its own private embeddings to recognize and classify private objects in its surroundings. Further, the particular robot may share generated embeddings that are not private (i.e., embeddings that are limited or public) with the server system for distribution, so that other robots in the fleet may receive and use those public or limited embeddings without compromising the privacy of the particular robot's user. By allowing a user to customize the sharing rules used to determine the sharing status of an embedding, the user can tailor the privacy applied to embeddings according his preference. For example, a user that prefers an increased level of privacy may set sharing rules that allow fewer embeddings to be shared with other robots in the fleet. By storing raw or processed sensor data related to a private embedding, the robot may regenerate private embeddings after the robot receives an updated machine learning model. By storing regenerated private embeddings in its local cache, the robot may recognize and classify objects related to the private embeddings using its updated machine learning model, which may not have been trained on the those particular objects.

Referring still to FIG. 11, in the system 1100, a robot 1110 receives data from one or more sensors of the robot 1110. The computer system of the robot 1110 uses the sensor data to identify and classify one or more objects in the robot's surroundings. In some implementations, the computer system of the robot 1110 may include a machine learning model that generates an embedding that is related to an object identified by the robot 1110. In some cases, a user may teach the robot the classification of the object. For example, the robot may be located in a user's home and may identify an object that is a mug. The machine learning model of the robot 1110 may generate an embedding that is related to the mug and the user may teach the robot that the identified object is the mug belonging to a particular resident of the home (i.e., "Joe's mug"). The robot 1110 may then store the embedding associated with the object, as well as the classification "Joe's mug" in a local cache of the robot 1110. By storing the embedding and classification in the robot's local cache, the robot can identify the object as "Joe's mug" in the future, without retraining the machine learning model.

In some implementations, the robot may share embeddings stored in its cache with a remote server system, which may then distribute those embeddings to other robots in the fleet. In some cases, the robot may wish to share only some of the embeddings stored in its cache with other robots. For example, the robot may not share with other robots embeddings it determines to be related to proprietary or personal objects, objects that contain personally-identifiable information, or other sensitive objects. To indicate which embeddings it will share and which it will not share, the robot may designate the embeddings as "public" (to be shared), "private" (not to be shared), or "limited (to be shared with a subset of robots). For example, a robot located in a home may store an embedding associated with an object classified as a "tea cup." Because "tea cup" is a generic object, the robot may determine that the embedding associated with "tea cup" may be shared with the robot fleet and so designate the "tea cup" embedding as "public." Alternatively, the robot may also store an embedding associated with an object classified as "Joe's mug." Because "Joe's mug" is a personal object, the robot may determine that the embedding associated with "Joe's mug" may not be shared with the robot fleet and so designate the "Joe's mug" embedding as "private."

In some implementations, the robot may designate an embedding as "limited," where the robot shares the embedding with a subset of other robots (e.g., shares only with robots in a particular location or role). For example, a robot located in a home may determine that even though "Joe's mug" is a personal object, the embedding associated with it ought to be shared with other robots in the home so that they may also identify it. In this case, the robot may designate "Joe's mug" as a limited embedding that can only be shared with other robots in the home.

The system 1100 includes a robot 1110, which can have the same features as any of the robots 104A-104D discussed above. For example, the robot 1110 may be a device with computing capabilities that is capable of moving or interacting with its surroundings. The robot 1110 may include a computing system that includes computer hardware, such as one or more processors, chipsets, general-purpose computing systems, memory systems, and data storage systems. In some cases, the robot 1110 may include application specific computing hardware, including, but not limited to, microcontrollers, field programmable gate arrays (FPGAs), or application specific integrated circuits (ASICs). The computer hardware of the robot 1110 may be configured to execute software that controls the movements and processes of the robot 1110.

The computer system of the robot 1110 may also include a local cache 1150. The local cache 1150 may be a memory system or a portion of a memory system of the robot 1110 that stores data used by the computer system of the robot 1110 for various computing functions.

The robot 1110 may also include sensors that collect data from the robot's surroundings. For example, the robot 1110 may be equipped with one or more cameras that capture images of the robot's surroundings. The sensors may also include LIDAR, radar, proximity sensors, light detectors, or other sensors that enable the robot 1110 to detect and identify objects in its surroundings. In some implementations, the sensor data 1115 collected by the sensors may include images of the surroundings of the robot 1110 captured by one or more cameras of the robot 1110.

The surroundings of the robot 1110 may include one or more objects 1120, 1121, 1130 that can be identified by the robot 1110. Robots 1110 located in different environments may identify different objects 1120, 1121, 1130 in their surroundings. For example, a robot 1110 in a home may identify objects 1120, 1121, 1130 that include furniture (e.g., table, chair), decorative items (e.g., a vase, a painting), and personal belongings (e.g., a user's favorite mug, a particular child's bed, a pet's favorite toy). A robot 1110 in a factory may identify objects 1120, 1121, 1130 that include equipment (e.g., a machine, a tool), protective gear (e.g., a hardhat, safety glasses), or output products (e.g., an individual manufactured widget, a box of widgets, etc.). A robot 1110 may identify any of various objects in its surroundings. In example system 1100, the objects 1120, 1121, 1130 of the robot's local surroundings include a mug (1121), a diamond ring, and a doll (1120), as well as a tea cup and a baseball cap (1130).

The robot 1110 may identify an object 1120, 1121, 1130 in its surroundings by analyzing sensor data 1115 collected by sensors of the robot 1110. For example, the cameras of the robot 1110 may capture sensor data images 1115 that depict one or more objects 1120, 1121, 1130 in the robot's surroundings. The computer system of the robot 1110 may analyze the sensor data images 1115 to determine that there is an object 1120, 1121, 1130 in the robot's local surroundings. The computer system of the robot 1110 may use any of various techniques to identify the object 1120, 1121, 1130. For example, the computer system may process the sensor data image 1115 that contains an image of the object, then generate a bounding box within the image that follows the contour of the identified object. In the example system 1100, the sensor data 1115 includes images that depict the object 1122, which is a doll.

In some implementations, the computer system of the robot 1110 may process the sensor data 1115 to extract features related to the identified object 1122. For example, the computer system may process the sensor data 1115 to determine physical features of the object 1122, such as location, size, dimension, shape, material composition, orientation, or other physical features. In some cases, the processed sensor data 1115 data may include extracted physical features, extracted statistical features or scores, or other measures related to the object 1122 as determined from the collected sensor data 1115. The computer system of the robot 1110 may also analyze or process the sensor data 1115 in other ways, including, but not limited to, filtering, transforming, truncating, annotating, or augmenting the sensor data 1115. In some implementations, the processed sensor data 1115 may include extracted features that are required as input by a machine learning model 1140.

In some implementations, the robot 1110 may collect or generate additional data related to an identified object 1122. For example, the computer system of the robot 1110 may collect or generate metadata related to an object 1122 that includes the location of the object 1122, the time and date at which the object 1122 was identified, or other information related to the object 1122. The metadata may also include other information related to the object 1122, for instance, the metadata may indicate the user with whom the object 1122 is associated. The metadata may describe the object's size, shape, material, composition or other properties.

In some implementations, the computer system of the robot 1110 may input the raw or processed sensor data 1115 into the machine learning model 1140. The machine learning model 1140 may be a part of the computer system of the robot 1110 and may be implemented in hardware, software, or any combination of hardware and software. The machine learning model 1140 accepts as input raw or processed sensor data 1115, as well as any other data provided to it by the computer system of the robot 1110, and outputs an embedding 1142 that corresponds to the object 1122 identified from the sensor data 1115. For example, the machine learning model 1140 may accept as input processed sensor data 1115 that includes extracted features of the object 1122. The machine learning model 1140 may also accept as input metadata associated with the sensor data 1115 or the object 1122, for instance, location information indicating where the sensor data 1115 was collected. Based on the input sensor data 1115 and metadata, the machine learning model 1140 may generate an embedding 1142 related to the identified object 1122.

In some implementations, the machine learning model 1140, like the other machine learning models discussed herein, may include a neural network or other type of classifier. For example, the machine learning model 1140 may be a parametric, non-parametric, or semi-parametric model. It may be a statistical model or empirical model. The machine learning model 1140 may include various probabilistic classifiers, including Bayes classifiers. The machine learning model 1140 may be implemented in any combination of hardware, firmware, and/or software.

The embedding 1142 may be, for instance, a multidimensional vector representation of the output of the machine learning model 1140. For example, one embedding representation may represent a 128-element vector, where each element is a 64-bit integer. For clarity in illustration, the embedding 1142 is represented as a 12-digit integer. In the example of FIG. 11, the computer system of the robot 1110 provides sensor data 1115 related to the doll 1122 to the machine learning model 1140. Based on the input sensor data 1115, the machine learning model 1140 outputs an embedding 1142 of "129057892039" related to the doll 1122.

In general, the embeddings 1142 generated by the machine learning model 1140 are a unique function of the raw or processed sensor data 1115 related to the object 1122 and the particular training state of the machine learning model 1140. For example, two machine learning models 1140 that use different parameters or model structures would, in general, generate two different embeddings 1142 for the same input sensor data 1115 related to an object 1122. As a result, the embeddings 1142 are generally only useful or meaningful when used with a machine learning model 1140 that uses the same parameters and training state as the one with which the embedding 1142 was generated.

In some implementations, the machine learning model 1140 may also generate a classification related to the object 1122. For example, based on the embedding 1142, the machine learning model 1140 may generate a classification for the object 1122 from a set of known classifications. However, for some objects 1122, the user may desire the robot 1110 to assign a classification to the object 1122 that is different than the classification generated by the machine learning model 1140. For example, the user may wish to correct an incorrect classification generated by the machine learning model 1140 (e.g., the machine learning model 1140 classifies an object 1122 as a "pencil" when it is actually a "pen"). As another example, a user may wish to classify the object 1122 more specifically or differently than the classification generated by the machine learning model 1140 (e.g., the machine learning model 1140 classifies an object 1122 as a "mug," and the user would like the robot 1110 to classify the object 1122 as "Joe's mug.")

In cases where the user desires the robot 1110 to classify the object 1122 differently than the generated classification, the user may teach the robot 1110 to associate a new classification 1147 with the object 1122 by providing user input 1145 to the robot 1110. The user may provide the user input 1145 to the robot 1110 by any of various means, including, for example, through voice commands, through a peripheral device that communicates with the robot 1110 (e.g., a keyboard, a mouse, a touchscreen), or through a wireless or wired network connection. In example system 1100, the user wishes the robot 1110 to classify the object 1122 not simply as a "doll," but as "Suzy the doll." Accordingly, the user provides user input 1145 to the robot 1110 indicating that the object 1122 is "Suzy the doll," and the computer system of the robot associates the classification 1147 "Suzy the doll" with the embedding 1142 related to the object 1122.

The computer system of the robot 1110 may then store the embedding 1142 and the user-input classification 1147 related to the object 1122 in the local cache 1150 of the robot 1110. By storing the embedding 1142 and the classification 1147 in the robot's local cache 1150, the computing system of the robot 1110 can identify the object 12 as the user-provided classification 1147 in the future without retraining the machine learning model 1140. In some implementations, the computer system of the robot 1110 may also store some or all of the raw or processed sensor data 1115 and metadata related to an embedding 1142, as well as the version identifier of the machine learning model used to generate the embedding 1142, in the local cache 1150.

In the example of FIG. 11, the computer system of the robot 1110 stores the embedding 1142 of "129057892039," the classification 1147 of "Suzy the doll," the sensor data 1115, and the version of the machine learning model (version "1.0") used by the machine learning model 1140 to generate the embedding 1142 in entry "3" of the local cache 1150. Having stored the embedding 1142 and the classification 1147 in the local cache 1150, the next time the robot 1110 encounters the object 1122, it will be able to identify the object 1122 as "Suzy the doll."

In some implementations, when the robot 1110 is part of a fleet of robots, the robot 1110 may share embeddings 1142 from its local cache 1150 with a remote server system that distributes the embeddings 1142 to other robots in the fleet. In some cases, the robot 1110 may share only some of the embeddings 1142 stored in its cache 1150 with other robots. For example, the robot 1110 may share embeddings 1142 that represent generic objects, such as a chair, or a book, but the robot 1110 may not share embeddings 1142 that represent personal objects—such as a driver's license or a user's favorite toy, or valuable objects, such as a piece of jewelry or an expensive painting.

A robot 1110 may not share the embedding 1142 associated with an object 1122 for any of various reasons. For example, the robot 1110 may not share an embedding 1142 if the associated object 1122 is considered restricted or confidential. For example, a robot 1110 in a factory may not share an embedding 1142 associated with a proprietary machine or instrument. A robot 1110 in a hospital may not share an embedding associated with an object 1122 in a patient's room. A robot 1110 may not share an embedding 1142 that contains personally-identifiable information (e.g., a driver's license or ID card). In some implementations, the robot 1110 may not share an embedding 1142 if it is associated with a personal object 1122. For example, a robot 1110 in a home may not share an embedding 1142 associated the homeowner's house key or with a resident's favorite mug.

In some cases, the robot 1110 may not share an embedding 1142 because the user instructs the robot 1110 not to share information related to an object or class of objects. For example, a user may instruct the robot 1110 not to share any embedding 1142 related to valuable jewelry in the user's home or the user may instruct the robot 1110 not to share any embedding related to an object located in the user's bedroom. Generally, the user may instruct the robot 1110 not to share a particular embedding 1142 associated with any object 1122 they wish to remain private.

In some cases, the robot 1110 may share an embedding 1142 with only a limited subset of other robots. For example, the robot 1110 may share a particular embedding 1142 with other robots in the same organization (e.g., all robots of a given company or at a given restaurant), with other robots of a particular type or domain (e.g., all hospital robots or all kitchen-service robots), or other robots at a given location (e.g., all robots at a home). In other cases, the robot 1110 may share an embedding 1142 with all other robots in the fleet.

To indicate which embeddings 1142 the robot 1110 will share and which it will not share, the robot 1110 may associate each embedding 1142 with a sharing status 1162. In some implementations, the robot 1110 may determine the sharing status 1162 of each embedding 1142 as "public" (those that are shared), "private" (those that are not shared), or "limited" (those that are shared with a subset of robots). To determine the sharing status 1162 of an embedding 1142, the computer system of the robot 1110 may analyze information related to the embedding 1142 against a set of sharing rules 1160.

Sharing of limited embeddings 1142 to a subset or group of robots may be accomplished via access controlled lists, where the computer system of the robot 1110 maintains a list of robots with which one or more limited embeddings 1142 may be shared. In some implementations, the computer system of the robot 1110 may maintain different access control lists for different limited embeddings 1142.

The computer system of the robot 1110 may use any of various information related to the embedding 1142 to determine the sharing status 1162 of the embedding 1142. For example, the computer system may use the embedding 1142, itself, the classification 1147 associated with the embedding 1142, or metadata associated with the embedding 1142. In some cases, the computer system may use metadata that indicates where the object related to the embedding 1142 was located or when the embedding 1142 was generated. The computer system of the robot 1110 may also use other data or metadata associated with the embedding 1142 to determine the sharing status 1162 of the embedding 1142. For example, the computer system may use sensor data 1115, a classification generated by the machine learning model 1140, the location of the robot 1110 (e.g., from GPS), other data from sensors of the robot 1110, information provided by a user, or other information to determine the sharing status of an embedding 11422.

The sharing rules 1160 provide criteria that enable the robot 1110 to determine the sharing status of a particular embedding 1142. The sharing rules 1160 may, for instance, be stored in a memory system of the robot 1110 and be accessed by a processor of the computing system of the robot 1110. In some implementations, the sharing rules 1160 may be predetermined (e.g., "default" rules). In some implementations, the sharing rules 1160 may be learned by the robot 1110 over time.

Different robots 1110 may utilize different sharing rules 1160. For example, a robot 1110 in a factory may use one set of sharing rules 1160, while a robot 1110 in a hospital may use a different set of sharing rules 1160. In some implementations, the robot 1110 may utilize different sharing rules 1160 for objects 1122 associated with different users.

The sharing rules 1160 may include rules that consider any of various factors that impact whether the robot 1110 will share the embedding 1142. For example, the sharing rules 1160 may include rules that consider the location of the object 1142 (e.g., in a bedroom, in a kitchen, outdoors), the type of the object 1142 (e.g., a garden tool, a piece of furniture, a personal item, a machine), the classification of the object 1142 (e.g., a personal item such as "Joe's mug"), the location of the robot 1110 (e.g., a home, a factory, a restaurant, a hospital), or other factors. For example, a sharing rule may be that any embedding 1142 associated with an object 1122 located in a user's home is a limited embedding to be shared only with other robots in the home, or that any embedding 1142 associated with an object 1122 containing personally identifiable information is a private embedding.

In some examples, the robot 1110 may request the user to determine the sharing status 1162 of the embedding 1142 associated with an object 1122, where the robot 1110 designates the sharing status 1162 of the embedding 1142 according to the user's response. Here, the user may teach the robot 1110 the sharing status 1162 of the embedding by providing input to the robot 1110 by, for example, providing a voice command to the robot or entering data into a robot through a peripheral device (e.g., a keyboard, mouse, or touchscreen).

In some implementations, a user of the robot 1110 may customize, modify, or add to the sharing rules 1160. For example, a robot 1110 may have a default sharing rule 1160 that indicates any embedding 1142 related to an object 1122 located in a user's office has a private sharing status 1162. In some cases, the user may modify the sharing rule 1160 to indicate that only embeddings associated with an object 1122 on the user's desk will have a private sharing status 1162, while an embedding 1142 associated with any object 1122 that is in the user's office but not on his desk will have a public sharing status 1162.

In some implementations, a user of the robot 1110 may specify the group of robots with which a limited embedding 1142 is shared. For example, the user of the robot 1110 may specify that the embedding 1142 may only be shared with other robots in the same location, or with other robots in the same organization.

Based on the sharing rules 1160 and/or input from the user, the computer system of the robot 1110 determines the sharing status 1162 each embedding 1142 as either public or private. The computer system of the robot 1110 associates the sharing status 1162 with the embedding 1142 and stores the sharing status 1162 in the local cache 1150. In some implementations, the computer system of the robot 1110 determines the sharing status 1162 of an embedding 1142 when the embedding 1142 is generated by the machine learning model 1140.

In some implementations, the computer system of the robot 1110 may maintain one or more caches that store the embeddings (e.g., one cache that stores public embeddings and a second cache that stores limited and private embeddings). In some examples, the computer system of the robot 1110 may allot a particular portion of a cache to store public, private, or limited embeddings and related information.

In the example system 1100, the surroundings of the robot 1110 include private objects 1120 ("diamond ring" and "Suzy the doll"), a limited object 1121 ("Joe's mug") and public objects 1130 ("tea cup" and "baseball cap"). For each object 1120, 1121, 1130, the robot 1110 has generated an embedding from the machine learning model 1140 (based on sensor data) and determined a classification (based on user input). For each identified object 1120, 1121, 1130, the computer system determined a sharing status by analyzing information related to the object 1120, 1121, 1130 against the set of sharing rules 1160 and stored that sharing status, associated with the generated embedding, in the local cache 1150. Here, for example, the user designated that "Joe's mug" is to be a limited embedding, shared only with other objects in the home.

Particularly, in the example of FIG. 11, the metadata associated with the embedding 1142 indicates that the doll 1122 was identified in a user's home. The sharing rules 1160 include a rule that states any object 1122 located in a user's home, unless otherwise designated by a user, is private. Based on the sharing rules 1160, the computer system determines that the embedding 1142 related to the doll 1122 is private. Accordingly, the computer system of the robot 1110 stores in the local cache 1150 the sharing status 1162 of "private" associated with the embedding 1142.

In some implementations, the computer system of the robot 1110 may determine whether to store additional information associated with each embedding 1142 based on the sharing status 1162 of the embedding 1142. For example, the computer system may only store raw or processed sensor data 1115 associated with an embedding 1142 if that embedding 1142 is private or limited.

Figure 12:
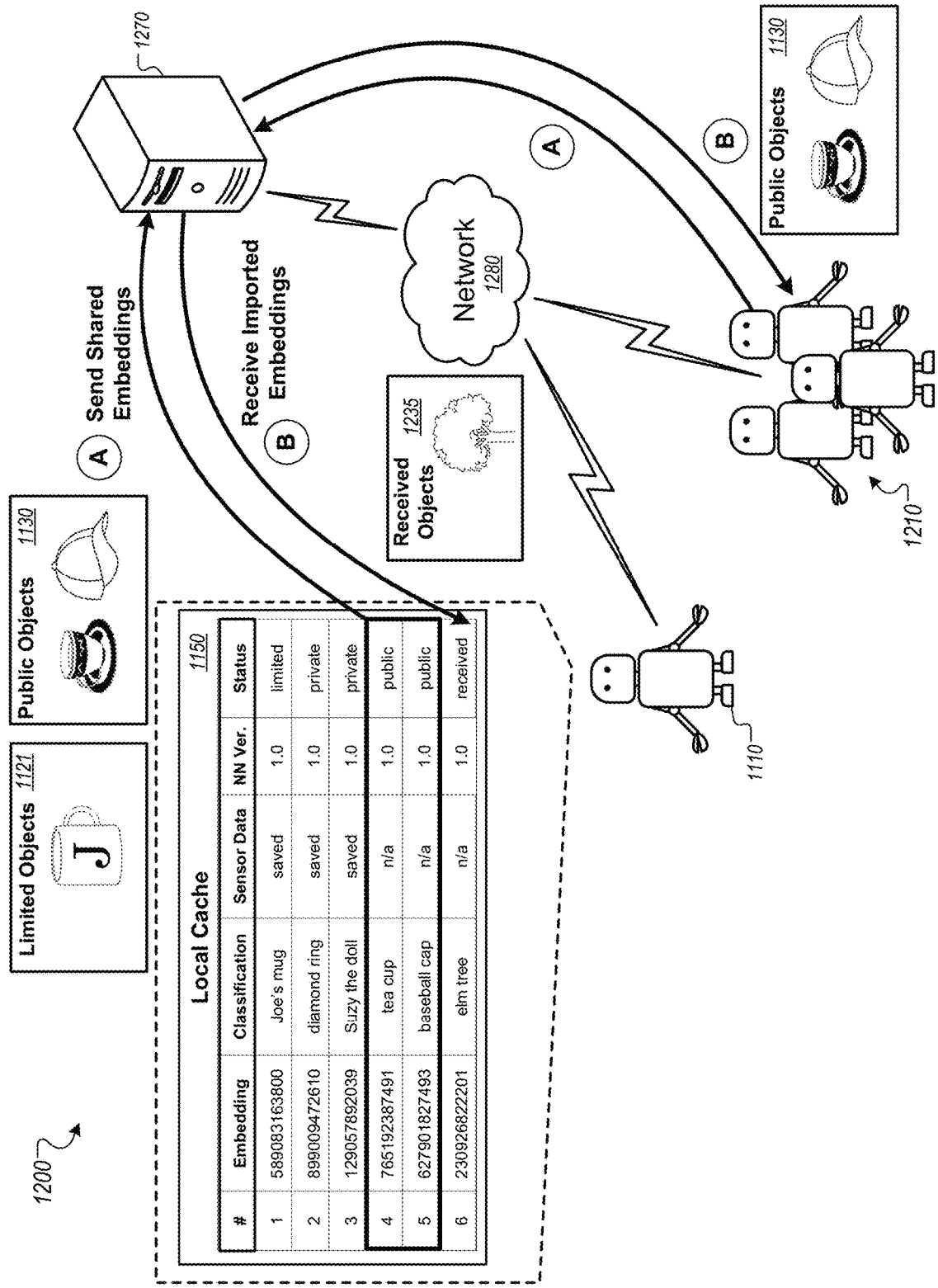
FIG. 12 is a diagram that illustrates an example system for selectively sharing information among a fleet of robots.

FIG. 12 is a diagram that illustrates an example system 1200 for selectively sharing embeddings among a fleet of robots. In the system 1200, one or more robots in a fleet of robots share public embeddings from their local caches with a remote server system, but do not share private embeddings. In some cases, the robots may share limited embeddings with a subset of robots in the fleet. Here, the robots use the same machine learning model, so that the embeddings generated by one robot may be used by another robot. The remote server system then distributes the shared embeddings to one or more robots in the fleet of robots. In this way, robots in the fleet are able to leverage the learning of other robots by using public and/or embeddings generated by another robot, enabling each robot to recognize the object associated with an embedding without first encountering the object itself and without retraining the machine learning model. FIG. 12 includes stages (A) and (B), which represent a flow of data.

System 1200 includes the robot 1110 of system 1100, which has in its local cache 1150 a set of embeddings generated by the robot 1110. In example system 1200, the local cache 1150 initially contains the private, limited, and private embeddings generated by the robot 1110, specifically, the limited embedding designated "1" in the local cache ("Joe's mug"), the private embeddings designated "2" and "3" in the local cache 1150 ("diamond ring" and "Suzy the doll"), and the public embeddings designated "4," and "5" in the local cache 1150 ("tea cup," "baseball cap").

System 1200 also includes one or more other robots 1210. The one or more robots 1210 may be the same type of robot as robot 1110 or a different type of robot than 1110. Regardless of whether the robots 1110 and 1210 are of the same or different types, they can use copies of the same machine learning model for classifying objects.

System 1200 also includes a remote server system 1270. The remote server system 1270 may be, for example, one or more computer systems, servers, distributed computing platforms, or other processing system. In some implementations, the remote server system 1270 may be a cloud computing system.

The robot 1110 and the one or more other robots 1210 exchange electronic information with the remote server system 1270, possibly through a network 1280. The network 1280 may be any communication infrastructure that supports the two way exchange of data between the remote server system 1270 and the robots 1110, 1210. The network 1280 may include a local area network (LAN), a wide area network (WAN), the Internet, or other network topology. The network 1280 may be any one or combination of wireless or wired networks and may include Ethernet, cellular telephony, and Wi-Fi technologies. Communications through the network 1280 may be implemented through any one or combination of various protocols, including 802.11, Bluetooth, GSM, 3G, 4G, 5G, LTE, or other custom or standard communication protocol. In some implementations, the network 1280 may include optical data links.

In stage (A), the robots 1110, 1210 send information related to the shared (public and limited) embeddings stored in their local caches to the server system 1270. The robots 1110, 1210 may send various information related to the shared embeddings to the server system 1270. For example, the robots 1110, 1210 may send the embedding itself, the classification, the version of the machine learning model used to generate the embedding, and any other information or metadata related to the shared embedding. However, the robots 1110, 1210 do not send information related to private embeddings stored in their local caches to the server system 1270.

In example system 1200, the robot 1110 sends, to the server system 1270, information associated with the limited embedding "1" and the public embeddings "4" and "5" which are related to the "Joe's mug," "tea cup," and "baseball cap," respectively. The robot 1110 does not send to the server system 1270 information associated with the private embeddings "2" and "3," which are related to the private objects "diamond ring" and "Suzy the doll," respectively.

Similarly, during stage (A) the robots 1210 send to the server system 1270 information associated with the public and/or limited embeddings stored in their local caches. The robots 1210 may not send to the server system 1270 information associated with any private embeddings stored in their local caches.

In stage (B), the robots 1110, 1210 receive from the server system 1270 embeddings provided to the server system 1270 by the other robots. A robot 1110, 1210 may receive information related to some or all of the shared embeddings provided to the server system 1270 by the other robots. The robots 1110, 1210 may store the information associated with these received embeddings in their local caches, and they may use the received embeddings for object identification and classification in the same manner that they use their generated private and public embeddings.

In some implementations, the server system 1270 may share public embeddings with all robots 1110, 1210 in the fleet, but may share limited embeddings with only a specified subset of robots 1110, 1210 in the fleet. For example, the server system 1270 may send to the robot 1110 those public embeddings shared by other robots 1210, as well as those limited embeddings shared by robots that operate in similar settings to the robot 1110 (e.g., share limited embeddings among robots that operate indoors) or that operate in similar roles to the robot 1110 (e.g., share limited embeddings only among robots that work in factories). The subset of robots 1110, 1210 with which a particular embedding is shared may be specified by the user of the robot that generated the embedding, by the server system 1270, by a system administrator, or by another means.

In the example system 1200, the robot 1110 receives information related to a public embedding associated with one received object 1235 that is classified as "elm tree." Particularly, in the example of FIG. 12, the robot 1110 receives the embedding, classification, and machine learning model version used to generate the embedding associated with the elm tree 1235. The computer system of the robot 1110 adds the information associated with the received "elm tree" embedding to the local cache 1150 of the robot 1110. In some implementations, the computer system of the robot 1110 may determine the sharing status of the received embedding to be "public," since it was generated as a public embedding by another robot 1210. In some implementations, the computer system of the robot 1110 may determine the sharing status of the received embedding to be "received," indicating the embedding was received by the robot 1110 and generated by a different robot 1210. The computer system of the robot 1110 may store additional metadata with the received embedding, for instance, the date and time the embedding was received, the other robot 1210 that generated the embedding, the location in which the embedding was generated, or any other information related to the received embedding.

Similarly during stage (B), in the example system 1200, the other robots 1210 receive information related to the public embeddings sent by the robot 1110 to the server system 1270. In the example of FIG. 12, the information associated with the public embeddings related to the "tea cup" and "baseball cap" embeddings generated by the robot 1110 are distributed by the server system 1270 to the robots 1210. The robots 1210 then store the information associated with the "tea cup" and "baseball cap" public embeddings in their local caches. In example system 1200, none of the robots 1210 are in the group of robots authorized to receive the limited embedding associated with "Joe's mug" (i.e., none of the robots 1210 are in the same home as the robot 1110). As a result, the server system 1270 does not share the limited embedding "Joe's mug" with the robots 1210.

After adding a received embedding to its local cache, a robot will be able to use the embedding to identify and classify the objects associated with the received embedding. For example, in system 1200, though the robot 1110 has not previously encountered an elm tree and its machine learning model has not been trained to recognize an elm tree, the next time the robot 1110 encounters an elm tree, it will be able to identify it as an "elm tree" based on the received embedding. In this way, the robot 1110 is able to leverage the learning of other robots 1210 in the fleet to improve its object identification and classification performance.

Figure 13:
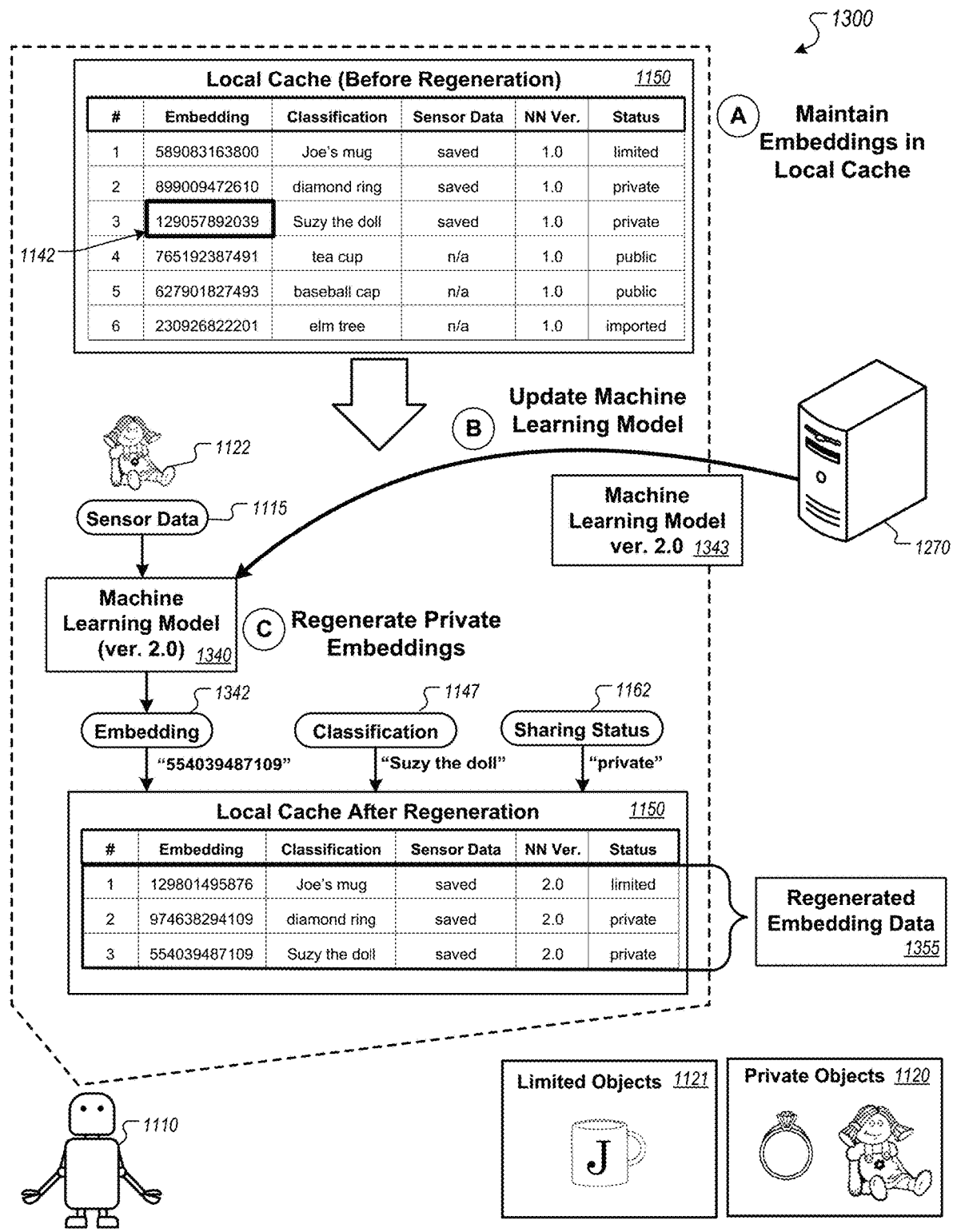
FIG. 13 is a diagram that illustrates an example system for regeneration and storage of embeddings by a robot.

FIG. 13 is a diagram that illustrates an example system 1300 for regeneration and storage of embeddings by a robot. In some implementations, a robot that has private and/or limited embeddings stored in its local cache may receive, e.g., from a remote server system, an update to its machine learning model. Because embeddings are unique to a given machine learning model, the private and/or limited embeddings stored in the robot's local cache, which were generated using a previous machine learning model, are not compatible with the updated machine learning model, which was trained on the public embeddings. As a result, to enable the robot to continue to identify and classify the objects associated with the private embeddings using the updated machine learning model, the computer system of the robot may generate new, updated private embeddings. The computer system of the robot may generate updated private embeddings by inputting to the updated machine learning model the raw and/or processed sensor data associated with the private embedding. The computer system of the robot then stores the regenerated private embeddings in its local cache, along with associated the raw and/or processed sensor data. In some implementations, the computer system removes the private and/or limited embeddings associated with the previous machine learning model from the cache. FIG. 13 includes stages (A) through (C), which represent a flow of data.

System 1300 includes the same robot 1110 of systems 1100 and 1200, as well as the remote server system 1270 from system 1200. The computing system of the robot 1110 includes a machine learning model 1340, as well as a local cache 1150. In FIG. 13, the local cache of the robot 1110 is shown both before and after regeneration of the private embeddings, as indicated.

In stage (A), the robot 1110 maintains embeddings in its local cache. Initially, the robot 1110 maintains the local cache 1150 ("Local Cache Before Regeneration"), which stores the private and public embeddings generated by the robot 1110, as well as the received public embeddings distributed to the robot 1110 by the server system 1270. In example system 1300, the robot's local cache 1150 stores one limited embedding generated by the robot 1110 (embedding "1" classified as "Joe's mug"), two private embeddings generated by the robot 1110 (embeddings "2" and "3," classified as "diamond ring" and "Suzy the doll," respectively), two public embeddings generated by the robot 1110 (embeddings "4" and "5", classified as "tea cup" and "toy blocks," respectively) and one received public embedding (embedding "6", classified as "elm tree"). These embeddings were all generated using version 1.0 of the machine learning model, as indicated in the table of the local cache 1150.

In stage (B), the robot 1110 receives, from the server system 1270, an updated machine learning model 1343. In some cases, the updated machine learning model 1343 may have been updated and trained by the server system 1270 using the public embedding information shared with the server system 1270 by the robot 1110 and other robots in the fleet. As a result, a robot 1110 implementing the updated machine learning model 1343 may be able to correctly classify objects related to the shared public embeddings without referring to embeddings in its local cache 1150. However, because updated machine learning model 1343 was trained only on public embeddings, in order to continue to correctly classify the objects associated with the private and/or limited embeddings, the robot 1110 must update and regenerate these embeddings using the updated machine learning model 1343.

In some implementations, the server system 1270 may send the updated machine learning model 1343 to the robot 1110 via a network, such as network 1280 of FIG. 12. In some examples, the updated machine learning model 1343 may be a full replacement for the model implemented by the machine learning model 1340 stored in the computing system of the robot 1110. In some examples, the updated machine learning model 1343 may replace only some of the previous model implemented by the machine learning model 1340. For example, the server system 1270 may send some or all of node weights, interlayer node connectivity information, or intralayer node connectivity information to update the machine learning model. In some examples, the server system 1270 may update the robot's machine learning model 1340 by sending only those parameters of the machine learning model 1343 (e.g., node weights, node interconnectivity) that have changed from the previous model implemented by the machine learning model 1340. In example system 1300, the machine learning model 1340 of the robot 1110 previously implemented version 1.0 of the machine learning model and the server system 1270 sent to the robot 1110 the updated version 2.0 of the machine learning model 1343.

After receiving the updated machine learning model 1343 from the server system 1270, the computer system of the robot 1110 updates (e.g., replaces) the machine learning model 1340 with the updated machine learning model 1343. In some implementations, the computer system of the robot 1110 may update the machine learning model 1340 by storing one or more parameters associated with the updated machine learning model 1343 in a memory system of the robot 1110. In some examples, the robot 1110 may overwrite or remove the previous version of the machine learning model from the memory of the robot's computer system.

In stage (C), the computer system of the robot 1110 regenerates the private and limited embeddings stored in its local cache 1150. To regenerate a private embedding 1142, the computer system of the robot 1110 inputs to the updated machine learning model 1340 the raw and/or processed sensor data 1115 associated with the original embedding 1142. In some examples, the sensor data 1115 includes the same raw or processed data 1115 used by the computer system of the robot 1110 to generate the original embedding 1142 using a previous version of the machine learning model. The data used by the updated machine learning model 1140 may include raw sensor data 1115 collected by sensors on the robot 1142, processed sensor data 1115 that may include features of the object 1122 extracted by the computer system of the robot 1110, as well as other data, including metadata related to the embedding 1142. In some cases, the sensor data 1115 may be stored in the local cache 1150 of the robot.

Based on inputting the data 1115 to the updated machine learning model 1340, the machine learning model 1340 generates a new private and/or limited embedding 1342. The computer system of the robot 1110 associates this new embedding 1342 with the classification 1147 and sharing status 1162 associated with the previous embedding 1142. The new embedding 1342 may be different from the previous embedding 1142 stored in the local cache 1150 before the update. For example, the new embedding 1342 may contain different values, or be of a different dimension, than the previous embedding 1142.

The computer system of the robot 1110 then stores the regenerated embedding data 1355, which includes the new embedding 1342, as well as the classification 1147, sharing status 1162, and sensor data 1115 associated with the embedding 1342, in the local cache 1150. In some implementations, the computer system of the robot 1110 may also save the version of the machine learning model 1343 used to generate the new private and/or limited embeddings.

In some implementations, after receiving the updated machine learning model 1343 or after regenerating the previous private and/or limited embeddings, the computer system of the robot 1110 may remove from the local cache embeddings associated with a previous version of the machine learning model. For example, the computer system of the robot 1110 may remove from the local cache information related to private, public, limited, and received embeddings generated by a previous version of the machine learning model.

For example, in system 1300, after updating the machine learning model 1340 with the updated version 2.0 machine learning model 1343, the computer system of the robot 1110 generates three new embeddings to replace the three previous limited and private embeddings (embeddings "1", "2", and "3") in its local cache 1150 ("Local Cache Before Regeneration") that were generated using version 1.0 of the machine learning model. The computer system of the robot 1110 then associates the classifications, sensor data, and sharing statuses of the previous embeddings with the new embeddings and stores the regenerated embedding data 1355 into its local cache 1150 ("Local Cache After Regeneration").

The example of FIG. 13 shows the regeneration of private embedding "3" (1142), which is associated with object 1122, "Suzy the Doll." The computer system of the robot 1110 generates a new embedding for the object 1122 by inputting sensor data 1115 related to the original embedding 1142 to the updated machine learning model 1340. Here, the machine learning model 1340 implements the updated version 2.0 of the machine learning model 1343, which was provided to the robot 1110 by the server system 1270.

The updated machine learning model 1340 generates a new private embedding 1342 of "554039487109" related to the object 1122. Here, the new private embedding 1342 of "554039487109" generated using machine learning model version 2.0 (1343) is different than the private embedding 1142 of "129057892039" generated using the previous machine learning model version 1.0, even though the embeddings are related to the same object 1122 and derived using the same data 1115.

In the example of FIG. 13, the computer system of the robot 1110 associates the new embedding 1342 with the classification 1147 ("Suzy the doll"), sharing status 1162 ("private"), and sensor data 1115 of the previous private embedding 1142 and then stores the new private embedding 1342, as well as the classification 1147, the sharing status 1162, the sensor data 1115, and the version of the machine learning model used to generate the embedding ("2.0"), in the local cache 1150 ("Local Cache After Regeneration"). The computer system of the robot 1110 also removes from the local cache 1150 information related to any embeddings generated using the previous machine learning model version 1.0. Here, the computer system of the robot 1110 removes from the local cache 1150 information related to the previous embeddings for the private objects 1120 and limited objects 1121, as well as information related to the public embeddings (entries "4" and "5," related to the "tea cup" and "baseball cap," respectively) and the received embedding (entry "6", related to the "elm tree").

In some implementations, the server system 1270 may generate the updated the machine learning model 1343 using both the public and limited embeddings provide by the robot 1110 (e.g., the updated model was trained using both public and limited embeddings). In this case, the robot 1110 may be able to identify both public and limited objects using the updated machine learning model 1343 and the computer system of the robot 1110 may regenerate and store only the private embeddings.

The system 1300 may repeat stages (A) through (C) as new machine learning models are provided to the robot 1110 by the server system 1270. For example, the server system 1270 may send to the robot 1110 an updated machine learning model version 3.0. In this case, the robot 1110 would update its machine learning model 1140 to implement the updated machine learning model version 3.0 and generate new private and/or limited embeddings to replace the embedding data 1355 that was generated using machine learning model version 2.0. The robot 1110 may also generate new embeddings for any additional private or limited embeddings that were generated with machine learning model version 2.0.

FIG. 14 is a flow chart that illustrates a process 1400 for regeneration and storage of private embeddings by a robot. Briefly, the process 1400 includes storing, by the robot in a local cache of the robot, first embeddings generated using a first machine learning model, wherein those first embeddings include one or more first private embeddings (1402); receiving, by the robot, a second machine learning model from a server system over a communication network (1404); generating, by the robot, a second private embedding for each of the one or more first private embeddings using the second machine learning model (1406); adding, by the robot, the second private embeddings to a cache of the robot (1408); and removing, by the robot, the one or more first private embeddings from a cache of the robot (1410). This process may be repeated each time a machine learning model of the robot is updated.

In more detail, the process 1400 includes storing, by the robot, first embeddings generated using a first machine learning model (1402). In some implementations, the first machine learning model may be a model for classifying objects identified by the robot. The machine learning model may include information that describes node arrangement, layer arrangement, node interconnectivity, layer connectivity, interconnection or node weights (e.g., synaptic weights), or other parameters that describe the architecture and function of the machine learning model. The machine learning model may be implemented in any combination of hardware and software. In some implementations, one or more robots in a fleet of robots may implement the same machine learning model. In some implementations, the first machine learning model may have been provided to the robot by a server system. In some implementations, the robot may store a copy of the first machine learning model locally in the hardware of the robot (e.g., in a cache of the robot). In some implementations, the robot may access a copy of the first machine learning model stored on a remote server system (e.g., a cloud computing system).

The robot may store the first embeddings, which are generated using the first machine learning model, in a cache of the robot. An embedding may be, for example, an output of the first machine learning model that represents an object. In some implementations, the embedding may be a multi-dimensional numeric value, one or more numeric values, a vector, tensor, matrix, array, or another numeric representation.

In some implementations, the robot may generate an embedding for an object by inputting, to the machine learning model, sensor data related to the object. In some implementations, the sensor data may be collected by sensors of the robot and may include image or video data, depth data, LIDAR, radar, IR, or proximity sensor data. In some implementations, the robot may process the sensor data before inputting it to the machine learning model to generate an embedding. For example, the robot may process the sensor data to extract statistical or numeric feature values related to the object. The robot may also filter or transform the sensor data. The robot may input some or all of the raw, processed, filtered, or transformed sensor data to the machine learning model to generate an embedding. In some implementations, the robot may store some or all of the sensor data, including raw, processed, filtered, or transformed data, used to generate the one or more first embeddings.

The first embeddings may include one or more first private embeddings, where the first private embeddings are not shared with other robots or the server system. For example, a first private embedding may be represent a private object that a user of the robot does not want to be shared with other robots or the server system (e.g., a personal object, a proprietary or confidential object, a valuable object, etc.).

The robot may determine that a first embedding is a first private embedding by any of various techniques. For example, the robot may determine that a first embedding is a first private embedding by accessing a sharing status associated with the first embedding.

In some implementations, the robot may access metadata associated with the embedding and, based on analyzing the metadata against one or more sharing rules, the robot may determine that the embedding is a private embedding. The metadata may be, for example, the embedding's classification, location, a date or time stamp, another tag or label associated with the embedding or the object the embedding represents. The metadata may also include other information about the embedding or the related object generated or received by the robot. For example, the metadata may include information describing the object's size, shape, material, composition or other properties. In some implementations, the robot may store the metadata associated with the one or more first embeddings in a cache of the robot.

In some implementations, the robot may store the one or more sharing rules in a local memory or cache of the robot. The robot may use the one or more sharing rules to determine whether an identified embedding associated with an object is private. In some examples, the sharing rules may be predetermined (e.g., default rules). In some examples, the robot may receive the sharing rules from the server system. In some examples, a user of the robot may customize or set the sharing rules. In some examples, the robot may learn the sharing rules over time (e.g., through machine learning or other automated learning techniques). The sharing rules may be based on any of various factors, including metadata associated with the embedding, the classification of the embedding, the location of the object associated with the embedding, the user of the robot associated with the embedding, or other factors.

In some implementations, the first embeddings stored in a cache of the robot may include one or more public embeddings that are shared with a server system. The public embeddings may, for example, be embeddings that represent public objects that a user of the robot wants to share with other robots in the fleet of robots.

Similarly to private embeddings, the robot may determine that a particular embedding is a public embedding by any of various techniques. For example, the robot may analyze metadata associated with a particular embedding against one or more sharing rules to determine that the embedding is a public embedding.

In some implementations, where the first embeddings include one or more first private embeddings and one or more first private embeddings, the robot may provide the one or more first public embeddings to the server system and not provide the one or more first private embeddings to the server system.

In some implementations, the robot may determine whether to store sensor data related to one or more first embeddings based on whether a particular embedding is private or public. For example, the robot may determine to store sensor data for each of the one or more first private embeddings, but not to store sensor data for the one or more first public embeddings.

The robot may receive a second machine learning model from a server system over a communication network (1404). The second machine learning model may provide the same functionality as the first machine learning model. In some examples, the second machine learning model may be an updated or retrained version of the first machine learning model. The second machine learning model may have been updated or trained using data provided by one or more robots in the fleet. In some implementations, the second machine learning model may be a one-to-one replacement for the first machine learning model.

Using the second machine learning model, the robot may generate a second private embedding for each of the one or more first private embeddings in the robot's cache (1406). In some implementations, the robot may generate a second private embedding from the stored sensor data used to generate the one or more first private embeddings. For example, the robot may generate a second private embedding by inputting to the second machine learning model raw or processed sensor data used to generate a first private embedding. In some cases, the robot may generate the second private embedding for an object by inputting, to the second machine learning model, feature values derived from the sensor data used to generate the first private embedding for the object.

After generating the second private embeddings, the robot may add the second private embeddings to the cache of the robot (1408). In some examples, the robot may also remove the one or more first private embeddings from the cache of the robot (1410).

In some implementations, the first embeddings in the local cache may include one or more public embeddings. After receiving the second machine learning model, the robot may remove one or more public embeddings from the cache of the robot based on determining that an embedding is a public embedding.

In some implementations, the first embeddings in the local cache may include one or more received embeddings that were received by the robot from the server system over a communication network. For example, the received embedding may have been generated by a different robot in the fleet of robots and shared, by that different robot, with the server system. The robot may determine that a particular embedding of the first embeddings is a received embedding, and, after receiving the second machine learning model, it may remove the particular embedding from the cache based on determining that the particular embedding is one of the received embeddings.

A robot can use various techniques to determine whether to designate information about an observed object as public or private. For example, when a robot obtains sensor data describing an object, the robot can generate an embedding for the object based on the sensor data. The robot determines whether to designate the embedding as a private embedding or a public embedding, then stores the embedding and data designating whether the embedding is a private embedding or a public embedding.

To determine whether information about an observed object should be public (e.g., shared with a server system and other robots) or private, the robot can use sharing rules indicating one or more restrictions on the sharing of information obtained by the robot. The restrictions may limit sharing of information observed by the robot at a time or place, or may limit information describing objects having an object type or object characteristic. Similarly, the restrictions may limit sharing of information that has certain labels applied, for example, personal designations such as a user specifying that an item is a person's personal "favorite" item. In some instances, a user may provide specific instructions that information about an object should or should not be shared. In general, the restrictions and sharing rules may be set by a user, or may be set by the robot or the server system that facilitates sharing.

For example, objects observed in some places (e.g., outdoors and in public places) may be set a public, while objects observed in private places (e.g., private residences, or places that a user designates as private) may be kept private. When a robot observes an item, the robot can determine a location of the object or the robot. The robot can then determine whether the location is within a predetermined area for which information is not shared, e.g., a room of a residence that the user may have marked as private, or a public place where observations can be shared. Based on determining that the location is within the predetermined area, the robot designating the embedding as public or private accordingly.

As another example, a robot can determine an object type for an object observed by the robot, determine that the object type is one of a predetermined set of object types which have been designated for private or public status, and the robot can determine whether to designate the embedding as a private embedding based on the object type determination.

In general, a robot can access sharing rules and then determine, based on the sensor data for the object or results of processing the sensor data, that the sharing rules restrict sharing of information for the object described by the sharing data. Based on determining that the sharing rules restrict sharing of information for the object, the robot designates the embedding for the object as a private embedding. User input can indicating one or more criteria comprising a time, place, object type, or object characteristic for which sharing of information is restricted. In response to this input, the robot can store a sharing rule that designates embeddings for objects meeting the one or more criteria as private embeddings. Determining whether to designate the embedding as a private embedding or a public embedding can include determining whether the embedding satisfies the one or more criteria.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, over a communication network by a server system from a first robot, a first embedding for a first object generated using a machine learning model stored by the first robot;
   receiving, over the communication network by the server system from the first robot, data indicating a classification for the first object, wherein the first embedding and the data indicating the classification for the first object are stored in a local cache of the first robot; and
   sending, over the communication network by the server system to the first robot, a second embedding and a corresponding classification for storage in the local cache of the first robot, wherein the second embedding is generated by a second robot and corresponds to a second object.

2. The computer-implemented method of claim 1, further comprising providing, by the server system to the first robot, an updated machine learning model to replace the machine learning model stored by the first robot.

3. The computer-implemented method of claim 2, wherein updated machine learning models are provided by the server system to the first robot periodically at a first interval larger than a second interval at which embeddings from one or more other robots are provided to the first robot.

4. The computer-implemented method of claim 2, wherein the updated machine learning model is determined based on embeddings received by the server system from one or more other robots.

5. The computer-implemented method of claim 1, further comprising:
   receiving, by the server system, a plurality of embeddings from a plurality of robots; and
   transmitting, by the server system to the first robot, aggregated embeddings comprising the plurality of embeddings received from the plurality of robots.

6. The computer-implemented method of claim 1, further comprising storing, by the server system, a database including a table of classification labels corresponding to embeddings generated by a plurality of robots.

7. The computer-implemented method of claim 6, wherein the database further comprises sensor data used to generate embeddings stored in the database.

8. The computer-implemented method of claim 6, further comprising determining whether to share a particular embedding with one or more robots based on comparing a classification label received with the particular embedding with classification labels in the database.

9. The computer-implemented method of claim 1, further comprising:
   labelling, by the server system, additional embeddings with corresponding robot type; and
   selectively sharing, by the server system, the additional embeddings with robots based on the corresponding robot type associated with each embedding.

10. The computer-implemented method of claim 1, further comprising performing, by the server system, periodic synchronizations in which the server system requests each of a plurality of robots to upload any new embeddings since a last synchronization.

11. The computer-implemented method of claim 1, further comprising determining, by the server system, which of a plurality of robots should receive one or more shared embeddings based on a role currently assigned to each of the plurality of robots.

12. The computer-implemented method of claim 1, further comprising evaluating, by the server system, a quality of the data received from the first robot before distributing the data to one or more other robots.

13. The computer-implemented method of claim 1, wherein the machine learning model is a neural network model, and wherein the first embedding is derived from output at an output layer of the neural network model.

14. The computer-implemented method of claim 1, wherein the machine learning model is a neural network model, and wherein the first embedding is derived from the data indicating activations at a hidden layer of the neural network model.

15. A server system comprising:
one or more processors; and
one or more machine-readable media storing instructions that, when executed by the one or more processors, cause the server system to perform operations comprising:
receiving, over a communication network by the server system from a first robot, a first embedding for a first object generated using a machine learning model stored by the first robot;
receiving, over the communication network by the server system from the first robot, data indicating a classification for the first object, wherein the first embedding and the data indicating the classification for the first object are stored in a local cache of the first robot; and
sending, over the communication network by the server system to the first robot, a second embedding and a corresponding classification for storage in the local cache of the first robot, wherein the second embedding is generated by a second robot and corresponds to a second object.

16. The server system of claim 15, the operations further comprising providing, by the server system to the first robot, an updated machine learning model to replace the machine learning model stored by the first robot.

17. The server system of claim 16, wherein updated machine learning models are provided by the server system to the first robot periodically at a first interval larger than a second interval at which embeddings from one or more other robots are provided to the first robot.

18. The server system of claim 16, wherein the updated machine learning model is determined based on embeddings received by the server system from one or more other robots.

19. The server system of claim 15, the operations further comprising:
receiving, by the server system, a plurality of embeddings from a plurality of robots; and
transmitting, by the server system to the first robot, aggregated embeddings comprising the plurality of embeddings received from the plurality of robots.

20. One or more machine-readable media storing instructions that, when executed by one or more processors, cause the one or more processors to perform operations comprising:
receiving, over a communication network by a server system from a first robot, a first embedding for a first object generated using a machine learning model stored by the first robot;
receiving, over the communication network by the server system from the first robot, data indicating a classification for the first object, wherein the first embedding and the data indicating the classification for the first object are stored in a local cache of the first robot; and
sending, over the communication network by the server system to the first robot, a second embedding and a corresponding classification for storage in the local cache of the first robot, wherein the second embedding is generated by a second robot and corresponds to a second object.

\* \* \* \* \*